United States Patent
Kirkman

(10) Patent No.: US 6,581,063 B1
(45) Date of Patent: Jun. 17, 2003

(54) METHOD AND APPARATUS FOR MAINTAINING A LINKED LIST

(75) Inventor: Richard Karl Kirkman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 09/594,379

(22) Filed: Jun. 15, 2000

(51) Int. Cl.[7] .............................. G06F 7/00; G06F 17/00
(52) U.S. Cl. ........................................ 707/100; 707/102
(58) Field of Search ................................ 707/102, 103, 707/100, 3, 200

(56) References Cited

U.S. PATENT DOCUMENTS

| | | | | |
|---|---|---|---|---|
| 5,319,778 A | * | 6/1994 | Catino | 707/102 |
| 5,442,763 A | * | 8/1995 | Bartfai et al. | 711/145 |
| 5,564,045 A | * | 10/1996 | Fulling et al. | 707/3 |
| 5,862,340 A | * | 1/1999 | Reynolds | 709/228 |
| 5,918,248 A | * | 6/1999 | Newell et al. | 711/147 |
| 5,924,098 A | | 7/1999 | Kluge et al. | 707/100 |
| 5,950,191 A | * | 9/1999 | Schwartz | 707/3 |
| 6,341,301 B1 | * | 1/2002 | Hagan | 709/100 |

OTHER PUBLICATIONS

Yeimkuan Chang and Laxmi N. Bhuyan (1996), An Efficient Hybrid Cache Coherence Protocol for Shared Memory Multiprocessors, pp. 172–179.*
John C. Willis, Arthur C. Sanderson, and Charles R. Hill (1990), Cache Coherence in Systems with Parallel Communication Channels & Many Processors, pp. 554–563.*
Haoran Duan, J. W. Lockwood, S. M. Kang, and J. D. Will (1997), A High–performance OC–12/OC–48 Queue Design Prototype for Input–buffered ATM Switches, pp. 20–28.*
John D. Valois, "Lock–Free Linked Lists Using Compare–and–Swap", published in *Proceedings of the Fourteenth ACM Symposium on Principles of Distributed Computing*, Ottawa, Ontario, Canada (Aug., 1995).

* cited by examiner

*Primary Examiner*—Safet Metjahic
*Assistant Examiner*—Merilyn Nguyen
(74) *Attorney, Agent, or Firm*—Roy W. Truelson

(57) ABSTRACT

A linked list has an associated auxiliary data structure, containing external references to the linked list which are used by updating tasks. The auxiliary data structure is used to block subsets of the linked list from being altered by other tasks. Preferably, the linked list is doubly-linked, and list maintenance is accomplished using object-oriented programming techniques. The auxiliary data structure is an object, which comprises iterator objects, including inspector objects and mutator objects, blocker objects and view objects. Iterator objects are used by clients to access the linked list externally. An inspector object traverses the list without changing it; while a mutator alters the list, and may traverse it as well. Both inspectors and mutators have associated view objects, which contain the pointers to the actual list elements. Mutators also have associated blocker objects, which block access to selected list elements. In operation, a mutator object blocks off a portion of the linked list by altering pointers so that they point to the blocker object, the blocker object containing additional pointers by-passing the blocked list portion. Other inspectors may thereafter traverse the list through the by-passed portion. By blocking only a relatively small portion of a large linked list, multiple tasks may concurrently access different list elements and perform separate list updates.

21 Claims, 16 Drawing Sheets

METHOD AND APPARATUS FOR MAINTAINING A LINKED LIST

FIELD OF THE INVENTION

The present invention relates to digital data processing systems, and in particular to software data structures commonly known as linked lists.

BACKGROUND OF THE INVENTION

A modern computer system typically comprises a central processing unit (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated.

The fact that computer systems are employed in a great variety of tasks is attributable largely to the abundance and variety of software which directs the execution of computer processors. Over the years, software has evolved and grown more sophisticated, just as hardware has. Although a particular software application may be very specialized, there are certain common techniques and structures which are repeatedly used by those skilled in the art. One way in which software may be improved, and with it the computer systems of which software is an essential part, is by making improvements to these commonly used software techniques and structures.

Software designers are well aware of the need to structure data, i.e., to arrange data in a logical manner so that it can be retrieved and manipulated without undue effort. The structure of data to be used by a software application is one of the first things to be determined in planning and developing the application. Although almost any custom data structure may be created, several common types of data structures are used over and over again by software designers. One of the most ubiquitous is the linked list, which may be singly linked or doubly linked.

A linked list is a collection of data elements, wherein each element in the collection contains a reference to the next element in the collection. A single element may contain only a single variable in addition to the reference, or may be a complex data structure containing data of many different types, such as text strings, numeric data, pointers, etc., or may be a dummy which contains nothing in addition to the reference. The reference is typically a pointer to the memory address of the next list element, but it may take the form of an array index or some other quantity, from which an address or other location of the next element can be derived. For simplicity, the reference within a linked list element is herein referred to as a "pointer", whether it directly points to an address, or indirectly indexes something from which an address is obtained as noted above. The addresses or other storage references of linked list elements are not required to observe any ordering, and therefore it is possible to insert an element into or remove an element from a linked list without re-assigning all or a substantial number of elements in the list. It is merely necessary to alter the pointers of adjacent elements. A linked list may be singly linked, having forward pointers running in only one direction, or doubly linked, having both forward and backward pointers.

Care must be taken when updating a linked list in a multitasking environment. If multiple concurrently executing threads attempt to simultaneously modify the same linked list, or a single thread tries to modify the list while another is traversing it, results could be unpredictable and data could be corrupted. This problem is particularly acute where a single CPU supports hardware multithreading, or where multiple CPUs execute multiple threads concurrently, all accessing a common memory.

In the case of a singly-linked list, it may be possible in some environments to update a list through use of certain types of atomic operations. However, this approach is not feasible in all environments, and is not generally applicable to doubly linked lists, which require that pointers in two different list elements be updated. A more general solution typically employed is a system of locks. A task wishing to update a linked list typically obtains an exclusive lock on the list, meaning that other tasks are precluded from accessing the list until the update is complete. A task wishing to traverse a list without modifying it may obtain a shared lock, preventing other tasks from modifying the list but not necessarily preventing traversal.

The use of locks is simple and effective, but has the potential to affect performance. It may take some time to traverse a list, searching for a particular element. During this time, all other processes are precluded from modifying the list, and, depending on the type of lock, may be precluded from traversing the list as well. For small lists, and those which are used in isolated applications, this is not likely to be a problem. But there are likely to be some large and frequently accessed lists, e.g., a list used to maintain the state of tasks in the operating system. Exclusive locking of such lists may become a performance bottleneck. Such bottlenecks are more likely in a system employing multiple CPUs.

A need exists for a method of updating linked lists without the drawbacks of prior art methods, and particularly, for a method of updating linked lists including doubly linked lists in a multiprocessor environment which is less disruptive of tasks executing in other processors.

SUMMARY OF THE INVENTION

In accordance with the present invention, a linked list has an associated auxiliary data structure, containing external references to the linked list which are used by updating tasks. The auxiliary data structure is used to block subsets of the linked list from being altered by other tasks, thus allowing concurrent updates of discrete subsets.

In the preferred embodiment, linked list maintenance is accomplished using object-oriented (OO) programming techniques. Preferably, the list is a doubly-linked list. The auxiliary data structure is an object called SharedList, which comprises iterator objects, including inspector objects and mutator objects, blocker objects and view objects. Iterator objects are used by clients to access the linked list externally. An inspector object is a type of iterator object which traverses the list without changing it; a mutator object is a type of iterator object which can alter the list, and may also traverse the list. Both inspectors and mutators have associated view objects, which contain the pointers to the actual list elements. Mutators (but not inspectors) also have associated blocker objects, which block access to selected list elements. In operation, a mutator object blocks off a portion of the linked list by altering pointers so that they point to the blocker object, the blocker object containing additional pointers by-passing the blocked list portion. Other inspectors may thereafter traverse the list through the by-passed portion, although mutators traversing a list wait at the blocked portion.

By blocking only a relatively small portion of a large linked list, multiple tasks may concurrently access different list elements and perform separate list updates, thus improving performance, particularly where multiple processors are used. Specifically, in the preferred embodiment, by blocking at the level of individual list elements as opposed to the entire list, multiple mutators may simultaneously traverse and alter different parts of a linked list without interfering with each other, and inspectors may concurrently traverse a list being altered by one or more mutators.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

SYSTEM OVERVIEW

Figure 1:
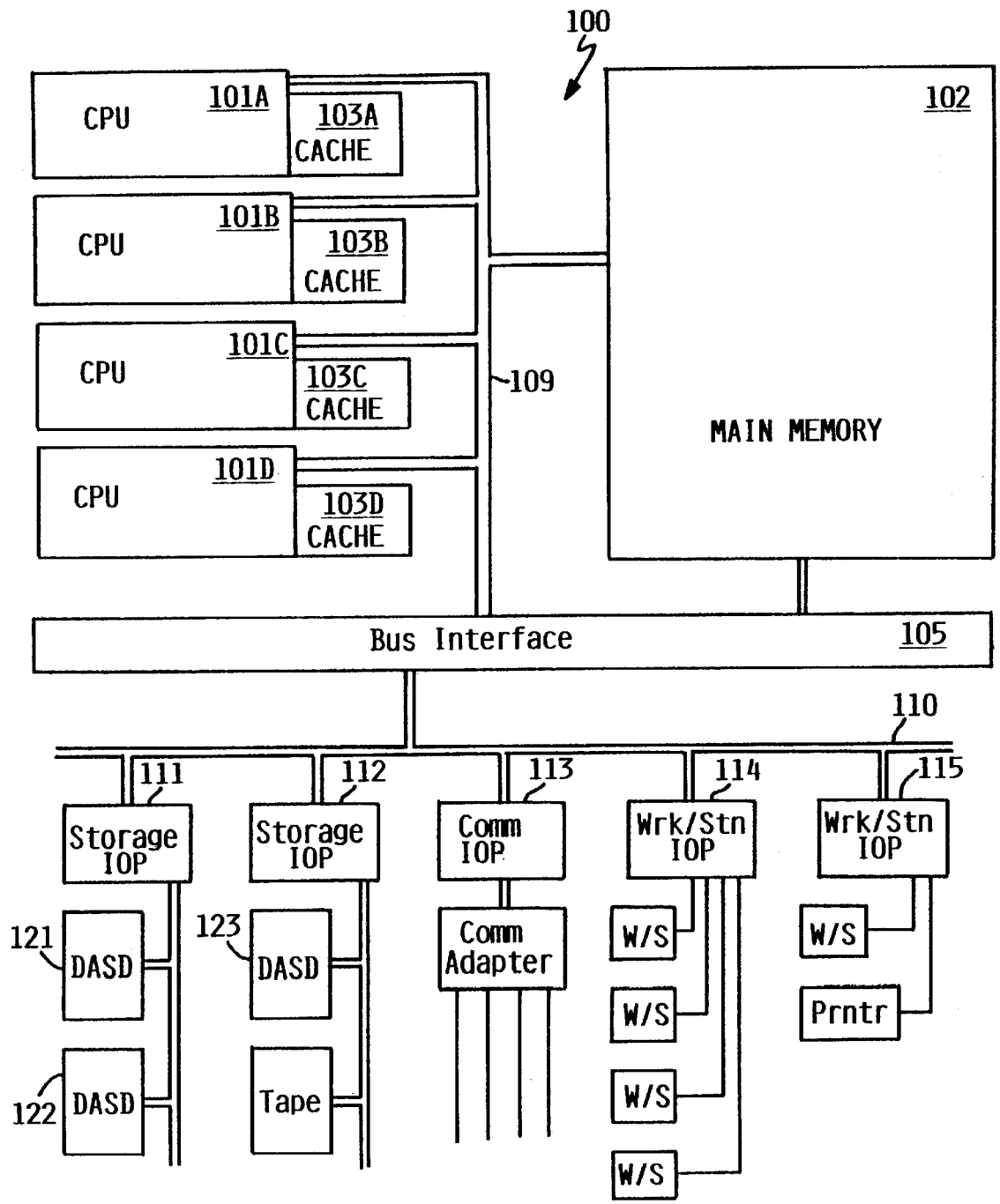
FIG. 1 is a high-level block diagram of the major hardware components of a computer system for utilizing a linked list data structure, according to the preferred embodiment of the present invention.

Referring to the Drawing, wherein like numbers denote like parts throughout the several views, FIG. 1 shows the major hardware components of a computer system 100 for utilizing a linked list data structure, according to the preferred embodiment of the present invention. Central processing units (CPUs) 101A, 101B, 101C, 101D perform basic machine processing function on instructions and data from main memory 102. Preferably, each processor has an associated cache 103A, 103B, 103C, 103D for storing data, including instructions to be executed by the processor. For simplicity, CPUs and caches are herein designated generically by reference numbers 101 and 103, respectively. Memory bus 109 transfers data among CPUs 101 and memory 102. CPUs 101 and memory 102 also communicate via memory bus 109 and bus interface 105 with system I/O bus 110. Various I/O processing units (IOPs) 111–115 attach to system I/O bus 110 and support communication with a variety of storage and I/O devices, such as direct access storage devices (DASD) 121–123, e.g., rotating magnetic disk drive data storage devices, tape drives, workstations, printers, and remote communication lines for communicating with remote devices or other computer systems.

It should further be understood that FIG. 1 is intended as but one example of a system configuration, and that the actual number, type and configuration of components in a computer system may vary. In particular, the present invention could be employed in systems having a single CPU as well as in systems having multiple CPUs, and the number of CPUs may vary. While various buses are shown in FIG. 1, it should be understood that these are intended to represent various communications paths at a conceptual level, and that the actual physical configuration of buses may vary, and in fact may be considerably more complex. Furthermore, while a single cache 103 is shown associated with each CPU 101, there may be multiple levels of cache, and some caches may be dedicated to instructions while others are dedicated to non-executable data, or alternatively, there may be no caches at all. In the preferred embodiment, computer system 100 is an IBM AS/400 computer system, it being understood that other computer systems could be used.

Figure 2:
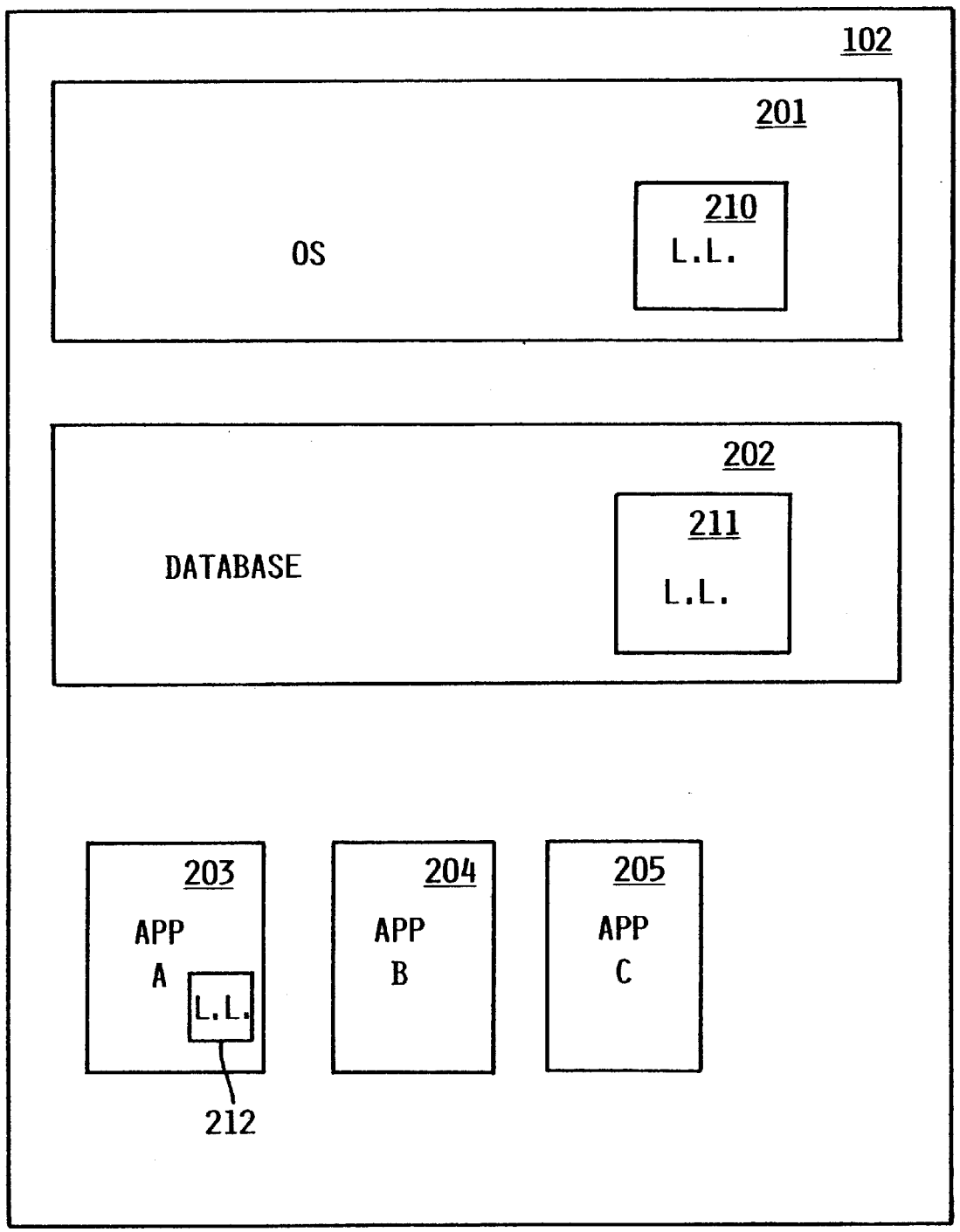
FIG. 2 is a high-level conceptual illustration of the major software components of the computer system's memory 102, according to the preferred embodiment.

FIG. 2 is a conceptual illustration of the major software components of memory 102. Operating system 201 provides various low-level software functions, such as device interfaces, management of multiple tasks, management of memory paging, etc., as is well-known in the art. In the preferred embodiment, operating system 201 includes code which normally performs operating system functions on an IBM AS/400 system, including what is sometimes referred to as "Licensed Internal Code" as well as OS/400 operating system code, it being understood that other operating systems could be used. Database 202 is conceptually illustrated as a generic collection of data upon which applications are run. It should be understood that many different types of databases may be used, such as financial data, forms and text data, library data, medical data, etc. While a single exemplary database is shown in FIG. 2, computer system 100 may contain multiple databases, or may contain no databases. Applications 203–205 are programs which perform specific work on behalf of a user, usually by accessing data in database 202. For example, applications may search and retrieve data in database 202, edit data, perform complex calculations on data to produce additional data, or any number of other applications. Three applications are shown in FIG. 2, it being understood that the number of applications may vary, and is typically much greater than three.

Within operating system 201, within database 202, and within application 203, are linked list data structures 210, 211, 212. These structures contain linked lists of data elements. These data elements, which are herein referred to as "links", are the basic units of the list, the list containing an arbitrary number of such elements or links. In the preferred embodiment, the list is a doubly-linked list, and therefore each element or link contains at least two pointers, one to the next sequential link and the other to the previous link in the sequence. Links may optionally contain additional pointer, e.g., to a list object. It would alternatively be possible to use only a singly-linked list, wherein each element contains a forward pointer to the next link, but does not contain a backward pointer to the previous link. In accordance with the preferred embodiment, each linked list data structure 210–212 further contains auxiliary data structures used for accessing and updating the data in the linked list, as described more fully herein.

While a certain number and type of software entities are shown in FIG. 2, it will be understood that these are shown for purposes of illustration only, and that the actual number of such entities may vary. In particular, linked list data structures are shown residing in operating system 201, in database 202, and in application program 203 for illustrative purposes, but such linked list data structures may reside only in the operating system, or only in the database, or may exist within an application program or as isolated data structures not a part of any other structured data or program. Additionally, while the software components of FIG. 2 are shown conceptually as residing in memory, it will be understood that in general the memory of a computer system will be too small to hold all programs and other data simultaneously, and that information is typically stored in data storage such as data storage devices 121–123, from which it is paged into memory by the operating system as required.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as DASD 121–123 and memory 102.

LINKED LIST STRUCTURE: EXTERNAL INTERFACE

In the preferred embodiment, the relevant software data structures and programming code are written using object-oriented (OO) programming techniques, it being understood that conventional procedural programming or other programming techniques could also be used. In the discussion that follows, OO terminology is used, it being understood that in general there are analogous data structures, code segments, or other entities used in other programming techniques. Linked list data structure 210–212 is an object called SharedList.

A SharedList object provides a means of maintaining a doubly-linked list of client objects, but with some unique characteristics, i.e. (a) clients may safely traverse through the list while links are being added to it and/or removed from it; and (b) multiple clients may independently and concurrently add or remove links to/from the list. The SharedList object allows all clients to access the list simultaneously. It provides blocking of tasks at the link level, and only those tasks involved in the individual link conflicts are involved in the blocking.

SharedList<T> Objects

Figure 3:
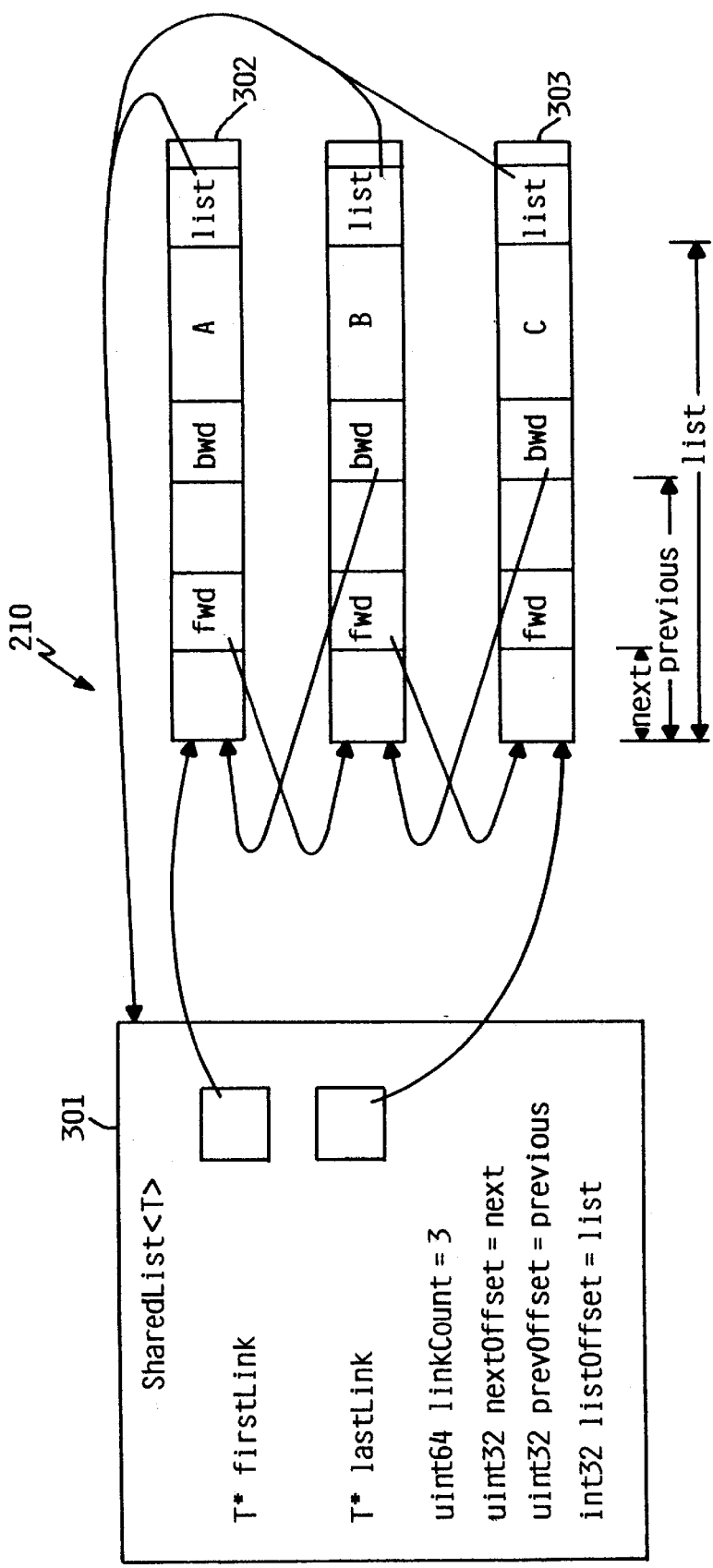
FIG. 3 is a high-level view of the linked list data structure, according to the preferred embodiment.

Referring to FIG. 3, which is a high-level view of the linked list data structure 210, 211, the SharedList<T> class provides templatized support for a SharedList of client objects of any type T. The SharedList<T> object 301 contains pointers to the first client link object 302 and last client link object 303 in the list, and a count of the number of links in the list. It also contains offsets of the forward and backward pointers within each link; the link objects are responsible for defining fields for these pointers.

In addition, each link optionally may define a field which points to the SharedList<T> object itself. If this field is defined, then when a link is inserted into the list, the pointer is set, and when the link is removed, it is reset to NULL. Depending on their application, clients may use the pointer to determine whether a given link is in a list, and which list it is in, by interrogating this field. For example, the destructor for a client object may want to remove the object from whatever list it is in.

FIG. 3 shows how an SharedList<T> object should be viewed. The offset of the optional field within the link objects, which points to the SharedList<T> object, is a signed integer. The absence of the pointer field within the links is indicated by any negative value in the offset field.

SharedList<T> Functions

Following is a description of the primary functions supported by SharedList<T> object 301:

void insertFirst(T* newLink): This function inserts the specified link as the first link in the list.

void insertLast(T* newLink): This function inserts the specified link as the last link in the list.

void insertBeforeArbitraryLink(T* newLink, T* refLink): This function inserts the specified link immediately preceding the referenced arbitrary link. An arbitrary link is one which the client intrinsically knows and guarantees to be in the list, and could take any position within the list. As explained herein, it is possible to traverse a list to locate an insertion point for a link or a link to be deleted, but is also possible to jump into the middle of a list and insert or delete an arbitrary link, assuming the client has a pointer to the link in the middle of the list. The insertBeforeArbitraryLink function is one of several used when the client has such a pointer. The client (or some other external agency) is responsible for guaranteeing that the link is indeed in the list; if not results may be unpredictable.

void insertAfterArbitraryLink(T* newLink, T* refLink): This function inserts the specified link immediately following the referenced arbitrary link.

T* removeFirstLink( ): This function removes the first link from the list, and returns a pointer to it.

T* removeLastLink( ): This function removes the last link from the list and returns a pointer to it. This function requires an atomic view of the list (described further on) and therefore may be more restrictive than would be desirable in some applications.

void removeArbitraryLink(T* oldLink): This function removes the specified arbitrary link from the list.

T* removeBeforeArbitraryLink(T* refLink): This function removes from the list, the link which immediately precedes the specified arbitrary link, and returns a pointer to it.

This function also requires an atomic view of the list.

T* removeAfterArbitraryLink(T* refLink): This function removes from the list, the link which immediately follows the specified arbitrary link, and returns a pointer to it.

getLinkCount( ) const: This function returns a snapshot of the count of the links on the list. This is returned without any synchronization.

The following functions pertain to a specific link, i.e., they assume that the client already has a reference to a link, but not necessarily to the SharedList<T> object 301:

LinkStatus getLinkStatus(const T* refLink) const: This function returns the status of the specified link. If the links have the field defined which points to the SharedList<T> object which contains them, then this function will indicate whether the specified link is in the list or not. If the links do not have the pointer field defined, this function simply indicates that it does not know whether the link is within the list or not.

static LinkStatus getLinkStatus(const T* refLink, int32 offset) const: This is a static function which returns the status of the specified link. If the specified offset is negative, then the function returns an indication that it does not know whether the link is in a SharedList<T> object. If the specified offset is not negative, then the function returns an indication of whether the link is in some SharedList<T> object. static SharedList<T> * getSharedList(const T* refLink, int32 offset): This is a static function which returns a pointer to the SharedList<T> object which contains the specified link. If the offset specified is negative, or if the link is not in an SharedList<T> object, the NULL pointer is returned.

static SharedList<T> * removeArbitraryLink(T* refLink, int32 offset): This is a static function which removes the specified link from whatever SharedList<T> object it may be in, and returns a pointer to that SharedList<T> object. The NULL pointer is returned (and the link is not removed) if the offset specified is negative, or if the link was not in a SharedList<T> object.

All of the above functions which insert or remove links create various forms of iterator objects to actually perform the functions. Clients may use iterator objects (described herein) to perform these and other functions as well. In addition to the functions described above, various secondary functions may be defined for specialized applications, which are not described herein. It will be understood that the above list of functions is described as but one embodiment, and that other or additional functions could be defined consistent with the present invention.

SharedListIterator<T> Objects

SharedListIterator<T> objects 401 provide the ability to traverse ("walk through") the links of a SharedList<T> object 301, and to insert or remove links into/from the list. There are various types of SharedListIterator<T> objects, and they are arranged in an inheritance hierarchy. There are iterators which can only inspect the list by traversal, and those which can alter (mutate) it (by inserting or removing links) in addition to traversing it; there are iterators which have a non-atomic view of the list, and those which have an atomic view. To work with the list, a client creates an iterator of the desired type, and then invokes the functions it provides.

As used herein, an atomic view means that the iterator is assured that no other mutators are concurrently attempting to modify the list, i.e., the iterator has a form of exclusive access, although it may permit inspectors to concurrently access the list. A nonatomic view means that there is no such assurance. The thrust of the present invention is to permit concurrent modifications to different parts of a linked list, and accordingly the non-atomic view is to be encouraged. However, there may be special circumstances in which some form of exclusivity is necessary, and therefore an atomic view, similar in its effect to prior art locking methods, is provided.

Iterator States

An iterator exists in one of the following states:

Inactive: This is the initial state of an iterator when it is created. In this state, it does not hold any list resources, and does not know about a current link. An iterator must return to this state when it is done with the list (or be implicitly returned to this state when being destructed).

Active: This is the state of an iterator when it holds list resources and knows about a current link. An iterator generally reaches this state only as a result of the execution of the getFirstLink( ) (or getLinkAfterArbitraryLink( )) method. However, as described later, there are some mutator functions which can move an iterator to the active state.

Transition: This state only applies to mutators. In this state, a mutator no longer knows about a current link, but still holds list resources. Because of this, a mutator should not be "left alone" when it reaches this state. It is intended to allow an insertBefore Current Link( ) function to succeed at the end of a list.

Object Hierarchy

Figure 4A:
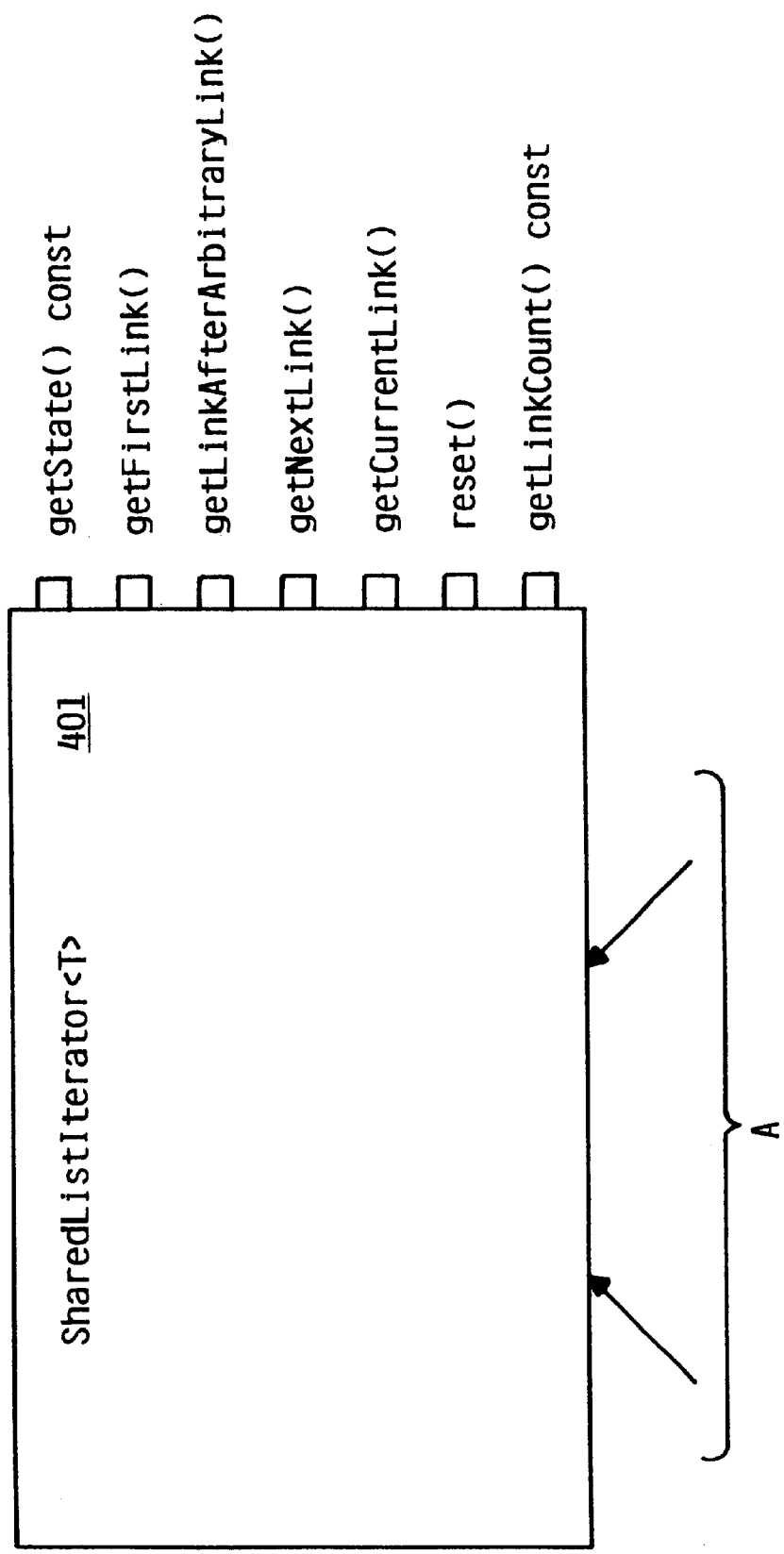
FIG. 4 shows the externally viewed object class inheritance hierarchy within the linked list data structure, according to the preferred embodiment.
Figure 4B:
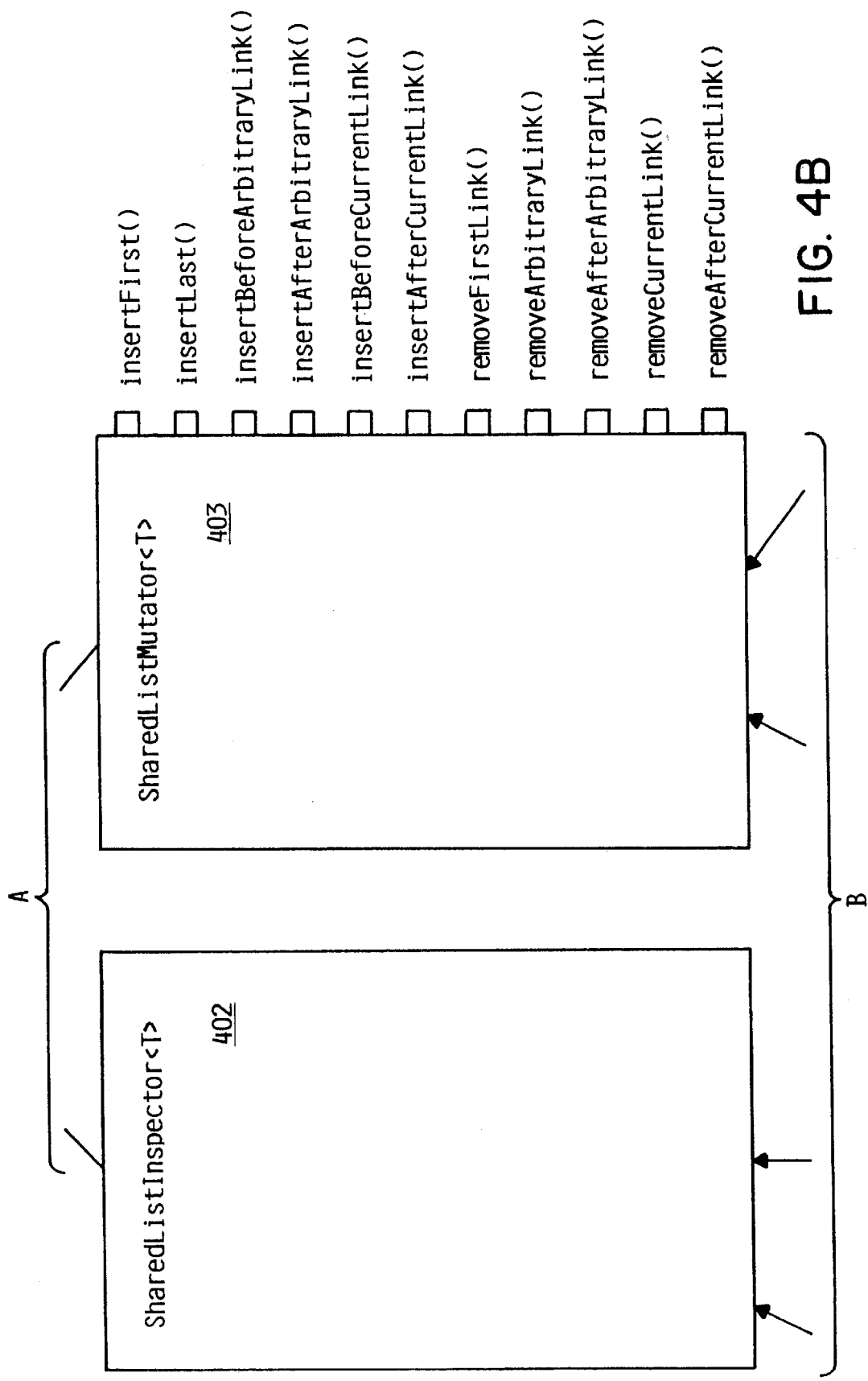
Figure 4C:
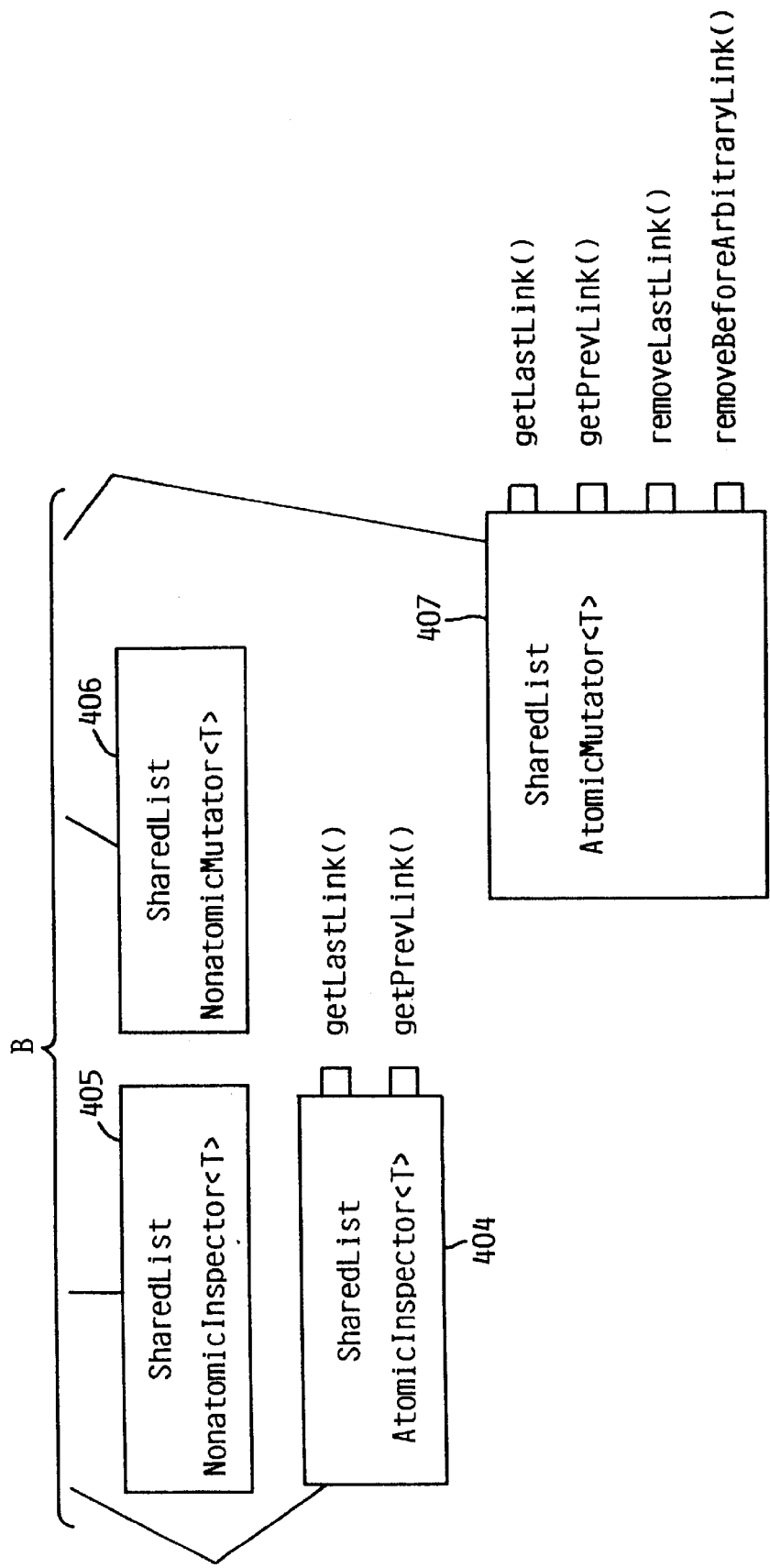

FIG. 4 shows the externally viewed object class inheritance hierarchy and functions supported by each class inheriting from the SharedListIterator<T> object class 401. These objects classes are described as follows:

SharedListIterator<T> 401: This is the highest class in the inheritance hierarchy, and it is only an abstract base class. It provides the ability to walk forward through the list and reference one link at a time. Whether it has the ability to mutate the list, or only inspect it, is determined by derived classes. It also has either an atomic or nonatomic view of the list, again provided by derived classes.

SharedListInspector<T> 402: This class derives from SharedListIterator<T> 401. It too is an abstract class. It is nothing more than an iterator, but it promises to never mutate the list. It has either an atomic or nonatomic view of the list, provided by derived classes.

SharedListAtomicInspector<T> 404: This is a concrete class deriving from SharedListInspector<T> 402. Objects of this class have an atomic view of the list, which means they can be sure that no mutator is also processing the list. Objects of this class can iterate through the list (either forward or backward), but cannot mutate it.

SharedListNonatomicInspector<T> 405: This is a concrete class deriving from SharedListInspector<T> 402. Objects of this class have a nonatomic view of the list, which means that mutators may be processing the list simultaneously. Objects of this class can iterate forward through the list, but cannot mutate it.

SharedListMutator<T> 403: This class derives from SharedListIterator<T> 401. It too is an abstract class, but it adds the ability to mutate the list by inserting links into it or removing links from it. It has either an atomic or nonatomic view of the list, provided by derived classes.

SharedListAtomicMutator<T> 407: This is a concrete class deriving from SharedListMutator<T> 403. Objects of this class have an atomic view of the list, which means they can be sure that no other mutator is also processing the list. Objects of this class can iterate through the list either forward or backward and they can mutate the list.

SharedListNonatomicMutator<T> 406: This is a concrete class deriving from SharedListMutator<T> 403. Objects of this class have a nonatomic view of the list, which means that other nonatomic mutators may also be processing it at the same time. Objects of this class can iterate forward through the list and they can insert links into, or remove links from, the list.

SharedListIterator<T> Objects

Iterators have the ability to "walk through" the links in the list. When in the active or transition state, they have a current link, which is the link they are currently referring to. An inspector is guaranteed that its current link cannot be removed from the list. A mutator is guaranteed that no other mutator can remove either its current link or the link preceeding it, nor insert another link between them.

The following functions are provided on the abstract base class, for all iterators of all types:

T* getFirstLink( ): This function sets the iterator's current link to the first link in the list and returns a pointer to it. The iterator will be in the active state as a result of invoking this function. However, if there are no links in the list, then the pointer returned is NULL, and the iterator will be in the inactive state if it is an inspector, or in the transition state if it is a mutator.

T* getLinkAfterArbitraryLink(T* refLink): This function sets the iterator's current link to the link which immediately follows the specified arbitrary link, and returns a pointer to it. The iterator will be in the active state as a result of invoking this function.

However, if there is no link following the specified arbitrary link, then the pointer returned is NULL, and the iterator will be in the inactive state if it is an inspector, or in the transition state if it is a mutator.

T* getNextLink( ): This function advances the iterator to the next link in the list. It sets its current link to the next link in the list and returns a pointer to it. However, the actual results depend on the state of the iterator before the function is invoked. If the iterator is in the active state and the end of the list is not reached, it will remain in the active state. If the iterator is in the active state and the end of the list is reached, then if it is an inspector, it will move to the inactive state, and if it is a mutator it will move to the transition state. In either case, the NULL pointer will be returned. If the iterator is in the transition state, it will move to the inactive state, and the NULL pointer will be returned. If the iterator is in the inactive state, it will remain in the inactive state, and the NULL pointer will be returned.

T* getCurrentLink( ): This function returns a pointer to the iterator's current link. In general this function simply returns the same value as was returned with the most recent invocation of any of the other "getLink" functions. However, there are some mutator functions which can cause the mutator's current link to be changed, and if the result of such a function indicates that the mutator's current link was changed, then this function should be invoked to get the new current link.

void reset( ): This function moves the iterator to the inactive state. It is automatically invoked when the iterator's destructor runs, but it may also be invoked by clients, for example, to move a mutator out of the transition state.

IteratorState getState( ) const: This function returns the current state of the iterator (active, inactive, or transition).

getLinkCount( ) const: This function returns a snapshot of the number of links in the list. constructors: The constructors for all of the concrete derived classes require a reference to the SharedList<T> object 301 with which the iterator is associated. In addition, the constructors support, as an optional parameter, an indication of the scope of the iterator's lock on the SharedList<T> object. The lock may either be scoped to the existence of the SharedListIterator<T> object, or may be dynamic, locking only while the iterator is in the active or transition state, or (if it is a mutator) while it is performing a mutating function. The dynamic option allows iterators to exist without holding a lock on the SharedList<T> object "while not being used for anything". This may be useful when the overhead of otherwise repeatedly constructing and destructing the iterator is too much. By default, the lock is scoped to the life of the iterator.

destructor: The destructors for all of the concrete derived classes ensure that the iterator is reset to the inactive state.

SharedListInspector<T> Objects

This abstract class provides no additional functions beyond those provided by the SharedListIterator<T> base class. Objects of classes deriving from this class are known to be able to inspect, and not mutate, the list.

SharedListAtomicInspector<T> Objects

This is a concrete class deriving from SharedListInspector<T>. Objects of this class have an atomic view of the list. Objects of this class can iterate through the list either forward or backward, but cannot mutate it.

Because of the atomic view, this class also provides the following functions:

T* getLastLink( ): This function returns a pointer to the last link in the list. The inspector will be in the active state after this function has been invoked, unless there are no links in the list. In that case, the NULL pointer will be returned and the inspector will be in the inactive state.

T* getPrevLink( ): This function "backs up" the iterator to the previous link in the list. It sets its current link to the previous link in the list and returns a pointer to it. However, the actual results depend on the state of the inspector before the function is invoked. If the inspector is in the active state and the front of the list is not reached, it will remain in the active state. If the inspector is in the active state and the front of the list is reached, it will move to the inactive state, and the NULL pointer will be returned. If the inspector is in the inactive state, it will remain in the inactive state, and the NULL pointer will be returned.

SharedListNonatomicInspector<T> Objects

This is a concrete class deriving fromSharedListInspector<T> 402. It provides no functions in addition to the base class. Objects of this class have a nonatomic view of the list. Objects of this class can iterate forward through the list, but cannot mutate it themselves.

SharedListMutator<T> Objects

This abstract class derives from SharedListIterator<T> 401. It adds the ability to mutate the list by adding links to it or removing links from it. It has either an atomic or a nonatomic view of the list, provided by the classes deriving from it.

A client's mutator may be in any state when invoking a mutating function. During the actual execution of the function, the mutator generally must (at least internally) be in the inactive state. In order for a mutator in the active or transition state to "keep its place in the list" through a mutating function, the completion of the function must have the ability to restore the state afterwards. More generally, all of the mutating functions include a MutatorControl parameter which indicates how the mutator's current link (and therefore its state) is to be handled when the function completes. The following values may be specified:

conditionalUpdate=0: This value indicates that the mutator's current link is not to be changed, unless it is necessary to do so in order to complete the function. If the current link is changed, the mutator will not "lose its place in the list"; the new current link will be the link which now follows the link which preceeded the old current. An atomic mutator's current link will only be changed if it happens to be the link which is being removed. A nonatomic mutator's current link is changed by all mutating functions except for insertAfterCurrentLink( ) and removeAfterCurrentLink( ).

unconditionalUpdate=1: This value indicates that the mutator's current link is to be changed if the function succeeds. If inserting a link, the new current link will be the newly inserted link. If removing a link, the new current link will be the link which now follows the link which was removed.

unconditionalReset=2 This value indicates that the mutator is to be reset to the inactive state if the function succeeds.

The various insert and remove functions return a MutatorResult value which indicates whether the function succeeded or failed, and whether the current link was changed. The following values may be returned:

successfulAsRequested=0: This value indicates that the requested function succeeded, and either the mutator's current link was not changed, or was unconditionally updated, or the mutator was unconditionally reset, as specified by the MutatorControl value.

failedNoChange=1: This value indicates that the requested function failed and that the mutator's current link was not changed. This condition can also be the result of a user error.

successfulWithChange=2: This value indicates that the requested function succeeded, but that the mutator's current link had to be changed. This will only be returned when conditionalUpdate is specified for the MutatorControl value. When this is the case, it will be returned for a nonatomic mutator which was in the active or transition state, or for an atomic mutator which removes a link which happened to be its current link.

failedWithChange=3: This value indicates that the requested function failed, and that the mutator's current link had to be changed in order to avoid a deadlock. This can only occur for a nonatomic mutator, and it can happen regardless of the MutatorControl value specified. However, the mutator will not "lose its place in the list". The new current link will be the link which now follows the link which preceeded the old current link.

Clients may compare the MutatorResult returned against the values specified above, or may treat it as a mask and test the individual bits within it. The meaning of the individual bits is as follows:

failed0x01: This bit is on if the function failed, and off if it succeeded changed 0x02: This bit is on if the mutator's current link was changed "unexpectedly". If off, it indicates that either the function failed without changing the mutator's current link, or the function succeeded, but only changed the mutator's current link if the MutatorControl value requested that it be unconditionally updated or reset.

The SharedListMutator<T> class 403 provides the following functions. Each function requires a MutatorControl parameter, and either returns or updates a MutatorResult value or parameter.

T* removeFirstLink(MutatorControl, MutatorResult&): This method removes the first link from the list, and returns a pointer to it. NULL is returned if there were no links in the list. The MutatorResult parameter is updated to indicate whether the function succeeded and its affect on the mutator's current link. Refer to Table 1 for a description of the contexts in which the various MutatorResult values may be returned.

T* removeAfterArbitraryLink(T* refLink, MutatorControl, MutatorResult&): This method removes from the list, the link which follows the specified arbitrary link, and returns a pointer to it. NULL is returned if the specified arbitrary link was the last link in the list. The MutatorResult parameter is updated to indicate whether the function succeeded and its affect on the mutator's current link. Refer to Table 1 for a description of the contexts in which the various MutatorResult values may be returned.

TABLE 1

MutatorResult Values for Selected remove Functions

| Mutator Control | Atomic Mutator | Nonatomic Mutator |
| --- | --- | --- |
| 0 = Conditional Update | 0 = successfulAsRequested The link that was removed was not the current link. The current link is unchanged. 1 = failedWithoutChange The referenced arbitrary link was NULL or there was no link to remove. 2 = successfulWithChange The link that was removed was the old current link. The current link has been changed to the link which followed it. | 0 = successfulAsRequested The mutator was, and remains, in the inactive state. 1 = failedWithoutChange (a) The referenced arbitrary link was NULL, or (b) the mutator was in the inactive state and there was no link to remove. 2 = successfulWithChange The mutator was in the active or transition state. The current link has been changed to the link following the link which was removed. 3 = failedWithChange The mutator was in the active or transition state and there was no link to remove. The mutator is now in the transition state. |
| 1 = Unconditional Update | 0 = successfulAsRequested The current link is now the link which followed the link which was removed. 1 = failedWithoutChange The referenced arbitrary link was NULL or there was no link to remove. | 0 = successfulAsRequested The current link is now the link which followed the link which was removed, at the time it was removed. 1 = failedWithoutChange (a) The referenced arbitrary link was NULL, or (b) the mutator was in the inactive state and there was no link to remove. 3 = failedWithChange The mutator was in the active or transition state and there was no link to remove. The mutator is now in the transition state. |

TABLE 1-continued

MutatorResult Values for Selected remove Functions

| Mutator Control | Atomic Mutator | Nonatomic Mutator |
|---|---|---|
| 2 = Unconditional Reset | 0 = successfulAsRequested The mutator has been reset to the inactive state. 1 = failedWithoutChange The referenced arbitrary link was NULL or there was no link to remove. | 0 = successfulAsRequested The mutator has been reset to the inactive state. 1 = failedWithoutChange (a) The referenced arbitrary link was NULL, or (b) the mutator was in the inactive state and there was no link to remove. 3 = failedWithChange The mutator was in the active or transition state and there was no link to remove. The mutator is now in the transition state. |

The atomic mutator portion of this table also applies to the removeLastLink( ) and removeBeforeArbitraryLink( ) functions.

MutatorResult removeArbitraryLink(T* oldLink, MutatorControl): This method removes the specified arbitrary link from the list, and returns a result indicating whether the function succeeded and its affect on the mutator's current link. Refer to Table 2 for a description of the contexts in which the various MutatorResult values may be returned.

TABLE 2

MutatorResult Values for the removeArbitraryLink( ) Function

| Mutator Control | Atomic Mutator | Nonatomic Mutator |
|---|---|---|
| 0 = Conditional Update | 0 = successfulAsRequested The link that was removed was not the current link. The current link is unchanged. 1 = failedWithoutChange The referenced arbitrary link was NULL. 2 = successfulWithChange The link that was removed was the old current link. The current link has been changed to the link which followed it. | 0 = successfulAsRequested The mutator was, and remains, in the inactive state. 1 = failedWithoutChange The referenced arbitrary link was NULL. 2 = successfulWithChange The mutator was in the active or transition state. The current link has been changed to the link following the link which was removed. |
| 1 = Unconditional Update | 0 = successfulAsRequested The current link is now the link which followed the link which was removed. 1 = failedWithoutChange The referenced arbitrary link was NULL. | 0 = successfulAsRequested The current link is now the link which followed the link which was removed, at the time it was removed. 1 = failedWithoutChange The referenced arbitrary link was NULL |
| 2 = Unconditional Reset | 0 = successfulAsRequested The mutator has been reset to the inactive state. 1 = failedWithoutChange The referenced arbitrary link was NULL. | 0 = successfulAsRequested The mutator has been reset to the inactive state. 1 = failedWithoutChange The referenced arbitrary link was NULL. |

MutatorResult removeCurrentLink(MutatorControl): This method attempts to remove the mutator's current link from the list. The function may or may not succeed. If it does not succeed, it is because another mutator has committed either to insert a link before this mutator's current link, or to remove this mutator's current link. Whether the function succeeds or not, the mutator will have a new current link. The new current link will be the link which now follows the link which preceeded the current link at the time the remove was attempted. In this way, the mutator does not "lose its place in the list". The function returns a result indicating whether the function succeeded and its affect on the mutator's current link. Refer to Table 3 for a description of the contexts in which the various MutatorResult values may be returned.

TABLE 3

MutatorResult Values for the removeCurrentLink( ) Function

| Mutator Control | Atomic Mutator | Nonatomic Mutator |
|---|---|---|
| 0 = Conditional Update | 1 = failedWithoutChange The mutator was not in the active state. 2 = successfulWithChange The current link is now the link which followed the current link at the time it was removed. | 1 = failedWithoutChange The mutator was not in the active state. 2 = successfulWithChange The current link is now the link which followed the current link at the time it was removed. 3 = failedWithChange The current link is the link which now follows the link which preceeded the current link at the time the remove was attempted. |
| 1 = Unconditional Update | 0 = successfulAsRequested The current link is now the link which followed the current link at the time it was removed. 1 = failedWithoutChange The mutator was not in the active state. | 0 = successfulAsRequested The current link is now the link which followed the current link at the time it was removed. 1 = failedWithoutChange The mutator was not in the active state. 3 = failedWithChange The current link is the link which now follows the link which preceeded the current link at the time the remove was attempted. |
| 2 = Unconditional Reset | 0 = successfulAsRequested The mutator has been reset to the inactive state. 1 = failedWithoutChange The mutator was not in the active state. | 0 = successfulAsRequested The mutator has been reset to the inactive state. 1 = failedWithoutChange The mutator was not in the inactive state. 3 = failedWithChange The current link is the link which now follows the link which preceeded the current link a the time the remove was attempted. |

T* removeAfterCurrentLink(MutatorControl, MutatorResult&): This function attempts to remove the link which immediately follows the current link, and return a pointer to it. NULL is returned if the current link is the last link in the list. The function may or may not succeed. If it does not succeed, it is because another mutator has committed to remove this mutator's current link. In that case, this mutator will have a new current link, which will be the link which now follows the link which preceded the old current link a the time the remove was attempted. In this way the mutator does not "lose its place in the list". The MutatorResult is updated to indicate whether the function succeeded and its affect on the mutator's current link. Refer to Table 4 for a description of the contexts in which the various MutatorResult values may be returned.

TABLE 4

MutatorResult Values for the removeAfterCurrentLink( ) Function

| Mutator Control | Atomic Mutator | Nonatomic Mutator |
|---|---|---|
| 0 = Conditional Update | 0 = successfulAsRequested The current link is unchanged. 1 = failedWithoutChange Either the current link was the last link, or the mutator was in the inactive state. | 0 = successfulAsRequested The current link is unchanged. 1 = failedWithoutChange Either the current link was the last link, or the mutator was not in the active state. 3 = failedWithChange The new current link is the link which now follows the link which preceeded the old current link at the time the remove was attempted. |
| 1 = Unconditional Update | 0 = successfulAsRequested The current link is the link which followed the link which was removed. 1 = failedWithoutChange Either the current link was the last link, or the mutator was in the inactive state. | 0 = successfulAsRequested The current link is the link which followed the link: which was removed. 1 = failedWithoutChange Either the current link was the last link, or the mutator was not in the active state. 3 = failedWithChange The new current link is the link which now follows the link which preceeded the old current link at the time the remove was attempted. |
| 2 = Unconditional Reset | 0 = successfulAsRequested The mutator has been reset to the inactive state. 1 = failedWithoutChange Either the current link was the last link, or the mutator was in the inactive state. | 0 = successfulAsRequested The mutator has been reset to the inactive state. 1 = failedWithoutChange Either the current link was the last link, or the mutator was not in the active state. 3 = failedWithChange The new current link is the link which now follows the link which preceeded the old current link at the time the remove was attempted. |

MutatorResult insertFirst(T* newLink, MutatorControl): This function inserts the specified link at the front of the list, and returns a result indicating the affect on the mutator's current link. Refer to Table 5 for a description of the contexts in which the various MutatorResult values may be returned.

MutatorResult insertLast(T* newLink, MutatorControl): This function inserts the specfied link at the back of the list, and returns a result indicating the affect on the mutator's current link. Refer to Table 5 for a description of the contexts in which the various MutatorResult values may be returned.

MutatorResult insertBeforeArbitraryLink(T* newLink, T* refLink, MutatorControl): This method inserts the specified link immediately in front of the specified reference link, and returns a result indicating the affect on the mutator's current link. Refer to Table 5 for a description of the contexts in which the various MutatorResult values may be returned.

MutatorResult insertAfterArbitraryLink(T* newLink, T* refLink, MutatorControl): This method inserts the specified link immediately following the specified reference link, and returns a result indicating the affect on the mutator's current link. Refer to Table 5 for a description of the contexts in which the various MutatorResult values may be returned.

TABLE 5

MutatorResult Values for the Selected insert Functions

| Mutator Control | Atomic Mutator | Nonatomic Mutator |
|---|---|---|
| 0 = Conditional Update | 0 = successfulAsRequested The current link is unchanged. 1 = failedWithoutChange Either the link to be inserted, or the referenced arbitrary link was NULL. | 0 = successfulAsRequested The mutator was, and remains, in the inactive state. 1 = failedWithoutChange Either the link to be inserted, or the referenced arbitrary link was NULL. 2 = successfulWithChange The mutator was in the active or transition state. The newly inserted link is now the current link. |
| 1 = Unconditional Update | 0 = successfulAsRequested The newly inserted link is now the current link. 1 = failedWithoutChange Either the link to be inserted, or the referenced arbitrary link was NULL. | 0 = successfulAsRequested The newly inserted link is now the current link. 1 = failedWithoutChange Either the link to be inserted, or the referenced arbitrary link was NULL |
| 2 = Unconditional Reset | 0 = successfulAsRequested The mutator has been reset to the inactive state. 1 = failedWithoutChange Either the link to be inserted, or the referenced arbitrary link was NULL. | 0 = successfulAsRequested The mutator has been reset to the inactive state. 1 = failedWithoutChange Either the link to be inserted, or the referenced arbitrary link was NULL. |

MutatorResult insertBeforeCurrentLink(T* newLink, MutatorControl): This method attempts to insert the specified link immediately in front of the mutator's current link. The function may or may not succeed. If it does not succeed, it is because another mutator has committed either to insert a link before this mutator's current link, or to remove this mutator's current link. Whether the function succeeds or not, the mutator will have a new current link. The new current link will be the link which follows the link which preceeded the old current link at the time the insert was attempted. In this way, the mutator does not "lose its place in the list". The return value indicates whether the function succeeded and its affect on the mutator's current link. Refer to Table 6 for a description of the contexts in which the various MutatorResult values may be returned.

TABLE 6

MutatorResult Values for insertBeforeCurrentLink( ) Functions

| Mutator Control | Atomic Mutator | Nonatomic Mutator |
|---|---|---|
| 0 = Conditional Update | 0 = successfulAsRequested The current link is unchanged. 1 = failedWithoutChange Either the link to be inserted was NULL, or the mutator was in the inactive state. | 0 = successfulAsRequested The current link is unchanged. 1 = failedWithoutChange Either the link to be inserted was NULL, or the mutator was in the inactive state. 3 = failedWithChange The new current link is the link which now follows the link which preceeded the old current link at the time the insert was attempted. |

TABLE 6-continued

MutatorResult Values for insertBeforeCurrentLink( ) Functions

| Mutator Control | Atomic Mutator | Nonatomic Mutator |
|---|---|---|
| 1 = Unconditional Update | 0 = successfulAsRequested The newly inserted link is now the current link. 1 = failedWithoutChange Either the link to be inserted was NULL, or the mutator was in the inactive state. | 0 = successfulAsRequested The newly inserted link is now the current link. 1 = failedWithoutChange Either the link to be inserted was NULL, or the mutator was in the inactive state. 3 = failedWithChange The new current link is the link which now follows the link which preceeded the old current link at the time the insert was attempted. |
| 2 = Unconditional Reset | 0 = successfulAsRequested The mutator has been reset to the inactive state. 1 = failedWithoutChange Either the link to be inserted was NULL, or the mutator was in the inactive state. | 0 = successfulAsRequested The mutator has been reset to the inactive state. 1 = failedWithoutChange Either the link to be inserted was NULL, or the mutator was in the inactive state. 3 = failedWithChange The new current link is the link which now follows the link which preceeded the old current link at the time the insert was attempted. |

MutatorResult insertAfterCurrentLink(T* newLink, MutatorControl): This function attempts to insert the specified link immediately following the current link. The function may or may not succeed. If it does not succeed, it is because another mutator has already committed to removing this mutator's current link. In that case, this mutator will have a new current link, which will be the link which now follows the link which preceeded the old current link at the time the insert was attempted. In this way the mutator does not "lose its place in the list". The return value indicates whether the function succeeded and its affect on the mutator's current link. Refer to Table 7 for a description of the contexts in which the various MutatorResult values may be returned.

TABLE 7

MutatorResult Values for insertAfterCurrentLink( ) Functions

| Mutator Control | Atomic Mutator | Nonatomic Mutator |
|---|---|---|
| 0 = Conditional Update | 0 = successfulAsRequested The current link is unchanged. 1 = failedWithoutChange Either the link to be inserted was NULL, or the mutator was in the inactive state. | 0 = successfulAsRequested The current link is unchanged. 1 = failedWithoutChange Either the link to be inserted was NULL, or the mutator was in the inactive state. 3 = failedWithChange The new current link is the link which now follows the link which preceeded the old current link at the time the insert was attempted. |
| 1 = Unconditional Update | 0 = successfulAsRequested The newly inserted link is now the current link. 1 = failedWithoutChange Either the link to be inserted was NULL, or the mutator was in the inactive state. | 0 = successfulAsRequested The newly inserted link is now the current link. 1 = failedWithoutChange Either the link to be inserted was NULL, or the mutator was in the inactive state. 3 = failedWithChange The new current link is the link which now follows the link which preceeded the old current link at the time the insert was attempted. |
| 2 = Unconditional Reset | 0 = successfulAsRequested The mutator has been reset to the inactive state. 1 = failedWithoutChange Either the link to be inserted was NULL, or the mutator was in the inactive state. | 0 = successfulAsRequested The mutator has been reset to the inactive state. 1 = failedWithoutChange Either the link to be inserted was NULL, or the mutator was not in the active state. 3 = failedWithChange The new current link is the link which now follows the link which preceeded the old current link at the time the insert was attempted. |

SharedListAtomicMutator<T> Objects

This is a concrete class deriving from SharedListMutator<T> 403. Objects of this class have an atomic view of the list, which means they can be sure that no other mutator is processing the list. Objects of this class can iterate through the list, either forward or backward, and can insert or remove links, into or from, the list. Because of the atomic view, this class also provides the following functions:

T* getLastLink( ): This function returns a pointer to the last link in the list. The mutator will be in the active state after this function has been invoked, unless there are no links in the list. In that case, the NULL pointer will be returned, and the mutator will be in the transition state.

T* getPrevLink( ): This function "backs up" the mutator to the previous link in the list. It sets its current link to the previous link in the list and returns a pointer to it. However, the actual results depend on the state of the mutator before the function is invoked. If the mutator is in the active state and the front of the list is not reached, it will remain in the active state. If the mutator is in the transition state and the front of the list is not reached, it will move to the active state. If the mutator is in the active or transition state and the front of the list is reached, it will move to the inactive state, and the NULL pointer will be returned. If the mutator is in the inactive state, it will remain in the inactive state, and the NULL pointer will be returned.

T* removeLastLink(MutatorControl, MutatorResult&): This method removes the last link from the list, and returns a pointer to it. NULL is returned if there were no links in the list. The MutatorResult parameter is updated to indicate whether the function succeeded and its affect on the mutator's current link. Refer to Table 1 for a description of the contexts in which the various MutatorResult values may be returned.

T* removeBeforeArbitraryLink(T* refLink, MutatorControl, MutatorResult&): This method removes from the list, the link which immediately precedes the specified arbitrary link, and returns a pointer to it. NULL is returned if the specified arbitrary link was the first link in the list. The MutatorResult parameter is updated to indicate whether the function succeeded and its affect on the mutator's current link. Refer to Table 1 for a description of the contexts in which the various MutatorResult values may be returned.

SharedListNonatomicMutator<T> Objects

This is a concrete class deriving from SharedListMutator<T> 403. Objects of this class can iterate forward through the list, and can insert or remove links, into or from, the list while other objects of the same class are also mutating it.

Summary of SharedListIterator<T> Concurrent Access

Table 8 summarizes the conflicts that can occur between two iterators attempting to simultaneously access their SharedList<T> object, based on their types. If two iterators have a list-level conflict they cannot access the list at the same time. (An iterator whose lock on the list is scoped to its existence will wait during its construction for the conflicting access to be resolved. An iterator whose lock is dynamic, not scoped to its existence, will wait at the point it moves from the inactive state or begins a mutating function, and will release its lock whenever it is in the inactive state and not performing a mutating function). If two iterators have a link-level conflict, they can access the list at the same time, but will have to take turns when referencing the same link pointers.

TABLE 8

Summary of Access Conflicts for SharedListIterator<T> Objects

|  | Nonatomic Inspector | Nonatomic Mutator | Atomic Inspector | Atomic Mutator |
| --- | --- | --- | --- | --- |
| Nonatomic Inspector | (none) | Link-level* | (none) | Link-Level* |
| Nonatomic Mutator | Link-level* | Link-level | List-level | List-level |
| Atomic Inspector | (none) | List-level | (none) | List-level |
| Atomic Mutator | Link-level* | List-level | List-level | List-level |

*Nonatomic inspectors never have to wait for mutators in link-level conflicts. The mutators, however, have to wait for the nonatomic inspectors to move away from the conflicting links.

Client Responsibilities

Clients using a SharedList<T> object are expected to observe certain conventions to avoid improper references and so forth. I.e., the client should use the defined interface, rather than attempt to manipulate pointers directly. Additionally, the client should verify the correctness of certain parameters when invoking functions related to the SharedList<T> object, e.g., the client should not attempt to insert a link into a list which is already in the list. An exhaustive list of such possible items is not included herein.

One of the more important client responsibilities is to guarantee that any references to arbitrary links passed when invoking functions such as insertBeforeArbitraryLink( ), removeArbitraryLink( ), etc., are in fact references to links in the list, and will in fact remain in the linked list for the duration of the operation (unless removed by a mutator as described herein).

Clients may choose either to derive their classes from SharedList<T> and the appropriate iterators, or to wrapper those classes with classes of their own. Wrapping can be used to hide the MutatorControl parameter on the mutator functions, and to hide any functions which should not be exposed (perhaps functions which refer to arbitrary links).

LINKED LIST STRUCTURE: INTERNAL OPERATION

Introduction

SharedChain and SharedChainIterator Objects

The SharedList<T> and SharedListIterator<T> objects described thus far provide the interfaces to the client, but they are only wrappers around the real objects where all of the work is done. The wrapper classes provide the templatization by casting between the T* and the internal representation of pointers to links. All of their functions are inline and simply call outline functions on the inner objects, so templatizing over different client objects does not appreciably increase code size.

The inner objects are the ones that are described in the remainder of this application. They are arranged in the same hierarchy as the wrapper objects, and support the same interface functions, plus a lot of additional internal functions. The implementation of the functions of the wrapper classes is simply to invoke the corresponding functions on the inner classes.

Figure 5A:
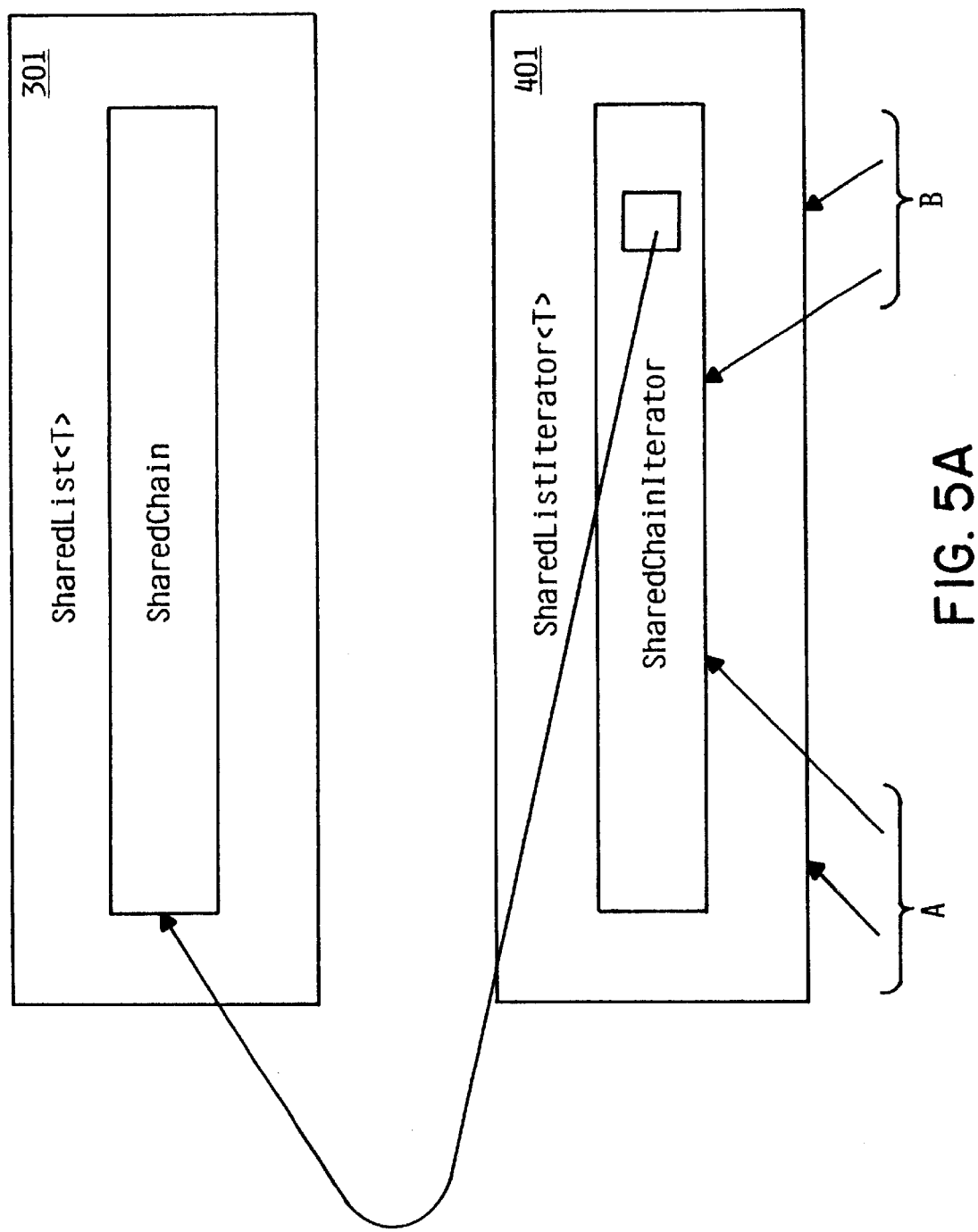
FIG. 5 shows the relationships between the various external and internal classes and their inheritance hierarchies, according to the preferred embodiment.
Figure 5B:
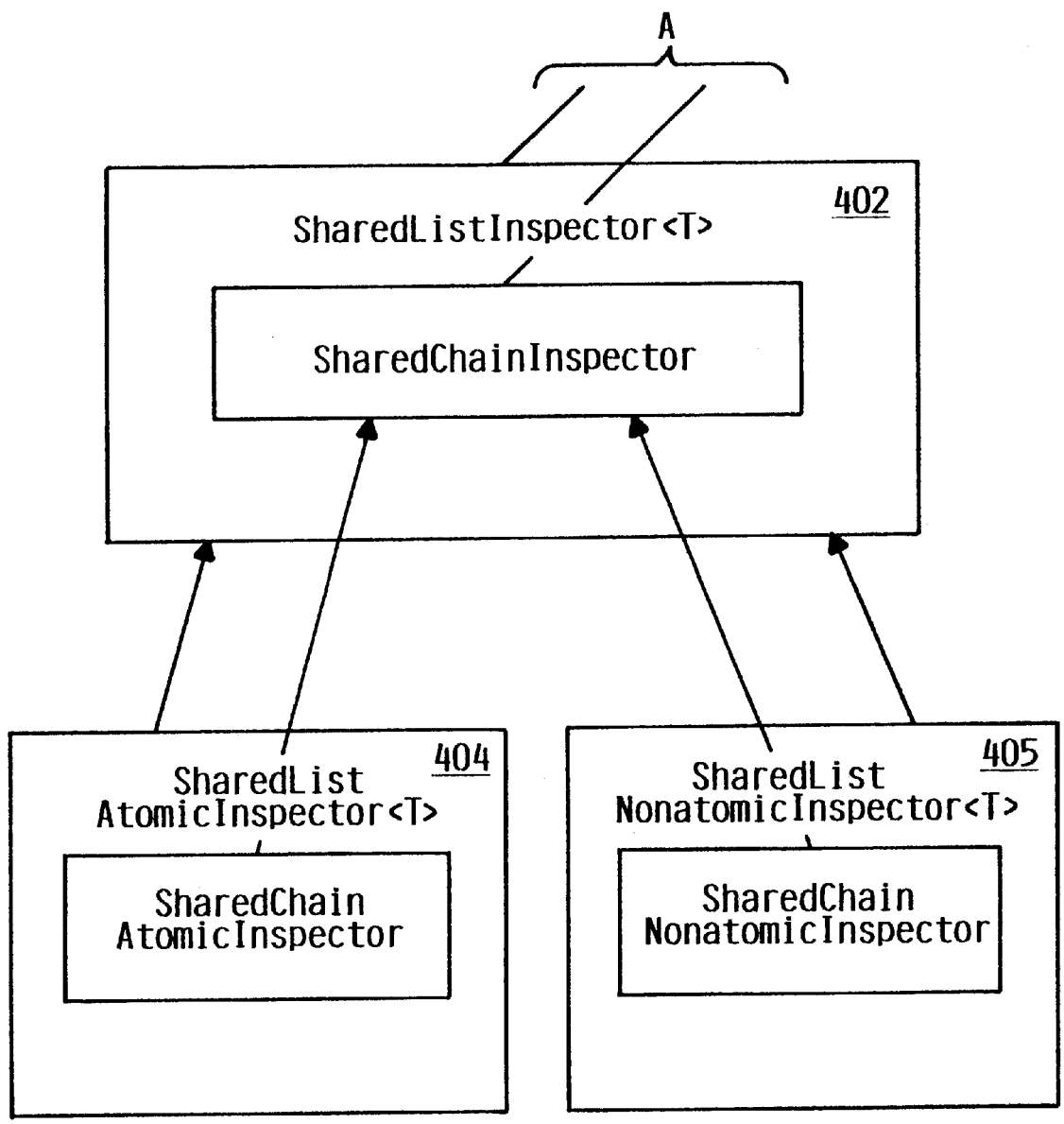
Figure 5C:
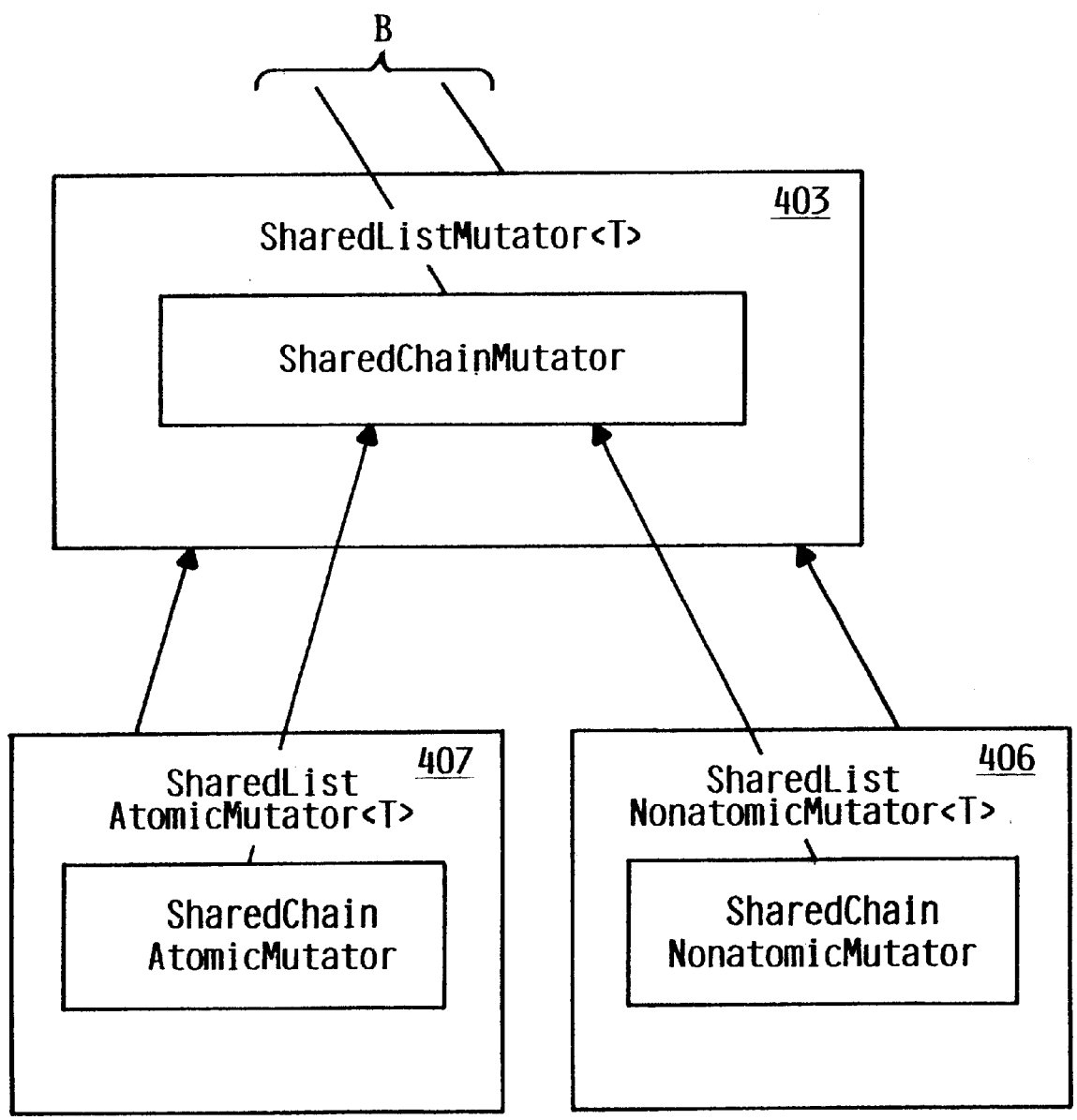

FIG. 5 shows the relationships between the various external and internal classes and their inheritance hierarchies. The following observations will be made. The names are similar: The "List" term in the wrapper class names is replaced by the term "Chain" in the inner classes, and the templatization is removed. The iterator class hierarchies are identical, except for the name change. The SharedChainIterator base class has a pointer to the SharedChain object to which it belongs.

Helper Objects

Besides the SharedChain and SharedChainIterator objects, there are some internal objects listed below that are used in the implementation.

SharedChainBlocker Objects: SharedChainBlocker objects (also called simply "blocker objects") are used by mutators to perform the link blocking and unblocking, and the necessary synchronization with other nonatomic iterators (inspectors and mutators). The SharedChain object maintains a pool of blocker objects, and associates one of them with a mutator for the duration of its mutating function. Blocker objects and the blocking and unblocking of link pointers are described in more detail later.

SharedChainView Objects: The SharedChainView class is an abstract base class. Objects deriving from this class are used by iterators to perform the actual iterating functions, and to synchronize with (other) mutators. There are two types of view objects, deriving from this base class: SharedChainAtomicView, and SharedChainNonatomicView.

SharedChainAtomicView: This type of object is constructed within an atomic iterator (inspector or mutator). It knows how to work with the links in the chain, knowing that no (other) mutator can insert or remove links. SharedChainAtomicView objects are quite simple, and basically contain a pointer to the iterator's current link.

SharedChainNonatomicView: This type of object (also called simply "view object") is used by nonatomic inspectors and nonatomic mutators. It knows how to work with the links in the chain, knowing that (other) mutators may also be inserting or removing links. The SharedChain object maintains two pools of SharedChainNonatomicView objects, one for use by nonatomic inspectors, and the other for use by nonatomic mutators. It associates one of the view objects with a nonatomic iterator (inspector or mutator) while that iterator is in the active or transition state. Nonatomic view objects are described in more detail later.

Additional helper objects not described herein may be employed to support additional secondary functions, for code debug, for system performance analysis, or for other purposes.

Operation Overview

Figure 6:
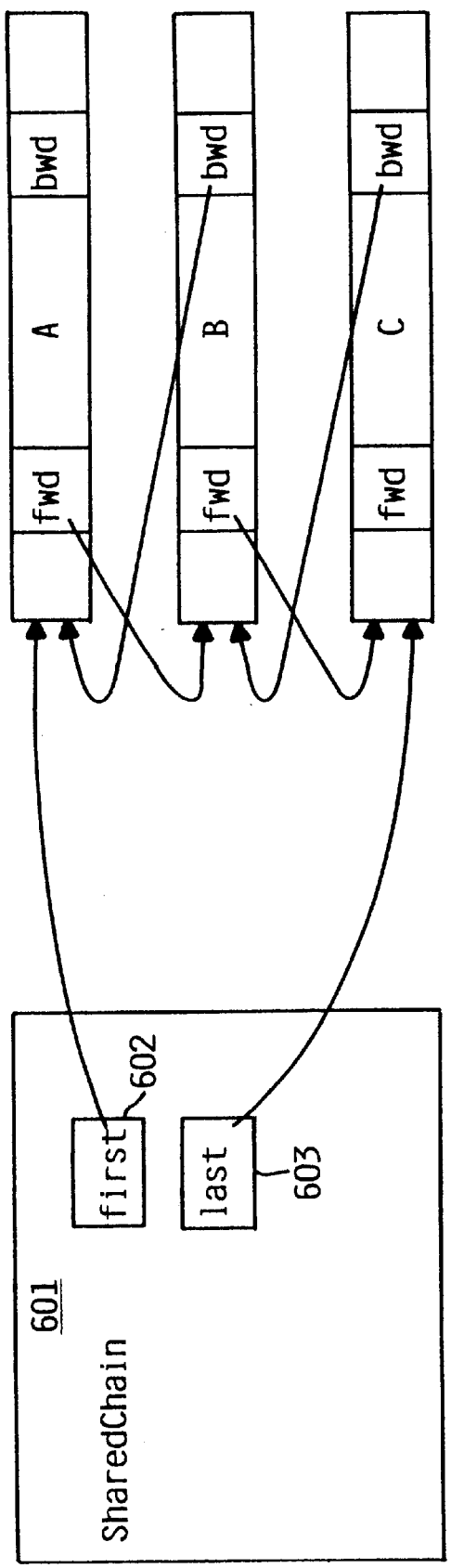
FIG. 6 shows an simplified view of an example SharedChain object with three links, according to the preferred embodiment.

The SharedChain object maintains a pointer to the first link in the chain, and a pointer to the last link in the chain. Neighboring links point to one another forwards and backwards. The forward pointer in the last link, and the backward pointer in the first link are NULL. FIG. 6 shows an simplified view of an example SharedChain object 601 with three links.

Since atomic inspectors can be sure that there are no mutators working with the linked list, they are free to follow link pointers forwards and backwards. They are dismissed as rather trivial, leaving atomic mutators, nonatomic mutators, and nonatomic inspectors to be described in greater detail.

In the description which follows, atomic mutators are described in some detail. However, it should be understood that atomic mutators (as well as atomic inspectors) are provided in the preferred embodiment for reasons of backward compatibility, for supporting possible specialized operating system functions, and similar reasons. The thrust of the present invention is to avoid the use of list-level locking mechanisms when possible, and support for atomic mutators is not necessarily essential to practicing the present invention.

Nonatomic Iterators

Nonatomic inspectors only traverse the chain. Since they have a nonatomic view of the chain, it does not matter whether they see any particular link that may be being inserted or removed as they advance. It only matters that they can safely advance from one link to the next, and that while a particular link is their current link, it cannot be removed from the chain.

Nonatomic mutators may also traverse the chain, and like nonatomic inspectors, they must be able to safely advance from one link to the next and be sure that their current link cannot be removed from the chain. However, because they can insert or remove links based on their current link (perhaps the chain is maintained in some priority order, for example), it also matters that the previous link cannot be removed, and that no other link can be inserted between their current link and the previous link.

Mutators

To insert a link, a mutator needs to initialize the forward and backward pointers within the new link to refer to the next and previous links respectively, and change the forward pointer in the previous link, and the backward pointer in the next link, to refer to the new link. To remove a link, a mutator needs to change the forward pointer in the previous link to refer to the next link, and change the backward pointer in the next link to refer to the previous link.

Since the multiple updates cannot be done atomically, they are done one at a time by first blocking all of the affected link pointers in a well-defined order. (Blocking is described in more detail later). A mutator which has blocked a link pointer has reserved the right to change it. The fact that a link pointer has been blocked prevents other mutators from blocking it or traversing through it. Once a mutator has blocked all of the affected link pointers it then unblocks them by replacing them with their intended new values (again in a well-defined order), thus inserting or removing the desired link.

Interactions Between Iterators and Mutators

To insert or remove a link, a mutator first blocks all of the affected link pointers. A nonatomic inspector is not affected by a blocked link pointer. It is able to advance through the blocked link pointer and establish the next link in the chain as its (new) current link. An iterating (nonatomic) mutator is stopped by a blocked link pointer. As it advances and encounters a blocked link pointer, it must wait for the link pointer to be unblocked. Another mutator will fail in its attempt to block a link pointer which is already blocked. It may choose to wait for the link pointer to be unblocked, and when it is unblocked, the mutator must try again to block the link pointer.

Once a mutator has blocked all of the link pointers necessary to insert or remove a link, it must wait for all (nonatomic) inspectors and iterating (nonatomic) mutators which are dependent on any of the blocked link pointers, to advance beyond them. The blocking mutator indicates to each such iterator that the iterator must notify the mutator when it has advanced beyond the affected link pointers, and then waits for all such notifications to occur.

Finally, once a mutator is sure that there are no iterators which are dependent on the blocked link pointers, it unblocks them, thus inserting or removing the desired link. Once a link pointer is unblocked, it may be traversed by other iterators, or blocked by another mutator, without any knowledge that it had been recently unblocked. Meanwhile, if there were other mutators which were waiting for the link pointers to be unblocked, the unblocking mutator awakens them. As a result of being awakened, all iterating mutators which were waiting on the blocked forward link pointer will have atomically completed their advance and will have established as their new current link, the link to which the unblocked forward pointer now points. All blocking mutators which were waiting on a blocked link pointer will have to retry their attempt to block the link pointer, now that it has been unblocked.

Iterating

When a nonatomic iterator (inspector or mutator) is in the active or transition state, there is a SharedChainNonatomicView object associated with it. It is this view object which gives the iterator its ability to iterate through the chain and to keep track of its current link. The SharedChain object maintains two lists of these view objects. One list is used by nonatomic inspectors, and the other by nonatomic mutators. When a nonatomic iterator moves from the inactive state, an available view object is found in the appropriate list and assigned to it. If all view objects in the list are busy, a new one is created and added to the list. When the iterator is reset to the inactive state, the view object is available for reuse by another nonatomic iterator (of the same type).

A SharedChainNonatomicView object contains information identifying the iterator's current link. Since all view objects exist in one of two lists, as mutators insert or remove links, they can find all of the view objects and determine which ones are dependent upon the link pointers they are modifying, and can interact with them appropriately.

An iterator traverses the links in the chain through a process that is somewhat like mathematical induction: It needs a way to move from the inactive state to the first link (or to the link after an arbitrary link), and a way to advance from any link to the next link. The iterator's SharedChainNonatomicView object has two fields to keep track of its current link:

curLink 706 contains the address of the iterator's current link. While this field points to a link, that link cannot be removed from the chain.

curPtr 705 contains the address of a forward pointer within a link. While an iterator has a current link, the forward pointer to which this field points depends on whether the iterator is an inspector or a mutator. For an inspector, this field points to the forward pointer within the current link. For a mutator, this field points to the forward pointer within the previous link (which, unless blocked, would point to the current link). This also prevents that previous link from being removed from the chain, and prevents another link from being inserted between the previous and current links.

Figure 7:
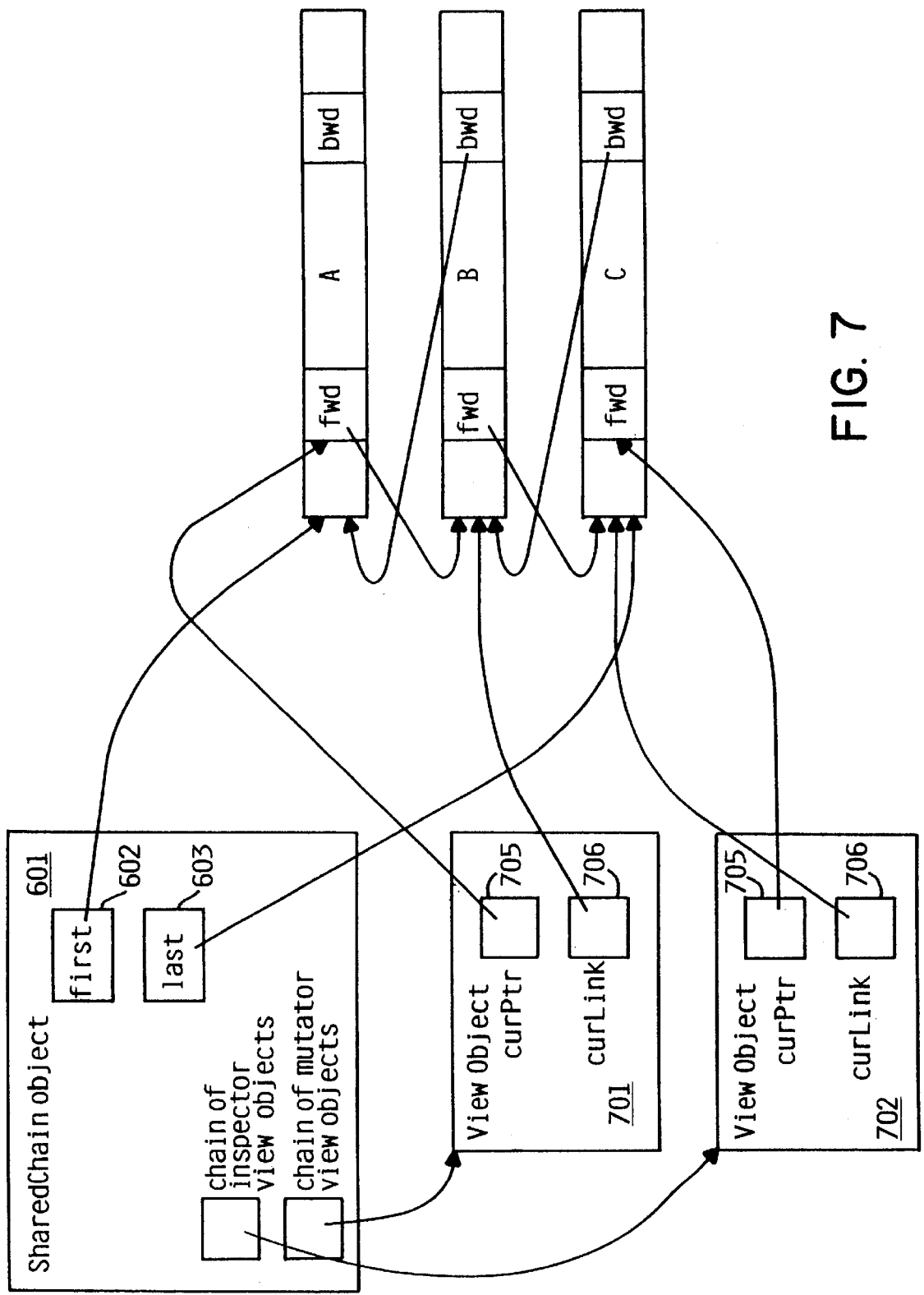
FIG. 7 shows how view objects are used to reference elements in a linked list, according to the preferred embodiment.

FIG. 7 shows the view object 701 for an iterating nonatomic mutator and the view object 702 for a nonatomic inspector 702. The nonatomic mutator sees "link B" as its current link because in its view object, curLink points to "link B" and curPtr points to the forward pointer within "link A". The nonatomic inspector sees "link C" as its current link, because in its view object, curLink points to "link C" and curPtr points to the forward pointer within "link C".

Starting an Iterator—Getting a Pointer to the First Link

The following describes the process of updating curLink 706 and curPtr 705 when starting an iterator. In this description, little consideration is given to interactions with blockers, as most of that is described in detail later.

1. When the getFirstLink( ) function is invoked to move the iterator to the active state, a view object is assigned to the iterator.
2. The curPtr 705 is set so that it points to first_link_pointer field 602 within the SharedChain object.
3. Using an algorithm which is described in more detail later, curPtr 705 is de-referenced to get a pointer to the first link, and its address saved in curLink 706. The first link in the list has now become the iterator's current link. Referring to FIG. 7, curPtr would point to the first_link_pointer field 602 within the SharedChain object 601, and curLink would point to "link A". At this point, "link A" can no longer be removed from the chain, and no link can be inserted ahead of it.
4. If the iterator is a mutator, then this is where the process stops. If the iterator is an inspector, curPtr 705 is set so that it points to the forward pointer within the current link. Again, referring to FIG. 7, this still prevents "link A" from being removed from the chain, but now allows other links to be inserted ahead of it.

Advancing an Iterator—Getting a Pointer to the Next Link

Inspectors and mutators use the same steps to set curLink 706 and curPtr 705 when they advance, but they do them in the opposite order.

1. When the getNextLink( ) function is invoked, if the iterator is an inspector, skip to step 2. If a mutator, the same processing is now done that was described above in step 4 for an inspector getting a pointer to the first link: Set curPtr 705 so that it points to the forward link pointer within the current link. Referring to FIG. 7, curPtr 705 would point to the forward pointer within "link A", and curLink 706 would point to "link A". This still prevents the current link ("link A") from being removed from the chain, but the previous link is no longer protected, and other links can now be inserted immediately before the current link.
2. Using the same algorithm which is described in more detail later, curPtr 705 is dereferenced to get a pointer to the next link, and the address is stored in curLink 706. This has now become the iterator's new current link. Referring to FIG. 7, curPtr would point to the forward pointer within "link A", and curLink would point to "link B". At this point, neither "link A" nor "link B" can be removed from the chain, and no link can be inserted between them.
3. If the iterator is a mutator, then this is where the process stops. If the iterator is an inspector, curPtr 705 is set so that it points to the forward link pointer within the current link. Again, referring to FIG. 7, this still prevents "link B" from being removed from the chain, but provides no protection for "link A" and allows other links to be inserted between them.

Advancing to the End of the Chain

Eventually when an iterator advances to the end of the chain, NULL is returned for the current link. If the iterator is an inspector, it is then reset to the inactive state. This causes its view object to be reset so that it has no current link, and to be disassociated from the iterator and available for reuse by another nonatomic inspector.

However, if the iterator is a mutator, it is now in the transition state, and the view object must be retained, with curPtr 705 pointing to the forward pointer within the last link, and curLink 706 containing NULL. In this state, the last link in the chain cannot be removed, and another link cannot be inserted after it. However, the insertBeforeCurrentLink( ) function can be invoked on this mutator, and it would add the new link to the end of the chain. Otherwise, the reset( ) function can be invoked on the mutator to move it to the inactive state. Resetting the mutator causes its view object to be reset so it has no current link, and to be disassociated from the mutator and available for reuse by another nonatomic mutator.

Interacting with Blocking Mutators

There are two points at which an advancing iterator may interact with blocking mutators. When an iterator changes the curPtr 705 field in its view object, that is when it is considered to have advanced to the next link. It is while changing curPtr that an advancing iterator notices whether a blocking mutator is waiting on it, to be notified when it advances. When an iterator de-references the (new) curPtr field in its view object, it may discover that the link pointer is blocked. An inspector will be able to advance through a blocked link pointer, but a mutator will have to wait for the link pointer to be unblocked.

Blocking a Link Pointer

Figure 8:
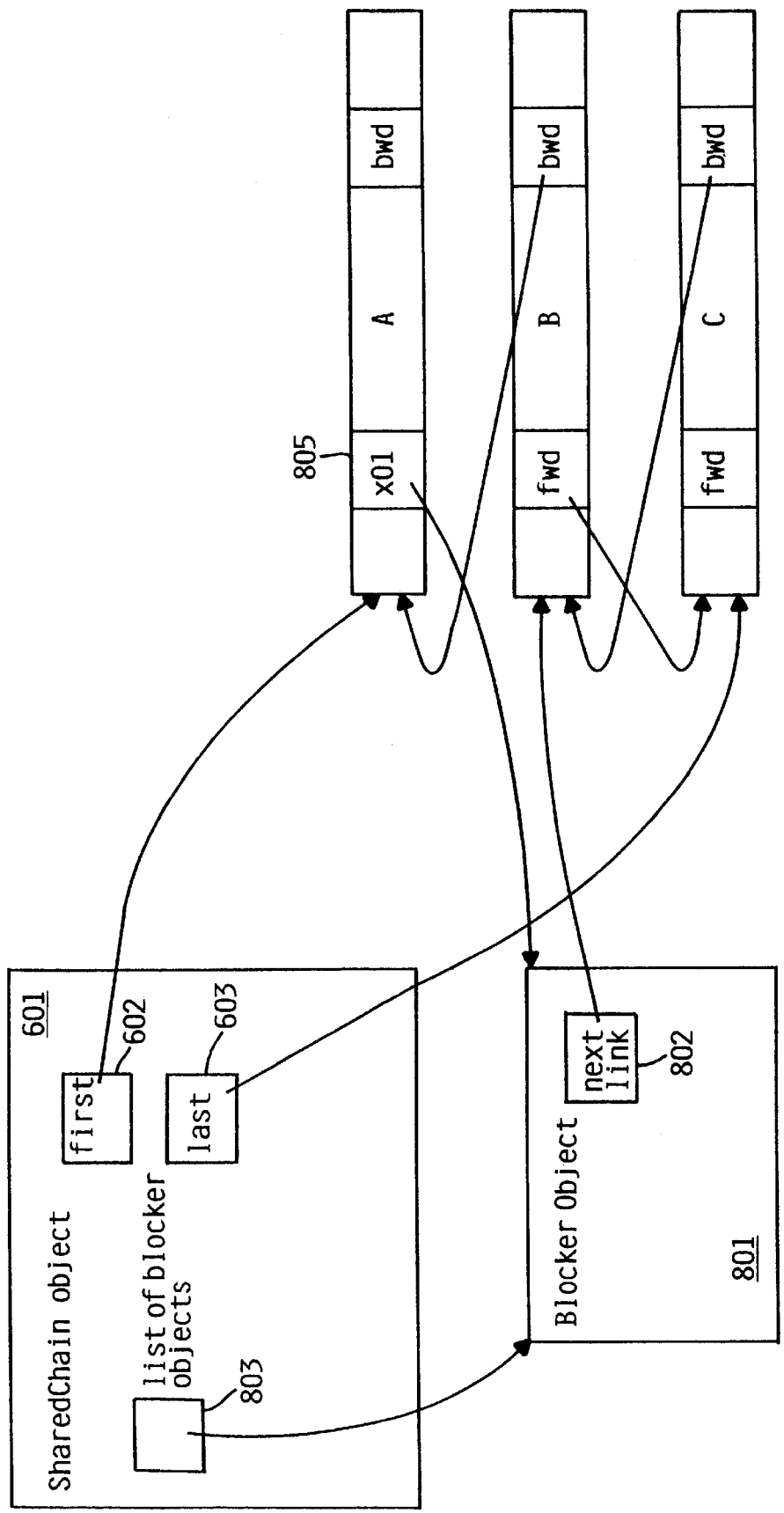
FIG. 8 shows the relationships among SharedChain objects, blocker object, and links, showing a example of a blocker object which has blocked a link, according to the preferred embodiment.

FIG. 8 shows the relationships among SharedChain objects, blocker object, and links. When a mutator (atomic or nonatomic) is inserting or removing a link, it has a SharedChainBlocker object 801 associated with it. It is the blocker object that gives the mutator its ability to block and unblock link pointers, and to interact with other mutators or iterators (waiting for, and awakening one another as necessary). The SharedChain object 601 maintains a list of blocker objects, and contains a pointer 803 to the first blocker object on the list. When a mutator begins a mutating function, an available blocker object is found in the list and assigned to it. If all blocker objects in the list are busy, a new one is created an added to the list. When the mutating function completes and there are no more outstanding references to the blocker object, it is available for reuse by another mutating function.

A mutator blocks a link pointer in order to gain exclusive use of that link pointer. It blocks the link pointer by changing it so that it no longer points to the neighboring link, but to the mutator's blocker object, while atomically extracting the original contents of the link pointer. When blocking a forward link pointer, its original contents are also atomically stored within the blocker object itself (in next_link field 802), so nonatomic inspectors can traverse through a blocked link pointer.

Changing a link pointer has consequences for all other iterators which reference it, and there is preferably a way to determine, simply by looking at it, whether the link pointer points to the neighboring link, or to a blocker object. In the environment of the preferred embodiment, both links and blocker objects must reside on at least an M-byte boundary, so that the low-order N bits of their addresses are always known to be zero. In the preferred embodiment, M is 16, and N is 4. These bits in forward and backward link pointers can therefore be used as flags. There is more detail later, but for now it is sufficient to say that when those bits are off, the link pointer points to the neighboring link, and that when a mutator stores the address of its blocker object in a link pointer, it always does so with the low-order (x01) bit on. This bit is the indication that the link pointer is blocked and (by masking off the low-order 4 bits), points to a blocker object.

FIG. 8 shows a blocker object 801 which has blocked the foward link pointer 805 within "link A". Other iterating mutators and blocking mutators which encounter the blocked link pointer will have to wait for it to be unblocked. Inspectors which encounter the blocked link pointer can get the pointer to "link B" from within the blocker object (via next_link field 802), and do not have to wait for the link pointer to be unblocked.

Atomic Mutators

This section describes the processing involved in the various mutating functions of an atomic mutator. Because of the mutator's atomic view of the chain, it can freely follow the forward and backward pointers within the links, and that helps to simplify the process. However, it provides a good orientation that may be helpful when later considering nonatomic mutators. Refer to the previous figure as necessary to help keep track of the various link pointers.

Inserting a Link, Atomic Methods

There are various functions (methods) which can insert a new link into the chain. All of them can be thought of as simple front-ends which locate the previous link and then perform the steps explained in Inserting a Link Common Atomic Procedure.

insertAfterArbitraryLink( ): This method inserts a new link immediately after the specified arbitrary link (which is assumed to be in the chain). The steps of Inserting a Link, Common Atomic Procedure are performed, passing a reference to the arbitrary link, which will serve as the previous link.

insertAfterCurrentLink( ): This method inserts a new link immediately after the mutator's current link. If the mutator has no current link, the method fails. Otherwise, the steps of Inserting a Link, Common Atomic Procedure are performed, passing a reference to the current link as the previous link.

insertFirst( ): This method inserts a new link as the first link in the chain. The steps of Inserting a Link, Common Atomic Procedure are performed, passing NULL as a reference to the previous link.

insertBeforeArbitraryLink( ): This method inserts a new link immediately before the specified arbitrary link (which is assumed to be in the chain). It follows the backward pointer within the arbitrary link to locate the previous link. The steps of Inserting a Link, Common Atomic Procedure are performed, passing a reference to the previous link.

insertBeforeCurrentLink( ): This method inserts a new link immediately before the mutator's current link. If the mutator has no current link, the method fails. Otherwise, the backward pointer within the current link is followed, to locate the previous link, and the steps of Inserting a Link, Common Atomic Procedure are performed, passing a reference to the previous link.

insertLast( ): This method inserts a new link as the last link in the chain. It gets a pointer to the link which is currently last from the last_link_pointer field 603 within the SharedChain object. The steps of Inserting a Link, Common Atomic Procedure are performed, passing a reference to the last link as the previous link.

Inserting a Link, Common Atomic Procedure

This procedure completes the insertion of a new link immediately after the previous link. A reference to the previous link is passed as an input parameter.

1. The count of links in the chain is incremented.
2. The forward pointer within the previous link is located. However, if the previous link is NULL, it means the new link will be inserted as the first link in the chain. In that case, the function locates the first_link_pointer field 602 within the SharedChain object.
3. The pointer located in step 2 is followed to the next link.
4. The backward pointer within the next link is located. However, if the next link is NULL, it means the new link will be inserted as the last link in the chain. In that case, the function locates the last_link_pointer field 603 within the SharedChain object.
5. The new link's forward pointer is initialized to point to the next link, and its backward pointer to point to the previous link. If the link has defined a field to point to the chain object, that field is initialized as well.
6. The forward pointer within the previous link (located in step 2) is blocked. This also atomically stores a pointer to the next link in the next_link field 802 within the blocker object. (This allows any nonatomic inspectors to advance through the blocked link pointer to the next link).
7. The next_link field within the blocker object is changed to point to the new link. This will ensure that from now on, any nonatomic inspectors which advance through the blocked link pointer will see the newly inserted link.
8. The method waits for any nonatomic inspectors which were in the process of advancing through the blocked link pointer to the next link (not the new link), to have completed their advance.
9. The backward pointer within the next link (located in step 4) is changed to point to the new link.
10. The forward pointer within the previous link (blocked in step 6) is changed to point to the new link.

Removing a Link, Atomic Methods

There are various functions (methods) which can remove a link from the chain. All of them can be thought of as simple front-ends which locate the previous link, and then perform the steps explained in Removing a Link, Common Atomic Procedure, immediately following.

removeArbitraryLink( ): This method removes a specified arbitrary link (which is assumed to be in the chain). It follows the backward pointer in the arbitrary link, to locate the previous link. It then performs the steps of Removing a Link, Common Atomic Procedure, passing a reference to the previous link.

removeLastLink( ): This method removes the last link from the chain. If last_link_pointer field 603 within the SharedChain object is NULL, there is no link to remove. Otherwise, it follows last_link_pointer field 603 to locate the last link in the chain, and follows the backward pointer within it to locate the previous link. It then performs the steps of Removing a Link, Common Atomic Procedure, passing a reference to the previous link.

removeFirstLink( ): This method removes the first link from the chain. It then performs the steps of Removing a Link, Common Atomic Procedure, passing NULL as a reference to the previous link.

removeBeforeArbitraryLink( ): This method removes the link which is immediately before the specified arbitrary link (which is assumed to be in the chain). If the backward pointer within the arbitrary link is NULL, there is no link to remove. Otherwise, it follows the backward pointer within the arbitrary link to locate the link which is to be removed, and follow the backward pointer within it to locate the previous link. It then performs the steps of Removing a Link, Common Atomic Procedure, passing a reference to the previous link.

removeAfterArbitraryLink( ): This method removes the link which is immediately after the specified arbitrary link (which is assumed to be in the chain). It then performs the steps of Removing a Link, Common Atomic Procedure, passing a reference to the arbitrary link as the previous link.

removeCurrentLink( ): This method removes the mutator's current link. If the mutator has no current link, then there is no link to remove. Otherwise, it follows the backward pointer within the current link to locate the previous link. It then performs the steps of Removing a Link, Common Atomic Procedure, passing a reference to the previous link.

removeAfterCurrentLink( ): This method removes the link which follows the mutator's current link. It then performs the steps of Removing a Link, Common Atomic Procedure, passing a reference to the current link as the previous link.

Removing a Link, Common Atomic Procedure

The steps described below are performed to complete the removal of a link. A reference to the previous link is passed as an input parameter. The link to be removed is the one which immediately follows the previous link.

1. The forward pointer within the previous link is located. However, if the previous link is NULL, then the link being removed is the first link in the chain. In that case, the function locates first_link_pointer field 602 within the SharedChain object.
2. If the link pointer located in step 1 is NULL, there is no link to be removed. Otherwise, the method blocks that link pointer and continues with the following steps. (Blocking the link pointer atomically stores a pointer to the link which is being removed into the next_link field 802 within the blocker object. This allows any nonatomic inspectors which encounter the blocked forward link pointer within the previous link, to step through the blocked link pointer and find the link which is yet to be removed.)
3. The link which is to be removed is located, using the old value of the link pointer which was blocked in step 2.
4. The method blocks the forward pointer within the link being removed. This also atomically stores a pointer to the next link in the next_link field 802 within the blocker object. From this point on, any nonatomic inspectors encountering the blocked forward pointer within either the previous link or the link being removed will no longer see the link which is being removed, but will skip over it, seeing the next link instead.
5. The method waits for any (nonatomic) inspectors which either are still advancing to the link which is being removed, or whose current link is the link which is being removed, to have advanced beyond it.
6. The next link is located from the old value of the link pointer blocked in step 4.
7. The method locates the backward pointer within the next link. However, if the next link is NULL, then the link being removed is the last link in the chain. In that case, it locates last_link_pointer field 603 within the SharedChain object.
8. The backward pointer located in step 7 is changed to point to the previous link.
9. The forward pointer in the previous link, which was blocked in step 2, is changed to point to the next link.
10. The count of links in the chain is decremented.
11. The forward and backward link pointer fields (and optional chain pointer field if it is defined) within the removed link are set to NULL.

Considerations for the Atomic Mutator's Current Link

A mutator may or may not have a current link when it begins to perform a mutating function. If an atomic mutator has a current link, it may retain that current link through any insert or remove function it performs, unless it is removing the link which happens to be its current link. In that case, either the mutator must be reset, or a new current link must be chosen. It may also be reasonable to assign a current link to a mutator, or change the mutator's current link, when it performs a mutating function. In either case, since the mutator has an atomic view, these considerations are not of great significance. However, these considerations are more significant with nonatomic mutators, and in the interest of compatability with them, atomic mutator functions take an input MutatorControl parameter, and return (or update) a MutatorResult, and support all of the options pertaining to the current link.

Nonatomic Mutators

This section describes the processing involved in the various mutating functions of a nonatomic mutator. The mutator's nonatomic view makes it more complex to follow and block link pointers, since other nonatomic mutators may also be trying to block them as well. Special care must be taken to avoid deadlocks. Link pointers must be blocked and unblocked in well-defined sequences. In some cases it is necessary to suspend a tentatively blocked link pointer, temporarily deferring to another mutator. With two exceptions (insertAfterCurrentLink( ) and removeAfterCurrentLink( )), a mutator cannot maintain a current link while it is performing a mutating function. A new current link (which retains the mutator's place in the chain) can be assigned to the mutator as the mutating function completes, however. ps Inserting a Link, Nonatomic Methods In order to insert a link into the chain, there are two link pointers which must first be blocked: the forward pointer within the previous link, and the backward pointer within the next link. The block of the forward pointer in the previous link is the key block. Once this link pointer has been blocked, it determines where the new link will be inserted.

Figure 9:
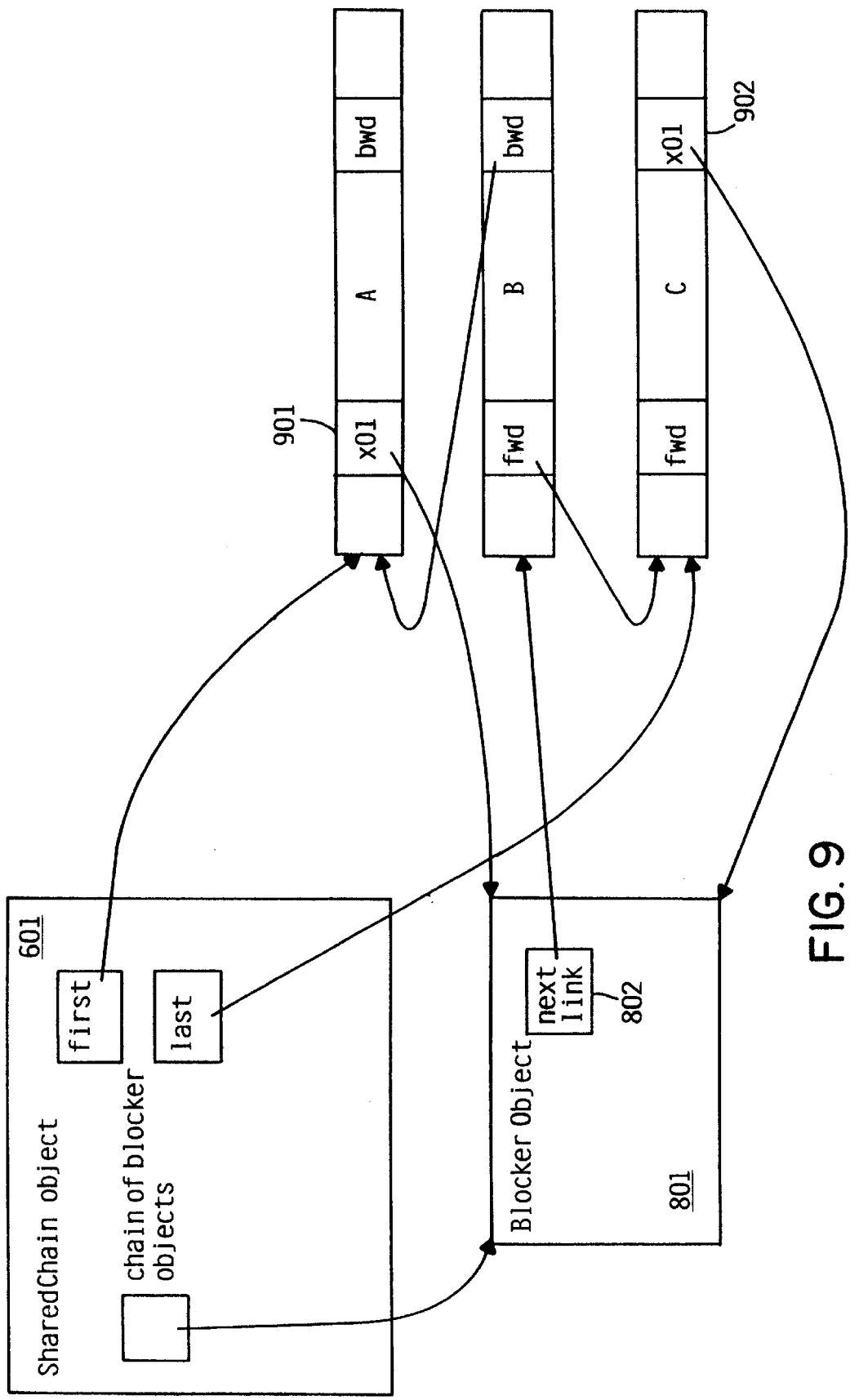
FIG. 9 shows an example of a blocker object for a mutator which has blocked the link pointers necessary to insert a link into the chain between two other links, according to the preferred embodiment.

FIG. 9 shows a blocker object for a mutator which has blocked the link pointers necessary to insert "link B" into the chain between "link A" and "link C". The blocked link pointers (i.e., the forward link pointer 901 in "link A" and backward link pointer 902 in "link C") both point to the blocker object, with the x01 bit set on. The next_link field 802 within the blocker object points to "link B", so that nonatomic inspectors which encounter the blocked forward pointer within "link A" will see "link B" as the next link.

There are various methods which can insert a link into the chain. All of them can be thought of as front-ends to get started, and then go on to other methods to continue.

insertFirst( ): This method locates the first_link_pointer field 602 within the SharedChain object. This is the link pointer which must be blocked first, and will eventually point to the newly inserted link, which will then be the first link in the chain. The steps of Inserting a Link, Common Nonatomic Procedure, are performed, passing a reference to the first_link_pointer field 602 within the SharedChain object.

insertAfterArbitraryLink( ): The specified arbitrary link will be the previous link. The method locates the forward pointer within it. This is the link pointer which must be blocked first, and will eventually point to the newly inserted link, which will then immediately follow the specified arbitrary link. The steps of Inserting a Link, Common Nonatomic Procedure, are performed, passing a reference to the forward pointer within the specified arbitrary link.

insertAfterCurrentLink( ) If the mutator's current link is NULL, then the function must fail. Otherwise, it uses the following steps to attempt to insert the new link immediately after the current link. It is possible that this function may fail, leaving the mutator with a new current link, but maintaining "its place in the chain".

(a) The curLink field 706 within the mutator's view object 702 points to the current link. The mutator attempts to block the forward link pointer within the current link. It waits and retries the block attempt as necessary, as long as the link pointer is not blocked by a mutator which intends to remove that link. If the block attempt is successfully made, it continues to step (b). Otherwise the block attempt failed because another mutator has already blocked the link pointer and committed to remove the link containing it (this mutator's current link). That other (blocking) mutator will also have blocked the forward pointer in the previous link (to which this mutator's curPtr 705 points). The blocking mutator will know nothing of this mutator's failed attempt to block the link pointer, but may (eventually) see it simply as an iterating mutator that is attached to the blocked link pointer, and if so, will wait for it to advance. To avoid a deadlock, this mutator's view object is moved out of the blocking mutator's way. To do this, rather than advancing forward, this mutator's view object is instead changed so that it appears to be just advancing to the blocked forward pointer within the previous link (where its curPtr points). If necessary, it notifies the blocking mutator that it has advanced, and then waits for the blocking mutator to unblock its link pointers. When the blocking mutator unblocks them, it will see this waiting mutator's view object and will set curLink 706 within it to point to its new current link (completing its advance), and will awaken it (as it would for any iterating mutator which was waiting on the blocked link pointer). When awakened, this mutator will retain its same position in the chain (ie curPtr 705 in its view object will be unchanged), but because it will have a new current link, it does not make sense to retry the insert function. Instead, it exits, returning a failure indication to the client, who can invoke the getCurrentLink( ) function and examine the new current link and determine what to do from there.

(b) If the mutator is not to retain its current link, the mutator's view object is reset. If it is to have a new current link, that will be re-established later.

(c) The method blocks the backward pointer within the next link, waiting and retrying as necessary, until it is successfully blocked. (If the next link is NULL, it blocks the last_link_pointer field 603 within the SharedChain object, instead). However, if the link pointer to block is tentatively blocked by another mutator, it doesn't try to block the link pointer. Instead, it uses the link transfer mechanism (detailed later) to wait for permission from that other mutator to use the link pointer. (That other mutator will use the link transfer mechanism to suspend its block on the link pointer and will give permission to use it, and will then wait for permission to resume).

(d) The steps of Inserting a Link, Common Nonatomic Procedure, are performed, beginning with step 11.

insertLast( ): This method locates the last_link_pointer field 603 within the SharedChain object. This is the link pointer which will eventually point back to the newly inserted link, which will then be the last link in the chain. The steps of Inserting a Link, Common Nonatomic Procedure, beginning with step 6, are performed, passing a reference to the last_link_pointer field 603 within the SharedChain object.

insertBeforeArbitraryLink( ): The specified arbitrary link will be the next link. The method locates the backward pointer within it. This link pointer will eventually point back to the newly inserted link, which will then immediately precede the specified arbitrary link. The steps of Inserting a Link, Common Nonatomic Procedure, beginning with step 6, are performed, passing a reference to the backward pointer within the specified arbitrary link.

insertBeforeCurrentLink( ): If the mutator is in the inactive state, then there is no place to insert the new link, and the function must fail. Otherwise, use the following steps to attempt to insert the new link immediately before the current link. It is possible that this function may fail, leaving the mutator with a new current link, but maintaining "its place in the chain".

(a) The curPtr 705 field within the mutator's view object points to the forward link pointer within the previous link. The mutator attempts to block this link pointer, but does not retry or wait for it to succeed. If the block attempt is successfully made, it continues to step (b). Otherwise, the block attempt failed because another mutator had already blocked the link pointer. That other (blocking) mutator will know nothing of this mutator's failed attempt to block the link pointer, but may (eventually) see it simply as an iterating mutator that is attached to the blocked link pointer, and if so, will wait for it to advance. To avoid a deadlock, this mutator's view object is moved out of the blocking mutator's way. To do this, rather than advancing forward, this mutator's view object is instead changed so that it appears to be just advancing to the blocked link pointer, and if necessary, the blocking mutator is notified that this mutator has advanced. This mutator then waits for the blocking mutator to unblock its link pointers. If the blocked link pointer was blocked by a mutator which intended to remove the link containing the pointer, then it will also have blocked the forward pointer in the previous link. In that case, this mutator's view object is moved so that it appears to just be advancing to that previous pointer, and if necessary, the blocking mutator is notified of the advance. This mutator then waits for the blocking mutator to unblock its link pointers. At that time, the blocking mutator will see this waiting mutator's view object, will set curLink 706 within it to point to the link following the link which was removed (completing its advance), and will awaken it as it would for any iterating mutator which was waiting on the blocked link pointer. When awakened, this mutator will have a new curPtr 705, but will have the same curLink 706. The insert is then retried by returning to the beginning of step (a). However, if the blocked link pointer was blocked by a mutator which does not intend to remove the link containing the pointer, this mutators's view object is moved so that it appears to just be advancing to the blocked link pointer, and if necessary, the blocking mutator is notified of the advance. This mutator then waits for the blocking mutator to unblock its link pointers. At that time, the blocking mutator will see this waiting mutator's view object, will set curLink 706 within it to point to the link following the link which was removed (completing its advance), and will awaken it as it would for any iterating mutator which was waiting on the blocked link pointer. When awakened, this mutator will retain its same position in the chain (ie curPtr 705 in its view object will be unchanged), but because it will have a new current link, it does not make sense to retry the insert function. Instead, it exits, returning a failure indication to the client, who can invoke the getCurrentLink( ) function and examine the new current link and determine what to do from there.

(b) At this point, the forward pointer in the previous link has been successfully blocked. If the mutator is to retain its current link, the curPtr field within its view object it changed to point to the forward pointer within the link that is being inserted. (This is safe because no other iterator can see this new link yet). Otherwise, the mutator's view object is reset so that it no longer has a current link. This is necesesary to avoid a potential deadlock, and the current link is no longer needed to identify which link to insert before. The mutator's current link can be re-established later if desired.

(c) The mutator blocks the backward pointer within the (former) current link, waiting and retrying as necessary until it is successfully blocked. (If the (former) current link was NULL, it blocks last__link__pointer field 603 within the SharedChain object, instead). However, if the link pointer to block is tentatively blocked by another mutator, it doesn't try to block the link pointer. Instead, it uses the link transfer mechanism (detailed later) to wait for permission from that other mutator to use the link pointer. (That other mutator will use the link transfer mechanism to suspend its block on the link pointer and will give permission to use it, and will then wait for permission to resume).

(d) The steps of Inserting a Link, Common Nonatomic Procedure, are performed.

Inserting a Link, Common Nonatomic Procedure

This is a continuation of the functions described above. There are multiple starting points: the insertFirst( ), and insertAfterArbitraryLink methods begin at step 1, with a reference to the forward pointer within the previous link passed as an input parameter, while the insertLast( ) and insertBeforeArbitraryLink( ) methods begin at step 6, with a reference to the backward pointer within the next link passed as an input parameter. The insertBeforeCurrentLink( ) and insertAfterCurrentLink( ) methods begin as step 11.

1. The mutator is reset to ensure that it does not have a current link. This is necessary to avoid a deadlock. The mutator's current link can be re-established later if desired.

2. The mutator blocks the forward pointer within the previous link, waiting and retrying as necessary until it is blocked successfully. Blocking this pointer returns a pointer to the next link in the list, and it also atomically stores a pointer to that link in the next link field 802 within the blocker object. The new link will be inserted between the previous and next links.

3. The backward pointer within the next link is located. However, if the next link is NULL, it locates the last__link__pointer field 603 within the SharedChain object.

4. The mutator blocks the link pointer located in step 3, waiting and retrying as necessary until it is successfully blocked. However, if the link pointer is tentatively blocked by another (blocking) mutator, it doesn't try to block the link pointer. Instead, it uses the link transfer mechanism to wait for permission from the blocking mutator to use the link pointer. (The blocking mutator will use the link transfer mechanism to suspend its block on the link pointer, giving permission to this mutator to use it, and will then wait for permission to resume).

5. Continue to step 11.

6. The mutator is reset to ensure that it does not have a current link. This is necessary to avoid a deadlock. The mutator's current link can be re-established later if desired.

7. The mutator blocks the backward pointer within the next link, waiting and retrying as necessary until it is successfully blocked. Blocking this link pointer returns a pointer to the previous link. This block is tentative, and will have to be suspended if the block yet to be attempted in step 4 cannot be made successfully. A flag in the blocked link pointer (not shown in the figures) indicates that it is blocked tentatively.

8. The forward pointer field within the previous link is located. However, if the previous link is NULL, the first__link__pointer field 602 within the SharedChain object is located instead.

9. The mutator attempts to block the link pointer located in step 8, but does not retry or wait for it to succeed. If the block attempt is successful, it continues to step 10. Otherwise, the block attempt failed because the link pointer was already blocked by another (blocking) mutator. The blocking mutator is either removing the previous link, or inserting a new link after it. In either case, the blocking mutator will eventually need to block the link pointer which was tentatively blocked in step 7. When it determines that the link pointer is blocked tentatively, it will use the link transfer mechanism to wait for permission to use it. This mutator uses the link transfer mechanism to suspend the link pointer, giving the blocking mutator permission to use it, while retaining the block made in step 7. In giving permission to use the blocked link pointer, it gives the blocking mutator a pointer to the previous link. This mutator then uses the link transfer mechanism to wait for the blocking mutator to finish, at which time it will give permission to resume, passing back a pointer to the new previous link. With a pointer to the new previous link, this mutator goes back to step 8 to try again to block the forward link pointer within it.

10. At this point the block in the forward pointer of the previous link has been successfully made, and the pointer to the next link has been atomically set in the next__link field 802 within the blocker object. There is no longer any reason for the block made in step 7 to be tentative, so a flag within the blocked link pointer is set off, indicating it is no longer tentative.

11. The count of links in the chain is incremented.
12. The forward and backward pointers within the new link are set to point to the next and previous links respectively. If defined, the optional chain pointer field is set to point to the SharedChain object.
13. The blocker's next_link field 802 is set to point to the new link. Hereafter, any inspectors which encounter the blocked forward link pointer within the previous link will see the new link.
14. The mutator waits for any advancing nonatomic iterators (inspectors or mutators) which are dependent on the blocked forward link pointer, to advance beyond it. These would be iterators which arrived at the forward link pointer before it was blocked, or inspectors which are in the process of advancing through the blocked link pointer to the next (not the new) link.
15. The steps of Inserting or Removing a Link, Common Nonatomic Procedure, are performed to finish the insertion process.

Removing a Link, Nonatomic Methods

Figure 10:
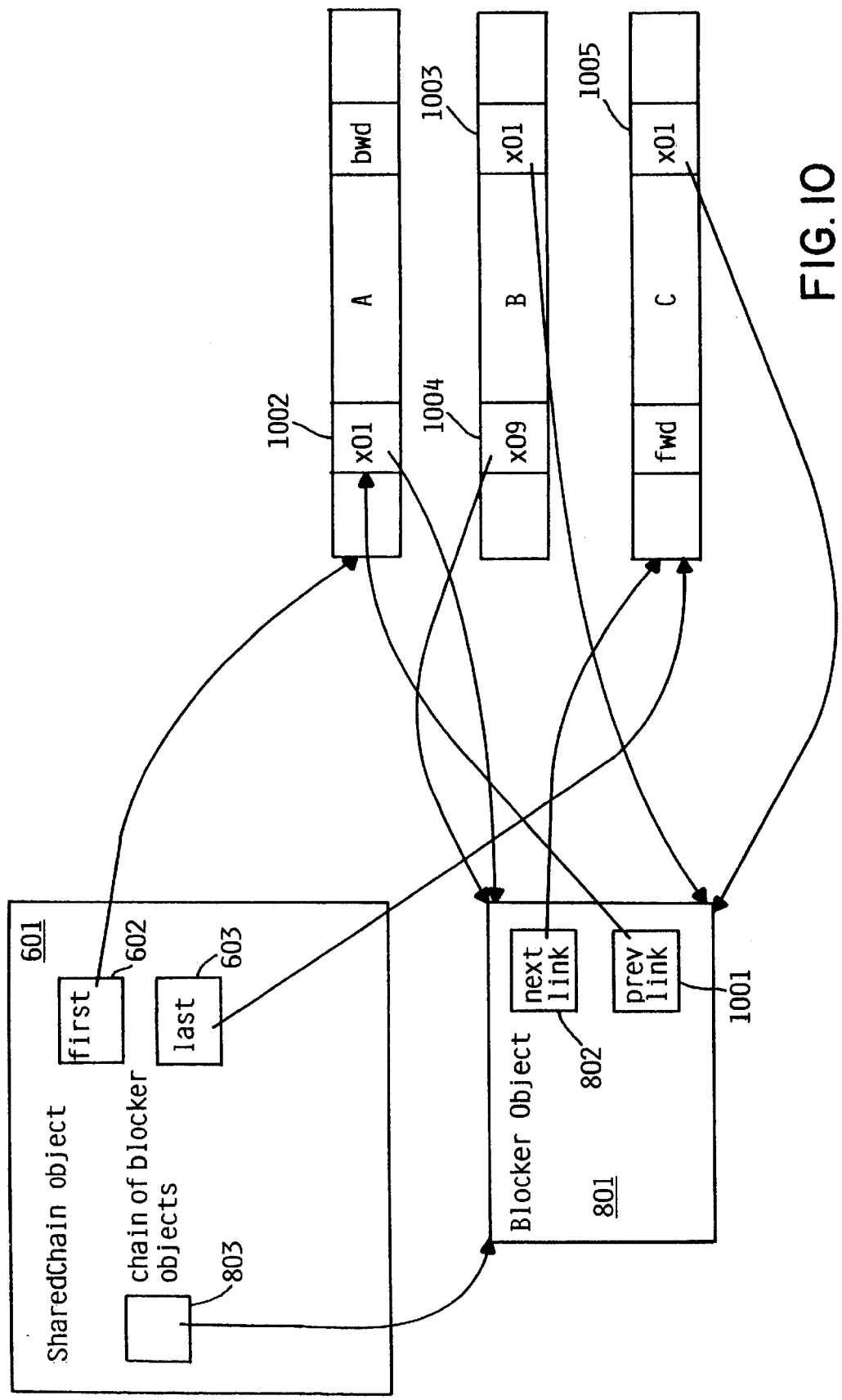
FIG. 10 shows an example of a blocker object for a mutator which has blocked the link pointers necessary to remove a link from the chain, according to the preferred embodiment.

Referring to FIG. 10, in order to remove a link from the chain, there are four link pointers which must first be blocked: (a) the forward pointer 1002 within the previous link; (b) the backward pointer 1003 within the link being removed; (c) the forward pointer 1004 within the link being removed; and (d) the backward pointer 1005 within the next link. The block on the forward pointer in the previous link is the key block. Once this block has been made, it determines which link will be removed.

FIG. 10 shows a blocker object for a mutator which has blocked the link pointers necessary to remove "link B" from the chain. The blocked link pointers all point to the blocker object, with the x01 bit set on. (In addition, the forward pointer 1004 in the link being removed has the x08 bit also set on, to indicate that it is within a link that is being removed). The next_link field 802 within the blocker object points to "link C", so that nonatomic inspectors which encounter either the blocked forward pointer within "link A" or within "link B" will skip over "link B" and will see "link C" as the next link. The previous_link_pointer field 1001 within the blocker object points to the forward pointer within "link A". This is used in some cases by iterating mutators which encounter the blocked forward pointer within "link B", and need to move curPtr back to the forward pointer within "link A" in order to see "link C" as their new current link, after "Link B" is removed.

There are various functions which can remove a link from the chain. All of them can be thought of as front-ends to block the forward pointer within the previous link, which then perform the steps explained in Removing a Link, Common Nonatomic Procedure, to block the remaining link pointers and remove the link.

removeFirstLink( ): The mutator's view object is first reset to ensure that it does not have a current link. This is necessary to avoid a potential deadlock. The mutator's current link can be re-established later if desired. The mutator then blocks the first link_pointer field 602 within the SharedChain object, waiting and retrying as necessary until it is successfully blocked. Blocking that link pointer returns a pointer to the first link in the chain, which is the link which will be removed. The steps of Removing a Link, Common Nonatomic Procedure, are then performed, passing a reference to the blocked link pointer's view object.

removeAfterArbitraryLink( ): The mutator is first reset to ensure that it does not have a current link. The arbitrary link specified will be the previous link. The mutator blocks the forward pointer within it, waiting and retrying as necessary until it is successfully blocked. Blocking the link pointer returns a pointer to the link which immediately follows the arbitrary link, and is the link which will be removed. The steps of Removing a Link, Common Nonatomic Procedure, are then performed, passing a reference to the blocked link pointer.

removeArbitraryLink( ) Because of the mutator's nonatomic view of the list, locating the previous link and blocking its forward pointer is somewhat involved. The following steps are performed:

(a) The mutator's view object is reset to ensure that it does not have a current link.

(b) The mutator blocks the backward pointer within the arbitrary link being removed, waiting and retrying as necessary until it is successfully blocked. Blocking the link pointer returns a pointer to the previous link. This block is tentative, and will have to be suspended if the block yet to be attempted in step (d) cannot be made successfully. A flag in the blocked link pointer (not shown) indicates that it is blocked tentatively.

(c) The forward pointer within the previous link is located. However, if the previous link is NULL, first link pointer field 602 within the SharedChain object is located instead.

(d) The mutator attempts to block the link pointer located in step (c), but does not retry or wait for it to succeed. If the block attempt is successful, it continues to step (e). Otherwise, the block attempt failed because the link pointer is already blocked by another (blocking) mutator. The blocking mutator is either removing the previous link, or inserting a new link after it. In either case, it will eventually need to block the link pointer which was blocked tentatively in step (b). When the blocking mutator determines that the link pointer is blocked tentatively, it will use the link transfer mechanism to wait for permission to use the link pointer. This mutator uses the link transfer mechanism to suspend the blocked link pointer, giving the blocking mutator permission to use it, while retaining the block made in step (b). In receiving permission to use the blocked link pointer, the blocking mutator is given a pointer to the previous link. Then, using the link transfer mechanism, this mutator waits for the blocking mutator to finish, at which time the blocking mutator will give permission to resume, passing back a pointer to the new previous link. With a pointer to the new previous link, this mutator goes back to step (c) to try again to block the forward pointer within it.

(e) At this point the block in the forward pointer within the previous link has been successfully made, and there is no longer any reason for the block made in step (b) to be tentative. The flag in the blocked link pointer is set off, so that it is no longer tentative.

(f) The steps of Removing a Link, Common Nonatomic Procedure, are then performed, passing a reference to the blocked link pointer.

removeCurrentLink( ): If the mutator's current link is NULL, then there is no link to remove, and the function must fail. Otherwise, the function uses the following steps to attempt to remove the current link. It is possible that this function may fail, leaving the mutator with a new current link, but maintaining "its place in the chain".

(a) The curPtr field 705 within the mutator's view object points to the forward link pointer within the previous link. The mutator attempts to block this link pointer, but does not retry or wait for it to succeed. If the block attempt is successful, it continues to step (b). Otherwise, the block attempt failed because another (blocking) mutator has already blocked the link pointer. The blocking mutator will know nothing of this mutator's failed attempt to block the link pointer, but may (eventually) see it simply as an iterating mutator that is attached to the blocked link pointer, and if so, will wait for it to advance. To avoid a deadlock, this mutator's view object is moved out of the blocking mutator's way. To do this, rather than advancing forward, this mutator's view object is instead changed so that it appears to be just advancing to the blocked link pointer, and, if necessary, the blocking mutator is notified that it has advanced. This mutator then waits for the blocking mutator to unblock its link pointers. If the blocked link pointer was blocked by a mutator which intended to remove the link containing the pointer, then it will also have blocked the forward pointer in the previous link. In that case, this mutator's view object is moved so that it appears to just be advancing to that previous pointer, and if necessary, the blocking mutator is notified of the advance. This mutator then waits for the blocking mutator to unblock its link pointers. At that time, the blocking mutator will see this waiting mutator's view object, will set curLink 706 within it to point to the link following the link which was removed (completing its advance), and will awaken it as it would for any iterating mutator which was waiting on the blocked link pointer. When awakened, this mutator will have a new curPtr 705, but will have the same curLink 706. The remove is then retried by returning to the beginning of step (a). However, if the blocked link pointer was blocked by a mutator which does not intend to remove the link containing the pointer, this mutators's view object is moved so that it appears to just be advancing to the blocked link pointer, and if necessary, the blocking mutator is notified of the advance. This mutator then waits for the blocking mutator to unblock its link pointers. At that time, the blocking mutator will see this waiting mutator's view object, will set curLink 706 within it to point to the link following the link which was removed (completing its advance), and will awaken it as it would for any iterating mutator which was waiting on the blocked link pointer. When awakened, this mutator will retain its same position in the chain (ie curPtr in its view object will be unchanged), but because it will have a new current link, it does not make sense to retry the remove function. Instead, it exits, returning a failure indication to the client, who can invoke the getCurrentLink( ) function and examine the new current link and determine what to do.

(b) At this point, the forward pointer in the previous link has been successfully blocked. The mutator's view object is reset so that it no longer has a current link. This is necessary to avoid a potential deadlock, and the current link is no longer needed to identify which link to remove. The mutator's current link can be re-established later if desired.

(c) The steps of Removing a Link, Common Nonatomic Procedure, are then performed, passing a reference to the blocked link pointer.

removeAfterCurrentLink( ): If the mutator's current link is NULL, then the function must fail. Otherwise, the following steps are performed to attempt to remove the link immediately after the current link. It is possible that this function may fail, leaving the mutator with a new current link, but maintaining "its place in the chain".

(a) The curLink field 706 within the mutator's view object points to the current link. The mutator attempts to block the forward link pointer within the current link. It waits and retries the block attempt as necessary, as long as the link pointer is not blocked by a mutator which intends to remove that link. If the block attempt is successfully made, it continues to step (b). Otherwise the block attempt failed because another (blocking) mutator has already blocked the link pointer and committed to remove the link containing it (this mutator's current link). The blocking mutator will also have blocked the forward pointer in the previous link (to which curPtr points). The blocking mutator will know nothing of this mutator's failed attempt to block the link pointer, but may (eventually) see it simply as an iterating mutator that is attached to the blocked link pointer, and if so, will wait for it to advance. To avoid a deadlock, this mutator's view object is moved out of the blocking mutator's way. To do this, rather than advancing forward, this mutator's view object is instead changed so that it appears to be just advancing to the blocked forward pointer within the previous link (where curPtr 705 points), and if necessary, the blocking mutator is notified that it has advanced. This mutator then wait for the blocking mutator to unblock its link pointers. When it unblocks them, it will see this waiting mutator's view object and will set curLink within it to point to this mutator's new current link (completing its advance), and will awaken it (as it would for any iterating mutator which was waiting on the blocked link pointer). When awakened, this mutator will retain its same position in the chain (ie curPtr in its view object will be unchanged), but because it will have a new current link, it does not make sense to retry the remove function. Instead, it exits, returning a failure indication to the client, which can invoke the getCurrentLink( ) function and examine the new current link and determine what to do from there.

(b) If the mutator is not to retain its current link, the mutator's view object is reset. If it is to have a new current link, that will be re-established later.

(c) The steps of Removing a Link, Common Nonatomic Procedure, are then performed.

Removing a Link, Common Nonatomic Procedure

Arriving here, a reference to the forward pointer in the previous link is passed as an input parameter. This link pointer has already been blocked, atomically identifying the link which is to be removed, and setting next_link field 802 in the blocker object, to point to the link which is being removed. Inspectors which encounter the blocked forward link pointer can advance through it to find the link which is being removed. If the pointer to the link to be removed is NULL, then there is no link to be removed. In that case, the steps below are skipped, and the process continues to Inserting or Removing a Link, Common Nonatomic Procedure, to unblock the forward pointer in the previous link, and exit. Otherwise, the following steps are performed to remove the link.

1. The mutator locates the backward pointer 1003 within the link being removed, and if this mutator has not already blocked it, blocks it now, waiting and retrying as necessary. The only case in which this mutator would already have blocked it would be for removing an arbitrary link. (Note that if the backward link pointer is blocked by some other mutator, there is no deadlock in waiting for it to be unblocked: First, it could not have been blocked tentatively, because the only functions which could tentatively block the backward pointer within a link (not last_link_pointer field 603 within the SharedChain object) are functions which refer to that link as an arbitrary link, and that would be an invalid thing to do, since the link is being removed. Second, any mutator which would have blocked the backward pointer within the link would have already blocked the forward pointer in the previous link, and since that is no longer the case, the only possibility would be that the mutator has already unblocked the forward link pointer in the previous link and is about to unblock the backward pointer of interest here).
2. A pointer to the blocked forward pointer 1002 of the previous link is stored into the previous_link_pointer field 1001 in the blocker object. This will be needed once the link pointer is blocked in step 3, to allow other iterating mutators to back up to get out of the way of the link which is being removed.
3. The mutator locates the forward pointer 1004 within the link being removed and blocks it. Blocking the link pointer returns a pointer to the next link. It also sets next_link field 802 within the blocker object to point to the next link as well, so that hereafter, nonatomic inspectors can advance through the blocked link pointers to locate the next link, skipping over the link being removed. (If it is necessary to wait while blocking this ink, there is a special interface to do so, again involving the link transfer mechanism, as further explained later.)
4. The mutator waits for any advancing nonatomic iterators (inspectors or mutators) which are dependent on the blocked link pointers, to advance beyond them. These would be iterators which advanced to the blocked link pointers before they were blocked.
5. The backward pointer 1005 within the next link is located. However, if the next link is NULL, then the link being removed is the last link in the list. In that case, last_link_pointer field 603 within the SharedChain object is located.
6. The mutator blocks the link pointer located in step 5, waiting and retrying as necessary until it is successfully blocked. However, if the link pointer is tentatively blocked by another mutator, it doesn't try to block the link pointer. Instead, it uses the link transfer mechanism to wait for permission to use the link pointer. (The mutator which has it blocked will use the link transfer mechanism to suspend its block on the link pointer, giving permission to use it, and then waiting for permission to resume).
7. The count of links in the chain is decremented.
8. The forward and backward link pointers (and optional chain pointer if defined) within the link which is being removed are set to to NULL.
9. The steps of Inserting or Removing a Link, Common Nonatomic Procedure, are performed to finish the removal process.

Inserting or Removing a Link, Common Nonatomic Procdure

1. At this point, a new current link for the mutator can be established (or re-established) if desired. The only place where the mutator's view object can be safely attached to the chain is to the blocked forward link pointer within the previous link. The curPtr field 705 can be set to point to that forward link pointer, and the curLink field 706 can be set to point to the link to which that forward pointer will point when it is later unblocked. To be more specific, if a link is being removed, the mutator's current link can be set to point to the link which immediately follows the link which is being removed (the next link); if a link is being inserted, the mutator's current link can be set to point to the newly inserted link. (Note: for the insertAfterCurrentLink( ) or the removeAfterCurrentLink( ) functions, the mutator may have retained its current link. It can be left alone as is, or could be changed to point to the newly inserted link or the link following the link which was removed. (Or the mutator could be reset to the inactive state if that was desired, instead).
2. The forward link pointer within the previous link is unblocked, changing it to point to the next link (if a link was being removed) or to the new link (if a link was being inserted). Unblocking the link pointer changes it atomically, returning the value it contained when it was blocked. The blocked link pointer contains additional flags with indicate whether other iterating or blocking mutators are waiting for the link pointer to be unblocked. However, there is one special case that needs to be considered. If a blocking mutator which intends to remove the link containing the blocked forward link pointer, is waiting for that link pointer to be unblocked, that link pointer is not unblocked. Instead, the blocked forward link pointer is updated (atomically) so that it now appears to be blocked by that other mutator (pointing to its blocker object with the x09 bits on), which intends to remove the link containing it. Then the link transfer mechanism is used to give that mutator permission to use the link pointer, passing it the pointer to the next link (the value which would have otherwise been put in the link pointer when unblocking it).
3. The backward link pointer within the next link is unblocked, changing it to point to the previous link (if a link was being removed) or to the new link (if a link was being inserted). Unblocking the link pointer changes it atomically, returning the value it contained when it was blocked. The blocked link pointer contains additional flags which indicate whether other blocking mutators are waiting for the link pointer to be unblocked. However, if the link pointer was not blocked by this mutator, but is instead tentatively blocked by some other mutator, the link pointer must not be unblocked. Instead, that other mutator will have suspended its use of the link pointer, and will be waiting for permission to resume. In that case, the link transfer mechanism is used to give that mutator permission to resume, passing it a pointer to what for it will be a new previous link (the value which would otherwise have been put in the link pointer when unblocking it). (There are cases when removing a link, in which after blocking the forward link pointer in the previous link, it is determined that there is no link to be removed. In those cases, there is no blocked backward link pointer within the next link, so this step should be skipped entirely.)
4. If there are iterating mutators which are waiting for the forward link pointer in the previous link to be unblocked, they are awakened now. They can all be found by searching the list of view objects 701 for nonatomic mutators, located within the SharedChain object.
5. If there are blocking mutators which are waiting for either of the link pointers to be unblocked, they are awakened now. They can all be found by searching the list of blocker objects, starting from pointer 803 located within the SharedChain object.
6. At this point the insert or remove function is complete. The blocker object can be reused for another mutating function as soon as all other inspectors and mutators which were awakened no longer have a reference to it.

Considerations for the Nonatomic Mutator's Current Link

In order to avoid a deadlock, a nonatomic mutator must be reset (or at least its view object must be internally reset) so that it has no current link while it is performing a mutating function (except for the insertAfterCurrentLink( ) and removeAfterCurrentLink( ) functions). The only way a mutator has a chance of "keeping its place in the chain" through a mutating function is to allow it to re-establish a new current link when the function completes. It is also true that the only link which can safely become the new current link is the one link which allows the mutator to "keep its place". The mutator's state can be controlled with the MutatorControl values defined earlier.

LINKED LIST STRUCTURE: INTERNAL DETAILS

This section describes the details of the interactions between nonatomic view and blocker objects, and between blocker objects. Rather than the bigger picture described in the Internal Operation section above, this section will focus on individual interactions. One may refer back to the Internal Operation section to see where particular interactions fit into the big picture. For further aid in understanding the described embodiment, some additional examples and figures are used.

Data Areas and Definitions

Link Pointers

As mentioned earlier, the addresses of links in the chain are a multiple of bytes so that at least N low-order bits are zero (in the environment of the preferred embodiment, N is 4, the number of bytes being 16, it being understood that other values could be used, or that other mechanisms such as dedicated flag fields could be used instead of the flags in the addesses). These same N bits are also zero in the addresses of blocker objects, and so they are used as flags. Table 9 describes the meaning of each of the flag bits within the link pointers in the chain.

TABLE 9

Significance of Flag Bits in Link Pointers

| Bit | Meaning | Description |
|---|---|---|
| x01 | Blocked Link Pointer | When on, this flag indicates that the link pointer is blocked, and masking off the low-order N bits would yield a pointer to the blocker object belonging to the mutator which blocked it. The remaining flag bits would only be on when this bit is on. |
| x02 | Iterating Mutator Waiting | When on, this flag indicates that at least one iterating mutator is waiting (or is preparing to wait) for the link pointer to be unblocked. When the unblocking mutator unblocks the link pointer and sees this flag, it searches through the list of view objects for nonatomic mutators and awakens any of them which have committed to wait for this link pointer to be unblocked. This flag is only used in forward link pointers. |
| x04 | Blocking Mutator Waiting | When on, this flag indicates that at least one blocking mutator is waiting (or is preparing to wait) for the link pointer to be unblocked. When the unblocking mutator unblocks the link pointer and sees this flag, it searches through the list of blocker objects and awakens any mutators which have committed to wait for it to unblock its link pointers. This bit can be on in either a forward or backward link pointer. In a forward link pointer, it also has a special meaning in conjunction with the x08 bit described below. |
| x08 | Tentative Block | When on in a backward link pointer, this flag indicates that the block which exists on the link pointer is tentative and may be suspended. |
| x08 | Remove Pending | When on in a forward link pointer, this flag indicates that the link containing the forward pointer is about to be removed. The mutator which intends to remove the link has (also) blocked the forward pointer in the previous link. The exact meaning of this bit depends on the setting of the x04 bit:<br>If the x04 bit is off, then it means that the mutator which has blocked the link pointer is the one which intends to remove the link.<br>If the x04 bit is on, then it means that the mutator which is waiting to block the link pointer (there could only be one) intends to remove the link when it succeeds in blocking the link pointer. |

Updates to link pointers are made atomically, based on knowing the current value of the link pointer. In the preferred embodiment, a special system function, called compareAndSwap( ), is used to do this. Additionally, in some cases a special system function called compareAndSwapQualified( ) is used; this latter function performs a swap of a single pointer, but also compares a larger segment of storage (a quadword), providing a failure indication if any part of the larger segment of storage has changed during the operation. Similar functions may be used in other systems, or alternative means of atomicity may be employed during link pointer update operations.

Nonatomic View Objects

When a nonatomic iterator (inspector or mutator) is in the active or transition state, there is a view object associated with it. The view object contains two fields which keep track of the iterator's current link. As an iterator advances through the chain, these fields must be updated in a well-defined manner. They must be understood at all points in time, since mutators may be blocking and unblocking link pointers at any time, and need to determine whether a given view object is of any interest.

curPtr 705: This field contains a pointer to a forward link pointer. The forward link pointer it locates is either within the current link, or within the previous link. In the preferred embodiment, all link pointers within links are on an 8-byte boundary, and therefore at least the low-order 3 bits of their addresses are zero. Within the curPtr field, these bits are used as flags, as defined in Table 10.

TABLE 10

Significance of Flag Bits in curPtr

| Bit | Meaning | Description |
|---|---|---|
| x01 | Committed Waiter | When on, this flag indicates that the mutator which has blocked the link pointer to which curPtr points, has committed to wait for the iterator to which this view object belongs, to advance beyond the blocked link pointer. |
| x02 | Priority Bumped | This flag is only on if the x01 flag bit is on. When on, it indicates that the mutator which has committed to wait on the iterator has bumped the priority of the iterator's task. |
| x04 | Remove Waiting | This flag is only on if the x01 flag bit is on. When on, it indicates that the waiting mutator intends to remove the link which is the iterator's current link. In this case, the iterator should defer notifying the mutator that it has advanced, until it has advanced two links (technically, until it has made 2 updates to curPtr). | curLink 706: This field contains a pointer to the iterator's current link. Since links must be on a 16-byte boundary, at least the four low-order bits are zero within their addresses. Within the curLink field, three of these bits are used as flags, as defined in Table 11.

These fields are updated atomically, via the compareAndSwap( ) function. Since this function cannot update both fields as a single atomic operation, the compareAndSwapQualified( ) function is used, which updates a single field at a time, but which will fail if either field is updated in the meantime.

TABLE 11

Significance of Flag Bits in curLink

| Bit | Meaning | Description |
|---|---|---|
| x01 | Committed Waiter | When this flag is on, it indicates that the iterator has encountered a blocked link pointer, and has committed to wait for it to be unblocked. Instead of pointing to a link in the list, when this bit is on, curLink (masking off the four low-order bits) points to the blocker object which belongs to the mutator which has blocked the forward link pointer located by curPtr. This flag would only be on in view objects for mutators; inspectors can advance through blocked link pointers without waiting. |
| x02 | Priority Bumped | This flag is only on when the x01 flag bit is on. When on, it means that the waiting iterator has bumped the priority of the blocking mutator's task. |
| x04 | Priority Not Bumped | This flag is only on when the x01 flag bit is on. When on, it means that the waiting iterator has determined that it is not necessary to bump the priority of the blocking mutator's task. |

Besides the above bit flags, there are two special values which may appear in the curLink field 706:

In addition, a nonatomic view object has a priority bump uncertainty resolver object. This is a single task blocker

TABLE 12

Special Values in curLink

| Value | Meaning | Description |
|---|---|---|
| x00...02 | Transition | This special value indicates that in the process of advancing the iterator, curPtr has been set, but the result of dereferencing curPtr has not yet been set in curLink. A blocking mutator seeing this value in curLink would not be able to know whether the dereference of curPtr has occurred yet. |
| x00...04 | Miscompare | When a mutator which has just blocked or unblocked the link pointer to which curPtr points, sees the transition value in curLink, it cannot tell whether it is the old or the new value of the link pointer (from that mutator's perspective) that the advancing iterator is about to store into curLink. The mutator therefore attempts to change curLink to the miscompare value before the iterator stores what it dereferenced from curPtr there, to cause the iterator's attempt to store it, to fail. When the iterator fails to change curLink, it will dereference curPtr before trying to store again. In this way, the mutator can be sure of the value the iterator will dereference from curPtr and store in curLink. | object, i.e., a synchronizing mechanism that affects only one task. It is used at times when it is uncertain whether a mutator has bumped the priority of the iterator's task, to wait until the priority bump is certain. This is done to prevent a possible priority unbump from occurring before a possible priority bump.

Blocker Objects

When a mutator (atomic or nonatomic) is performing a mutating function, there is a blocker object associated with it. The blocker object contains several fields which define its state:

Activation Id: Each time a blocker object is assigned to a mutator, this field is assigned a unique number (unique with respect to the SharedChain object). If an inspector sees that a link pointer is blocked, then when it looks a second time to see whether it is (still) blocked, it can compare the Activation Id fields to know whether it is actually still blocked or has been blocked a second time. This field is assigned before the mutator uses the blocker to block any link pointers.

Next Link: This field contains a pointer to the next link in the list, and primarily allows inspectors to advance through a blocked forward link pointer. This field actually consists of two fields the primary and the secondary. Both are needed in order to make the field appear to be.atomically set when a link is being removed. When an iterator is advancing to the next link and encounters a blocked link pointer, it should normally use the primary field to find the next link. However, if the blocked link pointer is within a link which is to be removed by the mutator which blocked the pointer, then the iterator should use the secondary field to find the next link.

Waiting for Blocker: This field is used to indicate that the mutator which is using the blocker object is waiting for a second mutator which is using a second blocker object, to unblock its link pointers. Normally this field contains NULL, to indicate that the mutator is not waiting. When waiting, or preparing to wait on a second mutator, a pointer to that second mutator's blocker object is stored in this field. The low-order N bits of a blocker object's address are zero. In this field, the three low-order bits are used as flags. Table 13 describes the various flag bits, when a blocker address is stored.

because it finds curPtr to be blocked by the first mutator (which intends to remove the link containing the forward pointer to which curPtr points), will have to change curPtr to point to the forward pointer in the previous link. This field allows the iterating mutator to find the forward pointer in the previous link.

Status Control: This is a state counter object, i.e., a counter which is incremented or decremented by certain events, and upon which tasks may wait for the counter to reach a certain value. It is the primary mechanism that controls the wait/wake-up interactions between blocker and nonatomic view objects. This is described in more detail later.

Suspended Link Control: This is also a state counter object. It is the heart of the link transfer mechanism when used with suspended link pointers. This is described in more detail later.

Blocked Remove Control: This is also a state counter object. It is the heart of the link transfer mechanism when removing a link. This is described in more detail later.

Priority Bump Count: This field is used to accumulate the number of times the priority of the mutator's task has been bumped by waiters. The mutator will eventually unbump its own priority this number of times, after all waiters have been awakened.

Nonatomic View and Blocker Interaction Scenario

Figure 11A:
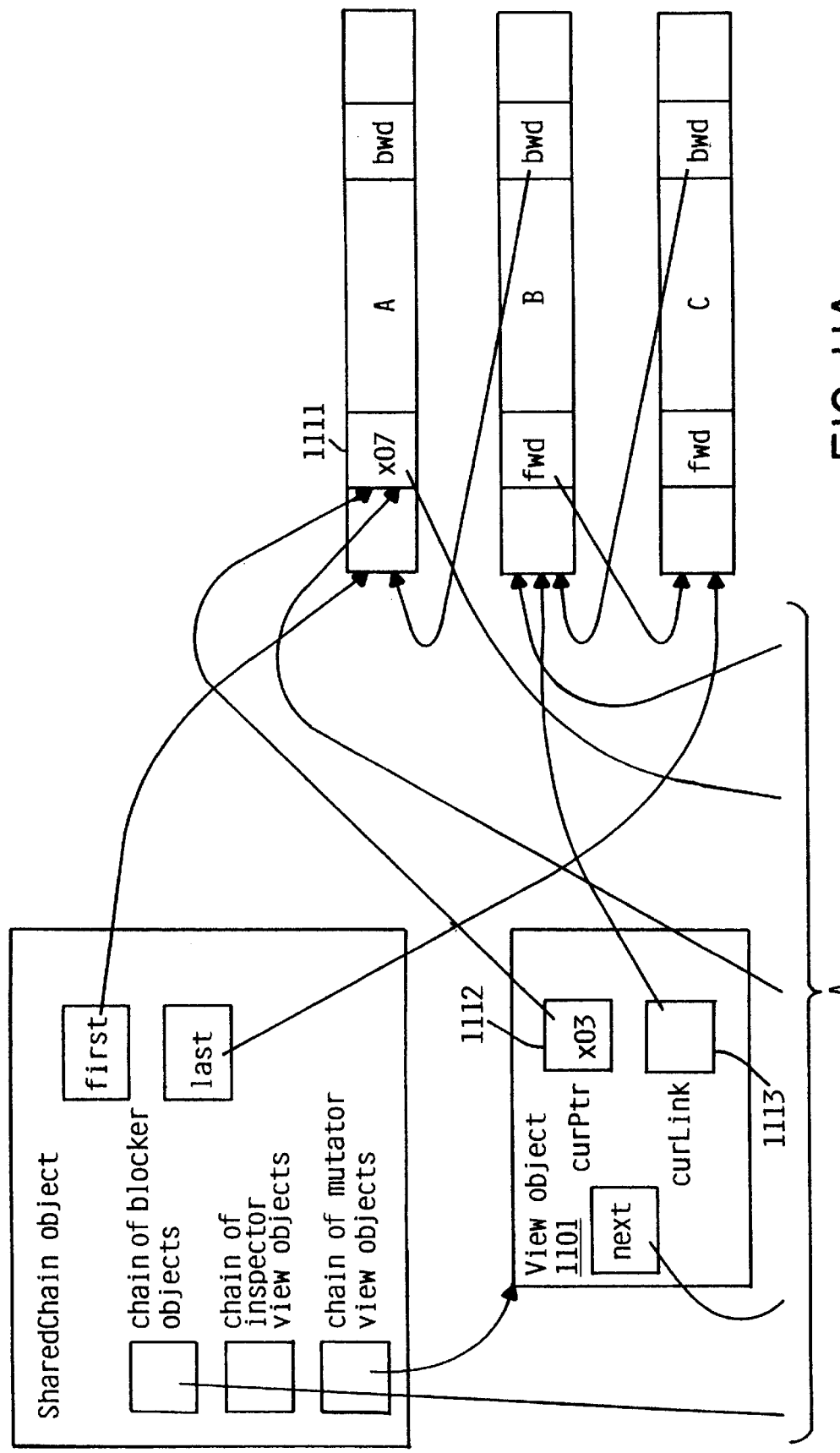
FIG. 11 shows an example of the interaction among multiple view objects and block objects for iterating mutators, according to the preferred embodiment.
Figure 11B:
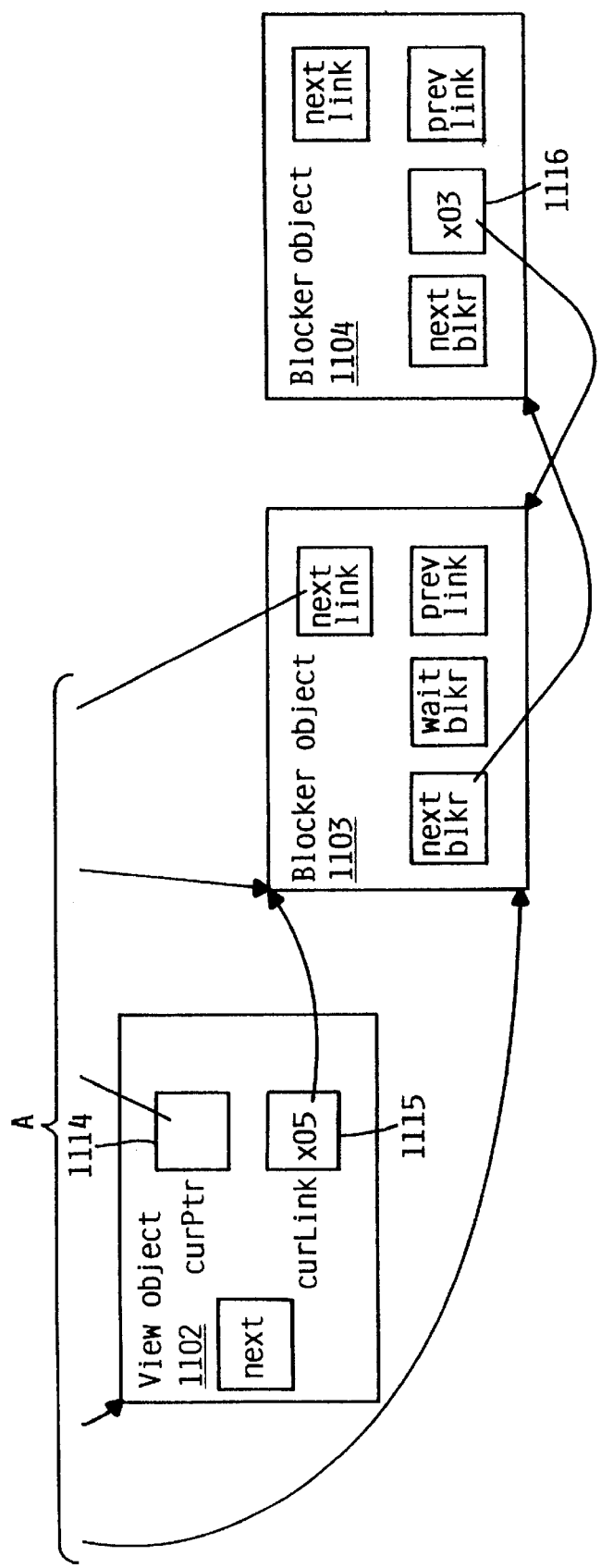

FIG. 11 shows an example of the interaction of the view objects for two iterating mutators, and the blocker objects for two blocking mutators, all working on the same link pointers. The scenario would have occurred as follows:

1. The mutator using view object 1101 arrived first at the forward pointer 1111 within "link A", making "link B" its current link. Its curPtr field 1112 points to the forward pointer 1111 within "link A", and its curLink field 1113 points to "link B".

2. The mutator using blocker object 1103 arrived next, intending to insert a link between "link A" and "link B", and blocked the forward pointer 1111 within "link A", setting on the x01 blocked_link_pointer flag there. It then looked through all of the view objects, found view object 1101 attached to the same forward link pointer, and set on the x01 committed_waiter and the x02 priority_bumped flags in curPtr 1112, committing it to wait for the iterator which owns view object 1101 to advance, and indicating that it had bumped the iterator's task's priority.

TABLE 13

Waiting For Blocker Flag Bits

| Bit | Meaning | Description |
| --- | --- | --- |
| x00 | Uncommitted | When all flag bits are off, the mutator is preparing to wait for the second mutator, but has not committed to wait yet. |
| x01 | Committed | When this flag bit is on, the mutator has committed to wait for the second mutator. |
| x02 | Priority Bumped | This flag is only on when the x01 flag bit is on. When on, it means that the mutator has bumped the priority of the second mutator's task. |
| x04 | Priority Not Bumped | This flag is only on when the x01 flag bit is on. When on, it means that the mutator has determined that it is not necessary to bump the priority of the second mutator's task. |

Previous Link Pointer: This field is used only when the mutator which is using the blocker object is removing a link. After blocking the forward pointer in the previous link, it stores a pointer to that link pointer in this field, and then goes on to block the forward pointer in the link which is being removed. A second mutator which then fails its attempt to remove its current link or to insert before it 3. Meanwhile the mutator using view object 1102 arrived at the forward link pointer 1111 within "link A" (setting its curPtr field 1114 to point to it), and found it blocked by the mutator using blocker object 1103. It set on the x02 iterating_mutator_waiting flag in the forward pointer 1111 within "link A" to indicate that (one or more) iterating mutators are waiting. Finally, it set curLink 1115 to point to blocker object 1103, setting on the x01 committed_waiter and x04 priority not bumped flags, to indicate that it has committed to wait for the mutator using blocker object 1103 to unblock the forward link pointer 1111 within "link A", and that it had determined that it was not necessary to bump that mutator's task's priority.

4. Lastly, the mutator using blocker object 1104 also wanted to block the forward link pointer 1111 within "link A", but found it already blocked by the mutator using blocker 1103. It set on the x04 blocking mutator waiting flag in the forward link pointer 1111 within "link A" to indicate that (one or more) blocking mutators are waiting. Finally it set the waiting for blocker field 1116 within its blocker object 1104 to point to blocker object 1103, and set on the x01 committed_waiter and x02 priority_bumped flags, to indicate that it has committed to wait for the mutator using blocker 1103 to unblock its link pointers, and that it had bumped that mutator's task's priority.

FIG. 11 represents the state of pointers after performing the above steps. Later, when the mutator which is using view object 1101 is done with its current link and advances to the next link, it will see the x01 committed_waiter and x02 priority bumped flags, and will notify the mutator using blocker 1103 (which blocked the forward link pointer 1111 within "link A"), that it has now advanced, and will unbump its own task's priority. That mutator will then wake up and finish inserting the new link, and will eventually unblock its link pointers. It will then see that there are both iterating and blocking mutators waiting (x02 iterating_mutator_waiting and x04 blocker_waiting flags on in the blocked forward link pointer 1111), and will find their view and blocker objects through their lists in the SharedChain object. It will give view object 1102 a new current link (setting its curLink 1115 to the same value it will have placed in the forward link pointer 1111 within "link A"when it unblocked it) and awaken its mutator. It will also set the waiting_for_blocker field 1116 in blocker object 1104 to NULL and awaken its mutator, which can then try again to block the link pointer. Meanwhile the mutator using blocker object 1103 will unbump its own task's priority, to undo the priority bump it received from the mutator using blocker object 1104.

SharedChain Object

Besides the pointers to the first and last links in the chain, the SharedChain object has a number of fields that contain state information, as follows:

Inactive Link Pointer: This field contains NULL, and is aligned on an 8-byte boundary. When a view object is inactive, its curPtr 705 field contains the address of this field, and curLink 706 is NULL. In this way, there is nothing special about an inactive view object. Any blocking mutator looking at it would ignore it right away, because the unique value in curPtr 705 would never match the address of any forward link pointer which was of interest to that mutator, so this is a convenient way to keep the view object out of the blocking mutator's way without handling it as a special case.

Primary and Secondary Blocker List Head: These fields are pointers to the first blocker object in the list of blocker objects. Only one of these fields is valid at any one time. The list of blocker objects is a singly-linked list. When a new blocker object is created, the compareAndSwap( ) function is used to atomically insert the new blocker object at the head of the list. However, deleting unneeded blocker objects at a later time cannot be done with a single atomic update to the chain head which also assures the blocker objects are still unneeded; instead a single atomic update to the indicator of which chain head is valid will be required.

Primary and Secondary Inspector View List Head: These fields are pointers to the first view object in the list of view objects for inspectors. These fields are managed in the same way the primary blocker list head and secondary_blocker_list_head fields are managed.

Primary and Secondary Mutator View List Head: These fields are pointers to the first view object in the list of view objects for mutators. These fields are managed in the same way the primary_blocker_list_head and secondary blocker list head fields are managed.

Activated Blocker And View Counts: This field contains a single integer used as two separate counters of the number of currently activated blocker and view objects, the high-order bits being used as a counter for the number of activated blocker objects, and the low-order bits are used as a counter for the number of activated view objects (summed for both inspectors and mutators). Both portions are updated as a single atomic field. The blocker portion is incremented by 1 before a blocker object is assigned to a mutator, and decremented by 1 after there are no longer any remaining references to that blocker object by other blocker or view objects. The view portion is incremented by 1 before a view object is assigned to an iterator (either an inspector or a mutator), and is decremented by 1 after the iterator is reset. The highest order bit of each portion is not used as a part of the count, but is reserved. One of these reserved bits is used as a flag to indicate the reclaim( ) function is in progress. (Reclaim is the process of deleting unneeded blocker and/or view objects). This process can only be initiated when the entire field is zero (no active blocker and view objects and reclaim is not already in progress).

Blocker and View Existence Counts: This field contains a single integer used as two separate counters of the number of currently existing blocker and view objects, the high-order bits being used as a counter for the number of existing blocker objects, and the low-order bits being used as a counter for the number of existing view objects (summed for both inspectors and mutators). Both portions are updated as a single atomic field. The blocker portion is incremented by 1 when a new blocker object must be created (after incrementing the blocker portion of the activated_blocker_and_view_counts field but before creating the blocker object and adding it to the head of the list). The view portion is incremented by 1 when a new view object must be created (after incrementing the view portion of the activated_blocker_and_view_counts field but before creating the view object and adding it to the head of the appropriate list). Both portions are decremented only by the reclaim( ) function. The highest order bit of each portion is not used as a part of the count, but is used as a flag. The flag in the blocker portion indicates whether it is the primary_blocker_list_head or the secondary_blocker_list_head that is valid. The flag in the view portion indicates whether it is the primary_view_existence_count or the secondary_view_existence_counts field (described below) that is valid. The flags are toggled as needed by the reclaim( ) function. The activated_blocker_and_view_counts field and the blocker and_view_existence_counts field cannot be updated together as a single atomic field. However, they reside in the same quadword, so they can be updated individually with the compareAndSwapQualified( ) function, which will fail if either field is changed in the meantime.

Primary and Secondary View Existence Counts: Only one of these fields is valid at a time. Which one is valid is indicated by the flag in the view portion of the blocker and view existence counts field described above. Each of these fields contain a single integer, used as two separate counters. The high-order bits of each field are used as a counter of the number of existing view objects for inspectors, and the low-order bits of each field are used as a counter of the number of existing view objects for mutators. Both portions are updated as a single atomic field. The appropriate counter (for inspectors or for mutators) is incremented by 1 when a new view object must be created (after incrementing the summary count in the blocker_and_view_existence_counts field and after creating the view object and adding it to the head of the appropriate list). Both portions are decremented only by the reclaim( ) function. The highest order bit of each portion is not used as a part of the count, but is used as a flag. The flag in the inspector portion indicates whether it is the primary_inspector_view_list_head or the secondary_inspector_view_list_head field that is valid. The flag in the mutator portion indicates whether it is the primary_mutator_view_list_head or the secondary_mutator_view_list_head that is valid. The flags are toggled as needed by the reclaim( ) function.

Active Inspector View Count: This atomic field contains a count of the number of active view objects for nonatomic inspectors. This field is incremented by 1 before a view object for an inspector is moved from the inactive state to a link in the chain, and is decremented by 1 after the view object is moved from a link in the chain back to the inactive state. The purpose of this field is to reduce the number of times that mutators must interact with the lists of view objects: When a mutator blocks a link pointer and needs to look at the view objects for inspectors, it only needs to do so if this field is nonzero. This field can only be incremented or decremented on behalf of a particular view object after the view object portion of the activated_blocker_and_view_counts field has been incremented on behalf of that same view object, and before it is decremented on behalf of the same view object.

Active Mutator View Count: This atomic field contains a count of the number of active view objects for nonatomic mutators. This field is incremented by 1 before a view object for a mutator is moved from the inactive state to a link in the chain, and is decremented by 1 after the view object is moved from a link in the chain back to the inactive state. The purpose of this field is to reduce the number of times that mutators must interact with the lists of view objects: When a mutator blocks a link pointer and needs to look at the view objects for mutators, it only needs to do so if this field is nonzero. This field can only be incremented or decremented on behalf of a particular view object after the view object portion of the activated_blocker_and_view_counts field has been incremented on behalf of that same view object, and before it is decremented on behalf of the same view object.

Iterating

In the environment of the preferred embodiment, the curLink 706 and curPtr 705 fields within the view object cannot be atomically updated as a single field. Since they must then be updated one-at-a-time, and since blocking mutators can be observing these fields at any time, all updates must be done in such a way that the view object's state can be precisely understood at every possible snapshot observation of curLink and curPtr. Both fields are within the same quadword, so that a compareAndSwapQualified( ) function intending to update one of the fields will fail if either of the fields are updated in the meantime.

A Nonatomic Iterator in the Inactive State

When a nonatomic iterator (inspector or mutator) is in the inactive state, it does not have a view object. All view objects which are not currently associated with an iterator are also considered inactive. An inactive view object has curPtr 705 pointing to the inactive_link_pointer field within the SharedChain object, and curLink set to NULL.

A view object which belongs to a mutator is also (in general) inactive during a mutating function. Its curLink 706 and curPtr 705 fields are set as described above, and the active_inspector_view_count field or the active_mutator_view count field (as appropriate) is not incremented on its behalf.

Advancing a Nonatomic Iterator (Inspector or Mutator) to the First Link in the Chain The iterator is assumed to be in the inactive state when this processing begins. The steps to complete it are:

1. Disable preempt.
2. Increment the view portion of the activated_blocker_and_view_counts field by 1. Find an available view object in the appropriate list. If none are available, increment the view portion of the blocker_and_view_existence_counts field, create a new view object, adding it to the head of the appropriate list, and increment the inspector or mutator portion (as appropriate) of the primary_view_existence_count or the secondary_view_existence_count field (whichever is valid).
3. Increment the active_inspector view count or the active_mutator_view_count field (as appropriate) by 1.
4. Set the view object's curLink field 706 to the special transition value (000 . . . 002). Since at the moment the curPtr field 705 points to the inactive_link_pointer field within the SharedChain object, no mutator will be interested in the view object. However, this will become significant in the next step, and so must be set first.
5. Change the view object's curPtr field 705 to point to the first_link_pointer field within the SharedChain object. Any mutator which is blocking or unblocking that link pointer will now have an interest in the view object. The special transition value in curLink 706 tells that mutator that the iterator is about to set curLink with the value it obtains by dereferencing curPtr. The mutator has no way of knowing whether the dereference has occurred yet, and if it has, whether it occurred before or after the mutator blocked or unblocked the link pointer (whichever it is doing). Therefore the mutator will not know what value the iterator will set in curLink. To prevent this, the mutator will attempt to change curLink to the special miscompare value (00 . . . 04). If the mutator succeeds, the iterator will fail its attempt to set whatever it dereferences from curPtr into curLink, and will dereference curPtr again. In this way the mutator can be sure that the iterator will see the change that it made to the link pointer.
6. Moving to the first link in the chain is a special case of the more general process of advancing from one link to the next. At this point the front-end special case steps are completed, and processing can continue with the more general process. If this is an inspector, processing continues at step 3 of Advancing a Nonatomic Inspector to the Next Link, described below. For a mutator, processing continues at step 4 of Advancing a Nonatomic Mutator to the Next Link, described below.

(Moving an iterator to the link following an arbitrary link is similar. In step 5 above, instead of setting curPtr to point to the first_link pointer within the SharedChain object, it is set to point to the forward link pointer within the arbitrary link.)

Advancing a Nonatomic Inspector to the Next Link

While an inspector has a current link, within its view object, the curLink field points to that link and the curPtr field points to the forward pointer within that current link. To advance, both fields will reach the same relative positions, but with respect to the next link in the chain. The forward link pointer located by curPtr may or may not be currently blocked. The following steps are taken:

1. Disable preempt.
2. Set curLink to the special transition value. Any mutator which is blocking or unblocking the link pointer to which curPtr points, if it sees this value will know that the inspector is about to set curLink with the value it obtains by dereferencing curPtr. The mutator has no way of knowing whether the dereference has occurred yet, and if it has, whether it occurred before or after the mutator blocked or unblocked the link pointer (whichever it is doing). Therefore the mutator will not know what value the inspector will set in curLink. To prevent this, the mutator will attempt to change curLink to the special miscompare value. If the mutator succeeds, the inspector will fail to set curLink in step 8, and will dereference curPtr again. In this way, the mutator can be sure that the inspector will see the change that the mutator made to the link pointer.
3. Dereference curPtr to get the contents of the link pointer. If it is not blocked, go to step 8; otherwise continue to step 4.
4. The link pointer is blocked and contains a pointer to the blocker object belonging to the mutator which blocked it. Get the activation id from the blocker and save it for possible later use. If the link pointer is blocked by a mutator which intends to remove the link containing the blocked link pointer, get the secondary next_link field and save it for possible later use as the next link pointer; otherwise get the primary_next_link field and save it instead.
5. Dereference curPtr again. If the link pointer is no longer blocked, go to step 8.
6. The link pointer either is still blocked, or has been blocked again. Get the activation_id field from the blocker object. If the activation_id is not the same as was previously obtained, then the link pointer has been blocked again. In that case, go back to step 4.
7. The activation_id is the same, meaning that the primary_next_link or secondary_next_link field extracted in step 4 is the pointer to the next link. (Note that in the meantime, the mutator which blocked the link pointer may now have unblocked it. When unblocking, the value it would put in the link pointer would be the same as was extracted from the primary_next_link or secondary_next link field, so in that case, the extracted value is still valid. However, if after the mutator unblocked the link pointer, it was blocked again using another blocker activation, the extracted value may no longer be correct. However, before the mutator using the other blocker activation can unblock its link pointers, it will look for view objects that it must interact with, and will see this one with curPtr locating the link pointer in question. That mutator will either wait for the inspector using this view object to advance, or it will change curLink to the special miscompare value to cause the inspector's attempt to set curLink in step 8 to fail, depending on whether the mutator or the inspector succeeds in setting curLink first.)
8. Use the compareAndSwap( ) function to attempt to set the next link pointer into curLink. This will be the inspector's new current link, and will either be the value dereferenced from curPtr in step 3 or step 5, or the value extracted from the primary next link or secondary_next_link field in step 4. If compareAndSwap( ) fails, it would only be because some mutator changed curLink from the expected transition value to the miscompare value. If it fails, go back to step 2 to continue.
9. If the new current link is NULL, it indicates the end of the chain has been reached. In that case, processing continues at step 2 of Resetting a Nonatomic Iterator (Inspector or Mutator) to the Inactive State.
10. If the new current link is not NULL, a new current link has been established. Now use compareAndSwap( ) to attempt to change curPtr to locate the forward pointer within the new current link, while being sure of the old value of curPtr. If the old value of curPtr has the x04 remove_waiting flag on, then also include the x01 committed_waiter and the x02 priority_bumped flags in the new value of curPtr as it is set. If the attempt fails, this step is repeated until it succeeds.
11. If the old value of curPtr that was obtained in step 10 does not have the x01 committed_waiter flag on, then there is no mutator waiting for this inspector to advance. In that case, go to step 19; otherwise continue to step 12.
12. The x01 commited_waiter flag was on in the old value of curPtr, so a mutator is waiting be notified of the advance. If the x04 remove_waiting flag is also on, the notification of the advance needs to be deferred to the next advance. In that case, go to step 17; otherwise continue to step 13.
13. The x04 remove_waiting flag is off, so the mutator needs to be notified at this time. The old value of curPtr points to the link pointer which the mutator has blocked, so get a pointer to the mutator's blocker object from that link pointer and notify it of the advance.
14. If the x02 priority_bumped flag is on in the old value of curPtr, then the waiting mutator has indicated that it has bumped the inspector's task's priority. In that case, go to step 16; otherwise continue to step 15.
15. The x02 priority_bumped flag is off in the old value of curPtr, meaning that the inspector changed curPtr before the waiting mutator had a chance to indicate that it had bumped the inspector's task's priority. To ensure that the inspector does not unbump its own task's priority before the mutator is able to bump it, wait on the priority_bump_uncertainty_resolver (single task blocker object) within the view object. (When the mutator tries to set on the x02 priority bumped flag in curPtr and sees that curPtr has changed, it will unblock the view object's priority_bump_uncertainty_resolver). When the waiting inspector awakens, it can be sure that its task's priority has been bumped.
16. Unbump the inspector's task's priority. Go to step 19 to continue.
17. At this point there is a waiting mutator to be notified, but the x04 remove_waiting flag is on in the old value of curPtr, so the notification is deferred to the next advance. (The flags were set to do that in step 10). If the x02 priority_bumped flag is also on in the old value of curPtr, then the waiting mutator has indicated that it has bumped the inspector's task's priority. In that case go to step 19; otherwise, continue to step 18.
18. The x02 priority_bumped flag is off in the old value of curPtr, meaning that the inspector changed curPtr before the waiting mutator had a chance to indicate that it had bumped the inspector's task's priority. To ensure that the inspector does not unbump its own task's priority before that mutator is able to bump, wait on the priority_bump_ uncertainty_resolver (single task blocker object) within the view object. (When the mutator tries to set on the x02 priority bumped flag in curPtr and sees that curPtr has changed, it will unblock the view object's priority_bump_uncertainty_resolver). When the waiting inspector awakens, it can be sure that its task's priority has been bumped. (When it advances the next time, it will see the x02 priority_bumped flag in what will be the old value of curPtr at that time (set on in step 10) and will know to unbump its task's priority).

19. At this point the advance is complete, and preempt is enabled.

Advancing a Nonatomic Mutator to the Next Link

While a mutator has a current link, then within its view object, the curLink field points to that link, and the curPtr field points to the forward pointer within the previous link. To advance, both fields will reach the same relative positions, but one link further along in the chain. The forward link pointer located by curPtr may or may not be currently blocked. (Besides being used by nonatomic mutators, this code path can also be used by a nonatomic inspector when it is reset to the inactive state However, when resetting to the inactive state, an inspector would never encounter a blocked link pointer. The paths through here which can be used by either inspectors or mutator are described in terms of an iterator; the paths which apply only to mutators are described in terms of an iterating mutator.)

1. Preempt is disabled. The process begins at this step (step 1) only for the getNextLink( ) function; all other cases enter at later steps.
2. Use the compareAndSwap( ) function to attempt to change curPtr to locate the forward pointer within the existing current link, while being sure of the old value of curPtr. If the old value of curPtr has the x04 remove_waiting flag on and this code path is being invoked for the getNextLink( ) function, then also include the x01 committed_waiter and the x02 priority_bumped flags in the new value of curPtr as it is set. Repeat this step until it succeeds, as a blocking mutator may be setting flags in curPtr. (If this is not for a getNextLink( ) function, then any required notification of the iterator advancing must not be deferred until a later advance).
3. Set curLink to the special transition value. Any blocking mutator which is blocking or unblocking the link pointer to which curPtr points, seeing this value in curLink, will know that this iterator is about to set curLink with the value it obtained by dereferencing curPtr. The blocking mutator will have no way of knowing whether the dereference has occurred yet, and if it has, whether it occurred before or after it blocked or unblocked the link pointer (whichever it is doing). Therefore the blocking mutator will not know what value the iterator will set in curLink. Therefore, the blocking mutator will attempt to change curLink to the special miscompare value. If the blocking mutator succeeds, the iterator will fail to set curLink in step 6, and will start over and dereference curPtr again. In this way, the blocking mutator can be sure that the iterator will see the change that the blocking mutator made to the link pointer.
4. Dereference curPtr to get the contents of the link pointer. If it is not blocked, go to step 6. Otherwise, if it is blocked by a mutator which is going to remove the link containing the blocked link pointer (x08 remove_pending flag on and x04 blocking mutator_waiting flag off), go to step 5. Otherwise the link pointer is blocked, but the link containing it is not being removed by the mutator which currently has it blocked. If the x02 iterating mutator_waiting flag is already on in the blocked link pointer, go to step 6 to continue. Otherwise the x02 iterating_mutator_waiting is not on in the blocked link pointer, so use the compareAndSwap( ) function to attempt to set it on. If it fails, go back to step 3 and start over. Otherwise, if successfully set on, then when the blocking mutator unblocks its link pointers, it will see this flag and know to look at the mutator view objects to awaken any waiters. Go to step 6 to continue.
5. At this point the link pointer is blocked by a mutator which is removing the link which contains the blocked link pointer. The blocking mutator stored the pointer to the next link in the secondary_next_link field within its blocker object, at the time it blocked the link pointer, so extract that value now to use as the next link pointer. (The blocking mutator will (eventually) wait for this iterating mutator to advance, so it is safe to pick up the next link pointer from within its blocker object).
6. Use the compareAndSwap( ) function to attempt to change curLink from the expected transition value to the value dereferenced from curPtr in step 4 (or retrieved from the blocker object in step 5). (However, if the link pointer was blocked (x01 blocked_link pointer flag on), the value to be stored is a pointer to the blocker object, so set off all flags except x01 when storing into curLink. The x01 flag in curLink is the committed_waiter flag, indicating that the iterating mutator has now committed to wait for the blocking mutator to unblock its link pointers.) If the attempt fails (because in the meantime a mutator had changed curLink to the special miscompare value) go back to step 3 to start over.
7. At this point the iterator has successfully left its old current link. If the x01 committed_waiter flag is not on in the old value of curPtr (from step 2) there is no blocking mutator waiting to be notified of this mutator's advance. In that case go to step 15; otherwise, continue to step 8.
8. A blocking mutator is waiting to be notified of the advance. If the x04 remove_waiting flag is on and this process is performed as part of a getNextLink( ) function, the notification of the advance is deferred until the next advance. In that case, go to step 13; otherwise, continue to step 9.
9. The x04 remove_waiting flag is off (or the iterator is not processing a getNextLink( ) function), so the waiting mutator is notified at this time. The old value of curPtr points to the link pointer which the mutator has blocked, so get a pointer to the mutator's blocker object from that link pointer and notify it of the advance.
10. If the x02 priority bumped flag is on in the old value of curPtr, then the waiting mutator has indicated that it has bumped the iterator's task's priority. In that case, go to step 12; otherwise, continue to step 11.
11. The x02 priority_bumped flag is off in the old value of curPtr, meaning that the iterator changed curPtr before the waiting mutator had a chance to indicate that it had bumped the iterator's task's priority. To ensure that the iterator does not unbump its tasks's priority before the waiting mutator is able to bump it, wait on the priority_bump_uncertainty_resolver (single task blocker object) within the view object. (When the mutator tries to set on the x02 priority_bumped flag in curPtr and sees that curPtr has changed, it will unblock the view object's priority_bump_uncertainty_resolver). When the waiting iterator awakens, it can be sure that its task's priority has been bumped.
12. Unbump the iterator's task's priority. Go to step 15 to continue.

13. At this point there is a waiting mutator to be notified, but the notification will be deferred until the next advance. (The flags were set to do that in step 2). If the x02 priority bumped flag is on in the old value of curPtr, then the waiting mutator has indicated that it has bumped the iterator's task's priority. In that case go to step 15 (the iterator will notice the x02 priority_bumped flag when it advances next time); otherwise, continue to step 14.
14. The x02 priority_bumped flag is off in the old value of curPtr, meaning that the iterator changed curPtr before the waiting mutator had a chance to indicate that it had bumped the iterator's task's priority. To ensure that the iterator does not unbump its task's priority before that mutator is able to bump it, wait on the priority_bump_uncertainty_resolver (single task blocker object) within the view object. (When the mutator tries to set on the x02 priority bumped flag in curPtr and sees that curPtr has changed, it will unblock the view object's priority bump uncertainty resolver). When the waiting iterator awakens, it can be sure that its task's priority has been bumped. (When it advances the next time, it will see the x02 priority bumped flag in what will be the old value of curPtr at that time (set on in step 2) and will know to unbump it's task's priority).
15. If the value stored into curLink in step 6 was not a pointer to a blocker object (x01 committed_waiter flag off), then the iterator has completed its advance. In that case, go to step 17; otherwise, continue to step 16.
16. The iterating mutator has committed to wait for the mutator whose blocker address is stored in curLink, to unblock the link pointer located by curPtr. The processing steps of Waiting and Waking Up. Waiting for a Mutator to Unblock its Link Pointers below are performed to try to bump the priority of the blocking mutator's task and to wait for it to unblock the link pointers. When the blocking mutator unblocks its link pointers, it will set into curLink the same value that it puts into the (unblocked) forward pointer, and wake up the iterating mutator. When awakened, the iterating mutator will have completed its advance.
17. Preempt is enabled.

Resetting a Nonatomic Iterator (Inspector or Mutator) to the Inactive State An iterator will be reset to the inactive state (its view object will also be made inactive and available for reuse) when requested by the client (or when its destructor runs). In addition, an inspector will be reset to the inactive state when it advances to the end of the chain. Finally, the view object for a mutator will be reset to the inactive state (but will still be associated with the mutator) when the mutator begins a mutating function (the view object can be returned to the active state when the mutating function completes). The process steps are as follows:

1. Preempt is disabled.
2. The processing steps of Advancing a Nonatomic Mutator to the Next Link above are performed, starting with step 2, but in step 2, curPtr is set to the address of the inactive link pointer field within the SharedChain object (rather than to the address of the forward pointer within the current link). This will move the view object "off of the chain" so that no blocker object will be interested in it hereafter. (Since the inactive_link_pointer field contains NULL, when it is dereferenced there in step 4, it will never appear to be blocked. Thus there will be no waiting for link pointers to be unblocked, although a blocking mutator may need to be notified when the iterator advances away from its current link).
3. Decrement the active_inspector_view_count or the active_mutator_view_count field in the SharedChain object (as appropriate) by 1.
4. If it is only the view object which is being reset (and the iterator itself is to remain in the active or transition state), then this processing is done; otherwise step 5 is performed.
5. The view object is available to be reused by another iterator. Decrement the view portion of the activated_blocker_and_view counts field in the SharedChain object by 1. If this entire field is now zero, it means there are no longer any outstanding references to any view objects or blocker objects, so invoke the reclaim function to delete any excess view or blocker objects.

Establishing or Re-establishing a new Current Link for a Nonatomic Mutator

Except for the insertAfterCurrentLink( ) and removeAfterCurrentLink( ) functions, while a mutator is inserting or removing a link, it either does not have a view object, or its view object has been reset to the inactive state. When the function is nearly completed, but the link pointers have not yet been unblocked, the mutator's current link can be established or re-established, as follows:

1. If the mutator already has a view object, then go to step 2. Otherwise, do the following to assign a view object: (a) Increment the view portion of the activated_blocker_and_view_counts field in the SharedChain object by 1; (b) find an available view object in the mutator view object list. If none are available, increment the view portion of the blocker and_view_existence_counts field by 1, create the new view object, adding it to the head of the mutator view object list (using the primary or secondary head, whichever is valid), and increment the mutator portion of the primary view existence_counts or secondary view_existence_counts field (whichever is valid) by 1.
2. Increment the active_mutator_view_count field in the SharedChain object by 1.
3. At this point, the view object's curLink field is NULL, and its curPtr field locates the inactive_link_pointer field within the SharedChain object. This view object is of no interest to any mutator which may be looking at it.
4. Change curLink to point to the link to which the forward link pointer within the previous link will point when it is later unblocked. If inserting a link, this will be the newly inserted link; if removing a link, it will be the link which follows it. Because curPtr remains unchanged from the previous step, this view object is still of no interest to any mutator.
5. Change curPtr to point to the forward link pointer within the previous link. At this point, the view object has a new current link, and is no different than any other view object for an iterating mutator which would otherwise advance to that link after the link pointers are unblocked.

Changing a Nonatomic Mutator's Current Link

When a nonatomic mutator fails in any of the mutating functions related to its current link, it is because a second mutator has already blocked the affected link pointer. The second mutator will be unaware of the first mutator's intent, and will only see the first mutator as an iterating mutator, and will wait for it to advance. The first mutator will have to act as an iterating mutator and get out of the second mutator's way, and will then wait for it to unblock the link pointer. After waiting, depending on the scenario, the mutator will or will not have a new current link. If it has a new current link, the original function will fail because it was based on the original current link; if not, then the function may be retried. The original remove or insert function must fail because it was based on the original current link. Table 14 describes the functions, the reason for the failure, and the recovery.

TABLE 14

Failure Causes and Remedies

| Failing Function | Reason for failure | Recovery |
| --- | --- | --- |
| insertBeforeCurrentLink() or removeCurentLink() | The forward pointer within the previous link (where curPtr points) is blocked by a mutator which intends to remove that previous link. | Move behind the forward pointer in the link before the previous link. The mutator will have blocked that link pointer as well, and will have stored a pointer to it in the previous_link_pointer field in the blocker object. When awakened, curPtr will be changed, but curLink will be unchanged. Retry the failing function. |
| | The forward pointer within the previous link (where curPtr points) is blocked by a mutator which intends to remove the current link or to insert a link before it. | Move behind the forward pointer in the previous link where curPtr points. When awakened, curPtr will be unchanged, but curLink will be changed. Return a failure indication to the client. |
| insertAfterCurrentLink() or removeAfterCurrentLink() | The forward pointer within the current link (where curLink points) is blocked by a mutator which intends to remove the current link. | Move behind the forward pointer in the previous link, where curPtr points. When awakened, curPtr will be unchanged, but curLink will be changed. Return a failure indication to the client. |

Moving Behind a Blocked Link Pointer

1. If the x02 iterating mutator waiting flag is not on in the blocked link pointer to move behind, use the compareAndSwap( ) function to attempt to set it on. If it fails, retry until the flag is on. Since the first mutator is standing in the way of the second, the second mutator is not going to be able to unblock the link pointer until the first mutator advances out of its way, so the compareAndSwap( ) function can simply be retried until it succeeds.
2. Change the curLink field within the first mutator's view object to point to the second mutator's blocker object (with the x01 committed_waiter flag on). This indicates that the first mutator has committed to wait for the second mutator to unblock its link pointers.
3. If the x01 commited_waiter flag is on in the curPtr field, then use compareAndSwap( ) to attempt to set off all of the flag bits (x07) while knowing which ones were on. If the attempt is not successful (because the second mutator is setting on the x02 priority_bumped flag), this step is retried until it succeeds. (If the x01 committed_waiter flag is not on, then the second mutator will not set it on, because the change made in step 2 makes the first mutator appear to have committed to wait on the second mutator. In that case the second mutator would not commit to waiting on the first. Even if the second mutator was in the process of committing to wait, the setting of curLink in step 2would cause that to fail, and when retrying, the second mutator would notice that the first mutator had committed to wait on it instead.)
4. If the x01 committed_waiter flag was found to be on in the old value of curPtr in step 3, it indicates that the second mutator had committed to wait for the first mutator to advance, so now is the time to notify it of the advance. (The second mutator may also have set on the x02 priority_bumped flag, and the x04 remove_waiting flag; however, the x04 remove_waiting flag is ignored since the notification of advancing should not be deferred.
5. Wait for the second mutator to unblock its link pointers. The processing steps of Waiting for a Mutator to Unblock its Link Pointers below are performed to try to bump the priority of the second mutator's task and to wait for it to unblock the link pointers. When the second mutator unblocks its link pointers, it will see the first mutator's view object, and will set its curLink field with the new link pointer, and awaken the first mutator. When awakened, the first mutator will have its new current link.

Blocking a Link Pointer

Blocking a Link Pointer Without Wait

This function is used to attempt to block the forward pointer in the previous link, by the following functions:

insertBeforeCurrentLink( )

removeCurrentLink( )

insertBeforeArbitraryLink( ) after tentatively blocking the backward pointer in the arbitrary link removeArbitraryLink( ) after tentatively blocking the backward pointer in the arbitrary link insertLast( ) after tentatively blocking the last link pointer within the SharedChain object.

It is also used internally by other blocking functions which wrapper it with wait/retry logic. The steps involved in blocking a link pointer are detailed here. Essentially the old value of the link pointer is swapped out and returned to the invoker, and the new value (pointing to the blocker object with flag bits set) is swapped in, provided that the link pointer is not already blocked.

1. Dereference the link pointer to get its current contents. If it is blocked by another mutator, exit, returning the current contents of the link pointer (a pointer to the blocking mutator's blocker object), to indicate a failure; otherwise continue.
2. If blocking a forward link pointer, but not within a link which is being removed, store the current contents of the link pointer (captured in step 1) into the primary_next_ link field. If blocking the forward pointer within a link which is being removed, store the current contents of the link pointer into the secondary_next_link field. (Otherwise if blocking a backward link pointer, there is nothing to store in the blocker object).

3. Use compareAndSwap( ) to attempt to change the link pointer to point to the blocker object (with the appropriate flags set on) if that can be done while knowing the link pointer's current contents. If the operation fails, go back to step 1 to start over.

4. If the link pointer just blocked was the forward link pointer within a link which is being removed, copy the secondary next link field into the primary next link field.

5. Exit, returning the original contents of the link pointer (captured in step 1). The fact that this points to a link instead of to a blocker object indicates that the block operation attempted here has succeed.

Blocking a Link Pointer With Wait

This function is used when tentatively blocking backward pointers for the following functions:

insertLast( )
insertBeforeArbitraryLink( )
removeArbitraryLink( )

It is also used to block the forward pointer in the previous link for the following functions:

insertFirst( )
insertAfterCurrentLink( )
insertAfterArbitraryLink( )
removeFirst( )
removeAfterArbitraryLink( )

The waiting_for_blocker field within the blocker object is first initialized to NULL to indicate that the mutator is not waiting.

1. Invoke the procedure of Blocking a Link Pointer Without Wait above to attempt to block the link pointer. If it succeeds, exit, returning the original (unblocked) contents of the link pointer; otherwise continue to step 2.

2. The block attempt has failed because the link pointer has already been blocked by another mutator, and a pointer to that other mutator's blocker object was returned by the failed attempt. Store a pointer to that second blocker object (with all flag bits set off) into the waiting_for_blocker field within the first blocker object. The fact that there are no flag bits on indicates that the first mutator is intending to wait on the second mutator, but has not committed to do so yet.

3. Dereference the link pointer to be blocked again. If it is not still blocked by the same mutator, go back to step 1 and start over. (In going back to step 1, the waiting_for_blocker field is left in this intermediate state, but causes no harm. The mutator which is using the blocker object to which it points may later reset the field to NULL when it unblocks link pointers, but when setting it to NULL it will take no further action since there are no flags set.)

4. If the x04 blocking mutator_waiting flag is not on in the blocked link pointer, use compareAndSwap( ) to attempt to set it on. If the operation fails, go back to step 1 to start over.

5. Use compareAndSwap( ) to attempt to set on the x01 committed_waiter flag in the waiting for_blocker field, to indicate that the first mutator has now committed to wait for the second mutator to unblock its link pointers. If the attempt fails, it is because the second mutator has already unblocked the link pointer and reset the waiting for blocker field to NULL. In that case, go back to step 1 to start over.

6. At this point, the first mutator has committed to wait for the second. The processing steps of Waiting for a Mutator to Unblock its Link Pointers are performed to try to bump the priority of the second mutator's task and to wait for it to unblock the link pointers. When awakened, go back to step 1 to start over.

Conditionally Blocking a Forward Link Pointer

This function is used to attempt to block the forward pointer in the current link when inserting or removing after the current link.

1. Invoke Blocking a Link Pointer Without Wait described above to attempt to block the link pointer. If it succeeds, exit, returning the original (unblocked) contents of the link pointer, to indicate success; otherwise, continue to step 2.

2. The block attempt failed, and returned the blocked contents of the link pointer. If the link pointer is blocked by a mutator which is removing the link containing the blocked pointer (x08 remove pending flag on and x04 blocking_mutator_waiting flag off), then exit, returning the original (blocked) contents of the link pointer, to indicate a failure; otherwise, continue to step 3.

3. The link pointer is blocked by a second mutator which does not intend to remove the link containing it. The steps described in Blocking a Link Pointer With Wait above are performed to wait for the link pointer to be unblocked. If any of those steps fail, or when awakened from the wait, go back to step 1 here to start over.

Blocking a Forward Link Pointer After Tentatively Blocking a Backward Link Pointer This function is used to block the forward pointer in the previous link when removing an arbitrary link, or when inserting last or before an arbitrary link. The backward pointer has already been blocked, with the tentative flag.

1. Invoke the procedure of Blocking a Link Pointer Without Wait described above to attempt to block the link pointer. If it succeeds, go to step 4; otherwise, continue to step 2.

2. The block attempt failed, and it returned a pointer to the blocker object for the mutator which has already blocked the link pointer. That second mutator will also block the same link pointer that the first mutator had previously blocked tentatively, and to avoid a deadlock, the tentative block is suspended so the second mutator can use it. To suspend the tentative block, the link transfer mechanism with the suspended_link_control object in the second mutator's blocker object is used to pass to that second mutator, a pointer to the link to which the tentatively blocked backward pointer used to point before it was blocked.

3. The link transfer mechanism is used with the suspended_link_control object in the failing mutator's blocker object, to wait for the second mutator to pass back a pointer to the new previous link. Then go back to step 1 to start over, attempting to block the forward pointer within this new previous link.

4. At this point, the forward link pointer has been successfully blocked, and the backward link pointer which was blocked tentatively no longer needs to be tentative. Use compareAndSwap( ) to attempt to set off the x08 tentative flag within it. If the function fails, repeat it until it succeeds. (Another mutator could be setting on the x04 blocking_mutator waiting flag there).

5. The procedure exits, returning the original (unblocked) contents of the link pointer.

Blocking the Forward Link Pointer Within a Link that is Being Removed

1. The procedure of Blocking a Link Pointer Without Wait described above is invoked to attempt to block the link pointer. If it succeeds, exit, returning the original (unblocked) contents of the link pointer; otherwise, this procedure continues with step 2.
2. The block attempt failed because a second mutator has already blocked the link pointer. CompareAndSwap( ) is used to attempt to set on both the x08 remove_pending and the x04 blocking mutator waiting flags in the blocked link pointer. If this is not successful, go back to step 1 to start over; otherwise, continue to step 3.
3. At this point, the link pointer is blocked by a second mutator, and the flags have been set within the link pointer indicating that a mutator which intends to remove the link containing the blocked link pointer, is waiting for the link pointer to be unblocked. This is a condition that will be recognized when the second mutator unblocks the link pointer. Use the link transfer mechanism with the blocked_remove_control object to wait for the second mutator to "unblock" the link pointer. In this case, the second mutator will not unblock it, but will "re-block" it on behalf of the waiting mutator (storing the waiting mutator's blocker object address there with both the x01 blocked and the x08 remove_pending flags on). Then it will use the link transfer mechanism to awaken the waiting mutator, passing it the value that it would otherwise have put in the link pointer, had it actually unblocked it.
4. The procedure exits, returning the unblocked link pointer value obtained via the link transfer mechanism in step 3.

Blocking the Final Link Pointer

When removing a link, or when inserting first, after the current link, or after an arbitrary link, this function is used to block the backward pointer within the next link. This is the last link pointer that will be blocked in those cases.
1. The procedure of Blocking a Link Pointer Without Wait described above is invoked to attempt to block the link pointer. If it succeeds, exit, returning the original (unblocked) contents of the link pointer; otherwise proceed to step 2.
2. The attempt to block the link pointer failed because it was already blocked by a second mutator. If the link pointer was not blocked tentatively, go to step 3. Otherwise, the link pointer was blocked tentatively by the second mutator, and that mutator will be suspending its block and using the link transfer mechanism with the suspended_link_control object within the first mutator's blocker object to pass to it, a pointer to the previous link. So use the link transfer mechanism with the suspended_link_control object within the first mutator's blocker object, to wait for the link pointer. When awakened, exit, returning a pointer to the previous link.
3. At this point, the link pointer is blocked by the second mutator, but not tentatively. Use the same steps as are described in Blocking a Link Pointer With Wait above to wait for the link pointer to be unblocked. If any of those steps fail, or when awakened from the wait, go back to step 1 here to start over.

Unblocking Link Pointers

When unblocking link pointers, the forward pointer within the previous link is unblocked first, then the backward pointer within the next link may be unblocked.

Unblocking the Forward Pointer within the Previous Link
1. If the x04 blocking_mutator_waiting and the x08 remove_pending flags are both on in the link pointer to be unblocked, it indicates that a mutator which intends to remove the link containing the blocked forward pointer is waiting. In that case go to step 2 to continue. Otherwise, use compareAndSwap( ) to attempt to replace the blocked link pointer with a pointer to its new next link. If the attempt fails, it is because other mutators are setting flags within the blocked link pointer, so go back to the beginning of step 1 to start over. If the attempt succeeds, then exit, returning the old blocked value of the link pointer, which may have the x02 iterating_mutator_waiting and/or the x04 blocking mutator_waiting flags on, indicating whether it will be necessary to look for potential waiters.
2. At this point, a mutator which intends to remove the link containing the blocked link pointer is waiting (via the link transfer mechanism) for permission to resume. That mutator will also have blocked the backward pointer within the same link. Locate the backward pointer, and from it locate the blocker object used by that mutator.
3. Use compareAndSwap( ) to attempt to store the address of the blocker object (with the x01 blocked and the x08 remove_pending flags on) in the blocked link pointer. If the attempt fails, it is because other iterating mutators are setting on the x02 iterating_mutator_waiting flag within the blocked link pointer, so start this step over until it succeeds. Once it succeeds, then the link pointer now appears to be blocked by the waiting mutator, which intends to remove the link containing the link pointer.
4. Use the link transfer mechanism with the blocked_remove_control object within the waiting mutator's blocker object, to pass the link pointer to the waiting mutator and awaken it.
5. Exit, returning the old blocked value of the link pointer. Both the x02 iterating_mutator_waiting and the x04 blocking_mutator_waiting flags will be of interest, indicating whether it will be necessary to look for potential waiters.

Unblocking the Backward Pointer within the Next Link
1. If the link pointer is blocked tentatively, then it is actually blocked by a different mutator, using a different blocker object. In that case go to step 3 to continue.
2. Use compareAndSwap( ) to attempt to replace the blocked link pointer with a pointer to its new previous link. If the attempt fails, it is because another blocking mutator is setting the x04 blocking_mutator_waiting flag within the blocked link pointer, so repeat this step until it succeeds. When it succeeds, then exit, returning the old (blocked) value of the link pointer, which may have the x04 blocking_mutator_waiting flag on, indicating whether it will be necessary to look for potential waiters.
3. At this point the link pointer is blocked tentatively by a different mutator. That mutator will have suspended the blocked link pointer, and will be using the link transfer mechanism with the suspended link_control object within its blocker object, to wait for permission to resume. Use the link transfer mechanism with that suspended_link_control object, to pass to it the pointer to the new previous link (the same value which would otherwise have been put into the link pointer in step 2). This will wake up the waiting mutator, giving it a new previous link pointer.
4. Exit, returning nothing. The link pointer has not been changed. (If the x04 blocking_mutator waiting flag is on, that is for the attention of the other mutator, which has tentatively blocked the link pointer, and it will see it when it unblocks the link pointer).

Blocker/View Object Interactions

Finding Iterators to Wait for when Inserting a Link

After blocking the link pointers needed to insert a link, the mutator waits for any iterators that are attached to the forward link pointer within the previous link, to advance. The inspector view objects must be examined if the active_ inspector_view_count field in the SharedChain object is nonzero, and the mutator view objects must be examined if the active_mutator_view_count field in the SharedChain object is nonzero. If view objects must be examined, then the examination of each one returns a Boolean, indicating whether the mutator must wait for the iterator to advance. The number of TRUE responses is the number of "notifications of advance" for which the blocking mutator will have to wait. The following steps are performed for each view object that is examined:

1. If the view object's curPtr field does not point to the forward link pointer within the previous link, then the view object is of no interest, so the process ends, returning FALSE.
2. If the view object's curLink field points to this mutator's blocker object, then the iterator has already committed to wait for the mutator to unblock that link pointer. In this case, the view object is of no interest, so return FALSE. (Note that this would never be the case when examining a view object for an inspector, since inspectors do not wait on blocking mutators).
3. If the view object's curLink field points to (1) the same link to which the link pointer used to point before the mutator blocked it, or (2) to a different blocker object, then in either case the view object is of interest to the mutator. (When examining a view object for an inspector, curLink would never be seen pointing to a blocker object since inspectors don't wait. And for a mutator's view object, if curLink points to a different blocker object, it simply means that the mutator which is using that blocker object recently unblocked the link pointer but hasn't gotten around to updating curLink yet.) In either case, use compareAndSwapQualified( ) to attempt to set on the x01 committed_waiter flag in the view object's curPtr field. If it fails (because either curLink or curPtr was changed in the meantime), go back to step 1 to start over. If it succeeds, the mutator has now committed to wait for the iterator to advance, so bump the iterator's task's priority. Then use compareAndSwap( ) to attempt to set on the x02 priority_bumped flag in the view object's curPtr field. If the attempt fails (because the iterator is already advancing and has changed curPtr), unblock the priority_bump_uncertainty_resolver (single task blocker object) in the view object, then return FALSE. (The advancing iterator will see that the x01 committed_waiter flag is on but the x02 priority_bumped flag is off in the old value of curPtr, so it will know not to notify the mutator of its advance, but will wait for its priority_bump_uncertainty_resolver object to be unblocked, so it can be sure that its task's priority has been bumped before it unbumps it). If the attempt to set on the x02 priority_bumped flag succeeds, return TRUE. This is a view object for an iterator for which the mutator waits. (When the iterator advances and sees the x01 committed_waiter and x02 priority_bumped flags on in the old value of curPtr, it will notify the mutator of its advance and unbump its own task's priority.)
4. In all other cases, if curLink contains the special transition value, it indicates that curPtr has been set, but curLink has not yet been set with the value that will be dereferenced from curPtr. The mutator cannot tell whether the value to be stored in curLink was obtained before or after it blocked the link pointer, and so the mutator cannot tell whether it will need to wait for the iterator to advance. In order to be sure, use compareAndSwapQualified( ) to attempt to change curLink to the special miscompare value. If unsuccessful (because either curLink or curPtr was changed in the meantime), go back to step 1 to start over. If successful, it will foil the iterator's attempt to set curLink with whatever value it dereferenced from curPtr, and will force it to start over and dereference curPtr again, and this time it will see that the link pointer is blocked. In this way, the mutator can be sure that it does not have to wait for the iterator to advance, so return FALSE; otherwise continue to step 5.
5. The view object appears to be of no interest to the mutator, but it should be verified that the curLink value is current. Use compareAndSwap to attempt to store the previously extracted value back into curLink. If unsuccessful, go back to step 1 to start over. Otherwise the view object is of no interest to the mutator, so return FALSE.

When all view objects have been examined, the number of TRUE responses will be the number of iterators which must advance before the mutator can proceed. Add this number to the status_control object within the mutator's blocker object. The x01 committed_waiter and the x02 priority_bumped flags will be on in curPtr for each iterator which must notify the mutator (decrement the status_control object within its blocker object) when it advances. The mutator will wait for that many notifications to occur.

Finding Iterators to Wait for when Removing a Link

After blocking the link pointers needed to remove a link, the mutator must wait for any iterators that are attached to the forward link pointer within the previous link, or the forward pointer within the link being removed, to advance. The inspector view objects are examined if the active_inspector_view_count field in the SharedChain object is nonzero, and the mutator view objects are examined if the active_mutator_view_count field in the SharedChain object is nonzero. If view objects must be examined, then the examination of each one returns a Boolean, indicating whether the blocking mutator must wait for the iterator to advance. The number of TRUE responses is the number of "notifications of advance" for which the blocking mutator will have to wait. The following steps are performed for each view object that is examined:

1. If the view object's curPtr field does not point to the forward link pointer within the link being removed, go to step 2. Otherwise use compareAndSwapQualified( ) to attempt to set on the x01 committed_waiter flag in the view object's curPtr field. If it fails (because either curLink or curPtr was changed in the meantime), go back to the beginning of this step and start over. If it succeeds, the mutator has now committed to wait for the iterator to advance, so bump the iterator's task's priority. Then use compareAndSwap( ) to attempt to set on the x02 priority bumped flag in the view object's curPtr field. If the attempt fails (because the iterator is already advancing and has changed curPtr), unblock the priority bump uncertainty_resolver (single task blocker object) in the view object, then return FALSE. (The advancing iterator will see that the x01 committed_waiter flag is on but the x02 priority bumped flag is off in the old value of curPtr, so it will know not to notify the mutator of its advance, but will wait for its priority_bump_uncertainty_resolver object to be unblocked, so it can be sure that its task's priority has been bumped before it unbumps it). If the attempt to set on the x02 priority_bumped flag succeeds, return TRUE. This is a view object for an iterator for which the mutator waits. (When the iterator advances and sees the x01 committed_waiter and x02 priority_bumped flags on in the old value of curPtr, it will notify the mutator of its advance and unbump its own task's priority.) If step 1 did not return TRUE, continue to step 2.

2. If the view object's curPtr field does not point to the forward link pointer within the previous link, then the view object is of no interest, so return FALSE; otherwise continue to step 3.
3. If the view object's curLink field points to this mutator's blocker object, then the iterator has already committed to wait for the mutator. In this case, the view object is of no interest, so return FALSE; otherwise continue to step 4.
4. If the view object's curLink field points to (1) the same link to which the link pointer used to point before the mutator blocked it, or (2) to a different blocker object, then in either case the view object is of interest to the mutator. (When examining a view object for an inspector, curLink would never be seen pointing to a blocker object since inspectors don't wait. And for a mutator's view object, if curLink points to a different blocker object, it simply means that the mutator which is using that blocker object recently unblocked the link pointer but hasn't gotten around to updating curLink yet.) In either case, use compareAndSwapQualified( ) to attempt to set on both the x01 committed_waiter and the x04 remove_waiting flags in the view object's curPtr field. If it fails (because either curLink or curPtr was changed in the meantime), go back to step 1 to start over. If it succeeds, the mutator has now committed to wait for the iterator to advance (twice), so bump the iterator's task's priority. Then use compareAndSwap( ) to attempt to set on the x02 priority bumped flag in the view object's curPtr field. If the attempt fails (because the iterator is already advancing and has changed curPtr), unblock the priority_bump_uncertainty_resolver (single task blocker object) in the view object, then return TRUE. (The advancing iterator will see that the x01 committed_waiter and x04 remove waiting flags are on but the x02 priority_bumped flag is off in the old value of curPtr. It will set on the x01 committed_waiter and the x02 priority_bumped flags in curPtr so that it will know to notify the mutator and unbump its own tasks's priority the next time it advances. Meanwhile it will wait for its priority_bump_uncertainty_resolver object to be unblocked, so it can be sure that its task's priority has been bumped before it eventually unbumps it). If the attempt to set on the x02 priority_bumped flag succeeds, return TRUE; otherwise continue to step 5. In the former case, this is a view object for an iterator for which the mutator waits. (When the iterator advances and sees all 3 flags on in the old value of curPtr it will set on the x01 committed_waiter and the x02 priority bumped flags in curPtr, so that it will know to notify the mutator and unbump its own task's priority yet the next time it advances.)
5. If curLink contains the special transition value, it indicates that curPtr has been set, but curLink has not yet been set with the value that will be dereferenced from curPtr. The mutator cannot tell whether the value to be stored in curLink was obtained before or after it blocked the link pointer, and so the mutator cannot tell whether it will need to wait for the iterator to advance. In order to be sure, use compareAndSwapQualified( ) to attempt to change curLink to the special miscompare value. If unsuccessful (because either curLink or curPtr was changed in the meantime), go back to step 1 to start over. If successful, it will foil the iterator's attempt to set curLink with whatever value it dereferenced from curPtr, and will force it to start over and dereference curPtr again, and this time it will see that the link pointer is blocked. In this way, the mutator can be sure that it does not have to wait for the iterator to advance, so return FALSE; otherwise, continue to step 6.
6. If curLink does not contain the special transition value, the view object appears to be of no interest to the mutator, but it should be verified that the curLink value is current. Use compareAndSwap( ) to attempt to store the previously extracted value back into curLink.

If unsuccessful, go back to step 1 to start over. Otherwise the view object is of no interest to the mutator, so return FALSE.

When all view objects have been examined, the number of TRUE responses will be the number of iterators which must advance before the mutator can proceed. Add this number to the status_control object within the mutator's blocker object. Then wait for that many notifications (decrements to the status_control object) to occur.

Finding Iterating Mutators to Awaken when Unblocking Link Pointers

When a mutator unblocks its link pointers, if the old (blocked) value of the forward link pointer contains the x02 iterating_mutator_waiting flag on, it means that at least one iterating mutator may be committing or have committed to wait for the mutator to unblock its link pointers. In that case, each of the view objects for mutators is examined. The examination of each one returns a Boolean indicating whether the iterating mutator had committed to wait for the link pointers to be unblocked. The number of TRUE responses is the number of iterating mutators which will be awakened, and after being awakened, will notify the blocking mutator that they are done waiting. (When all have indicated they are done waiting, the blocker object can be reused). The following steps are performed for each view object that is examined:

1. If the view object's curPtr field does not point to the forward pointer within the previous link, the view object is of no interest to the unblocking mutator, so return FALSE;
   otherwise continue to step 2.
2. If the view object's curLink field points to the blocker object for the unblocking mutator (with the x01 committed_waiter flag on), then the iterating mutator has committed to wait for the link pointers to be unblocked. In that case, use compareAndSwap( ) to attempt to set curLink with the new (unblocked) value of the link pointer. If the attempt fails (because the iterating mutator is setting on the x02 priority bumped or the x04 priority_not_bumped flag on in curLink), go back to the beginning of this step to try again. Once the attempt is successful, then the iterating mutator now has a current link, and the unblocking mutator knows from the old value of curLink, whether the iterating mutator had or had not bumped its task's priority, or whether that information is uncertain. If neither the x02 priority_bumped nor the x04 priority_not_bumped flags are on in the old value of curLink, then the unblocking mutator cannot tell whether the iterating mutator has bumped its task's priority or not. In that case, increment the status_control object within the unblocking mutator's blocker object, and return FALSE. (The iterating mutator will fail in its attempt to set either the x02 priority bumped or the x04 priority_not_bumped flag (because the unblocking mutator changed curLink), and when it later dereferences the link pointer again, will see that it is unblocked.) Meanwhile, if the iterating mutator had bumped the blocking mutator's task's priority, it will increment the priority_bump_count field within the unblocking mutator's blocker object. Then, in either case, it will decrement the unblocking mutator's status_control object to indicate the priority bump uncertainty has been resolved. Otherwise either the x02 priority_bumped or x04 priority_not_bumped flag is on. If the x02 priority_bumped flag is on, increment the priority_bump_count field within the unblocking mutator's blocker object. In either case return TRUE; otherwise continue to step 3.

3. If curLink contains the special transition value, it indicates that the iterating mutator has set curPtr, but that it has not yet set curLink with the value it dereferences from curPtr. The unblocking mutator cannot tell whether it will need to awaken the iterating mutator. To be sure, use compareAndSwapQualified( ) to attempt to change curLink to the special miscompare value. If this fails (because either curLink or curPtr was changed in the meantime) go back to step 1 to start over. If successful, it will force the iterating mutator to fail in its attempt to set curLink, and when it dereferences curPtr again, it will see that the link pointer is unblocked. In this way, the unblocking mutator can be sure that the iterating mutator will not wait on it, so return FALSE.

4. If curLink does not contain the special transition value, the view object appears to be of no interest to the mutator, but this procedure verifies whether the curLink value is current. Use compareAndSwap( ) to attempt to store the previously extracted value back into curLink. If unsuccessful, go back to step 1 to start over. Otherwise the view object is of no interest to the mutator, so return FALSE.

When all view objects for mutators have been examined, the unblocking mutator will have the following counts: (a) the number of waiters which it must awaken, and which must notify it that they have awakened and are no longer waiting; (b) the number of remaining priority bump uncertainties (in status_control) for which the blocking mutator must wait for notifications of their resolutions; and (c) the number of priority bumps the blocking mutator received from its waiters (in priority_bump_count).

Finding Blocking Mutators to Awaken when Unblocking Link Pointers

When a mutator unblocks its link pointers, if the old (blocked) value of either link pointer contains the x04 blocking_mutator_waiting flag on, it means that at least one blocking mutator may be committing or have committed to wait for the unblocking mutator to unblock its link pointers. In that case, each of the blocker objects must be examined. The examination of each one returns a Boolean indicating whether the blocking mutator had committed to wait for the link pointers to be unblocked. The number of TRUE responses is the number of blocking mutators to be awakened, and after being awakened, which will notify the unblocking mutator that they are done waiting. (When all have indicated they are done waiting, the blocker object can be reused). The following steps are performed in the examination of each blocker object:

1. If the waiting_for_blocker field within the blocker object does not point to the unblocking mutator's blocker object (ignoring all of the flag bits), then this blocker object is of no interest, so return FALSE; otherwise continue to step 2.

2. Use compareAndSwap( ) to attempt to set the blocker object's waiting_for_blocker field to NULL. If the attempt fails (because the blocking mutator is setting the flags within it) go back to the beginning of this step to try again. When eventually successful, the waiting_for_blocker field will be NULL, indicating that the blocking mutator is no longer waiting.

3. If the x01 committed_waiter flag is off in the old value of the waiting_for_blocker field, it indicates that the blocking mutator had not gotten far enough to commit to waiting, when the unblocking mutator unblocked the link pointers. In this case, return FALSE; otherwise continue to step 4.

4. The blocking mutator had committed to wait for the unblocking mutator to unblock its link pointers. The blocking mutator will have tried to bump the priority of the unblocking mutator's task, and may or may not have gotten far enough along to do that and to indicate the results. If neither the x02 priority_bumped nor the x04 priority not bumped flags are on in the old value of curLink, then the priority bump is uncertain. In that case.increment the status_control object within the unblocking mutator's blocker object, and return FALSE; otherwise continue to step 5. (The blocking mutator will fail in its attempt to set either the x02 priority_bumped or the x04 priority not bumped flag (because the unblocking mutator set the waiting for blocker field to NULL), and when it later dereferences the link pointer again, will see that it is unblocked.) Meanwhile, if the blocking mutator had bumped the unblocking mutator's task's priority, it will increment the priority_bump_count field within the unblocking mutator's blocker object. Then, in either case, it will decrement the unblocking mutator's status_control object to indicate the priority bump uncertainty has been resolved.

5. Either one of the x02 priority_bumped or the x04 priority_not_bumped flags is on. If the x02 priority_bumped flag is on, increment the priority_bump_count field within the unblocking mutator's blocker object. In either case return TRUE.

When all blocker objects have been examined, the unblocking mutator will have the following counts: (a) the number of waiters which it must awaken, and which must notify it that they have awakened and are no longer waiting; (b) the number of priority bump uncertainties (in the status_control object) for which the blocking mutator must wait for notifications of their resolutions; and (c) the number of priority bumps the blocking mutator received from its waiters (priority_bump_count field). This information will determine when the blocker object is available to be reused for another mutating function.

Waiting and Waking Up

Waiting for a Mutator to Unblock its Link Pointers

This procedure is invoked either from an iterating mutator or a blocking mutator, which must wait for a second mutator to unblock its link pointers. A reference either to the curLink field within the view object for an iterating mutator, or to the waiting_for_blocker field with the blocker object of a blocking mutator, is passed as a parameter. This is done so that it can be updated with the results of the attempt to bump the priority of the second mutator's task. (The x01 committed_waiter flag has already been set on there). This function returns only after waiting for the link pointers to be unblocked, or after determining that it is not necessary to wait because while setting the priority bump indications, the link pointers were found to be unblocked.

1. Bump the priority of the task for the second mutator, and use the x02 priority_bumped flag as the flag bit in step 2. However, if it is not necessary to bump the priority of the task for the second mutator, use the x04 priority not bumped flag as the flag in step 2.

2. Use compareAndSwap( ) to attempt to set on the flag bit determined in step 1. If it succeeds, go to step 3. Otherwise the attempt failed because the second mutator has already unblocked the link pointers and updated the field of interest: If the field is curLink within a view object, it now points to the new current link for that iterator; if the field is the waiting_for_blocker field within a blocker object, it is now NULL. In either case there is no point in waiting, since the link pointer has now been unblocked, but the second mutator, seeing neither the x02 priority bumped nor the x04 priority_not bumped flag in the old value of the field, will not know whether its task's priority has been bumped. So if the priority was bumped in step 1, increment the priority bump count in the second mutator's blocker object. Then, in either case, decrement the status_control object in the second mutator's blocker object, to notify it that the priority bump uncertainty has been resolved, and exit. (The second mutator will eventually wait for all priority bump uncertainties to be resolved.)

3. At this point the flag has been set indicating whether the second mutator's task's priority has been bumped or not, so wait for the second mutator to unblock its link pointers. (When that mutator unblocks its link pointers, and looks at the blocker or view object for the waiting mutator, it will know whether its task's priority was bumped). When awakened from the wait, decrement the status_control object in the second mutator's blocker object to notify, it hat the wait is complete, and exit. (This will indicate that the current mutator no longer has a reference to the second mutator's blocker object, and when all such references have expired, that blocker object can be used for another mutating function.)

Primary Wait & Wake-up Mechanism

The status_control state counter object is the primary object involved when iterators and mutators wait for and awaken one another. This object exists within the blocker object and controls the following events: (a) determining whether the blocker object is active or inactive, and the atomic means to transition between those states; (b) making the mutator which is using the blocker object wait for iterators to advance; (c) making iterating and blocking mutators wait for the mutator which is using the blocker object, to unblock its link pointers; and (d) making the mutator which is using the blocker object wait for all priority bump uncertainties to be resolved. Table 15 describes the various state counter values and their significance:

TABLE 15

State Counter Values

| Value | Meaning |
|---|---|
| 0 | This value indicates that the blocker object is in the inactive state. To change the blocker object to the active state (when assigning it to a mutator), the counter is atomically changed from zero to a non-zero value. (Before this is done, the blocker portion of the activated_blocker_and_view_counts field in the SharedChain object is atomically incremented by 1.) |
| x8000... | I.e., highest order bit is 1, all others zero. This is the value that is assigned to the counter to change its state from inactive to active. While the counter has this value, the mutator using the blocker object is in a steady state, not waiting for any notifications of any sort from iterating or blocking mutators. If the blocking mutator has blocked any link pointers, all waiting mutators will be waiting for the counter to go to a value less than x4000..., so this value will cause them to wait. |
| x8000... +/-x | A value in this range indicates the blocking mutator is waiting for iterators to advance. The value x is the number of iterators involved, which has a defined range. As a blocking mutator looks at a view object, it sets the appropriate flags in curPtr and counts the number of iterators for which it must wait. As iterators advance, they notify the blocking mutator of their advance by decrementing the state counter by 1. After looking at all view objects, the blocking mutator atomically adds the number for which it must wait to its state counter. It then waits for the state counter to decrement to the steady state value of x8000... as any remaining iterators notify it of their advance. When all notifications have occurred, the blocking mutator is free to unblock its link pointers, knowing that there are no other iterators in the way. All during this time, the value in the counter is sufficiently large to cause all mutators which need to wait for the link pointers to be unblocked, to wait. |
| x8000... +/-y | A value in this range indicates the blocking mutator is waiting for priority bump uncertainties to be resolved. The value y is the number of remaining uncertainties, having the same range as x above. By looking at the counter, this state is indistinguishable from the above state where the blocking mutator is waiting for iterators to advance. However, in this case, the blocking mutator has unblocked its link pointers, and while counting the number of committed waiters, it also counted the number of priority bump uncertainties. As waiters encounter the uncertainty and resolve it, they decrement this counter. Meanwhile the blocking mutator adds the total number of uncertainties to this counter, and waits it to return to the steady state value of x8000.... When this value is reached, the blocking mutator can be sure that it knows how many times its priority has been bumped by waiters, and can unbump its own priority that many times. |
| z | Once a blocking mutator has unblocked its link pointers and waited for all priority bump uncertainties to be resolved, it then sets the counter to the number of committed waiters which it counted earlier. This will cause all waiters to be awakened (and those which had committed to wait but which had not begun waiting yet will immediately fall through the wait when they reach that point). As each waiter is awakened, it notifies the blocking mutator that it is done waiting, by decrementing this counter by 1. So the value z represents the number of outstanding waiters, which have not yet |

TABLE 15-continued

State Counter Values

| Value | Meaning |
|---|---|
| | notified the mutator that they are done waiting. When the counter reaches zero, the blocker returns to the inactive state and is able to be reused by another mutator (since there are no longer any outstanding references to it), and the blocker portion of the activated_blocker_and_view_counts field in the SharedChain object is decremented by 1. If that entire field is zero, the reclaim function is free to get rid of any excess blocker or view objects. |

Link Transfer Mechanism

The link transfer mechanism is the means by which one blocking mutator privately transfers the use of a link pointer to another blocking mutator. This mechanism is used in two different circumstances, which use different state counter objects within the blocker object:

1. If mutator 1 (using blocker object 1) has tentatively blocked the backward pointer within a link, and then discovers that the forward pointer within the previous link is blocked by mutator 2 (using blocker object 2), mutator 1 will suspend its tentative block, allowing mutator 2 to use that link pointer. Mutator 1 uses the link transfer mechanism to put a pointer to the previous link into the suspended_link_control state counter object within blocker object 2. Meanwhile mutator 2 has been waiting on this suspended_link_control object, and is awakened when mutator 1 puts the link pointer there. After transfering the link pointer to mutator 2, mutator 1 waits on the suspended_link_control object within its own blocker object. When mutator 2 finishes, it will transfer the link pointer back to mutator 1, putting a pointer to the new previous link in the suspended_link_control object within blocker object 1, thus awakening mutator 1.

2. When mutator 1 (using blocker object 1) intends to remove a link, but discovers that the forward pointer within that link is already blocked by mutator 2 (using blocker object 2), mutator 1 waits on the blocked_remove_control state counter object within its blocker object. When mutator 2 goes to unblock that link pointer and discovers that it is being waited on by a mutator which intends to remove the link containing it, then instead of unblocking the link pointer, mutator 2 re-blocks it on behalf of mutator 1. Then mutator 2 uses the link transfer mechanism to pass a pointer to the next link to mutator 1, by storing that pointer in the blocked_remove_control state counter object within blocker object 1. This awakens mutator 1, which retrieves the pointer to the next link from its blocked_remove_control object, and continues, having now successfully blocked the forward link pointer within the link it is going to remove.

The link transfer mechanism works the same, regardless of the situation in which it is being used. A state counter object contains either a pointer to a link, or a value which reflects the status of the mutator to which the state counter belongs. Table 16 shows the status values which may appear in the counter. They are chosen both to be consistent with bit flags appearing in link pointers, and to avoid being confused with a link pointer (all zeroes as a link pointer refers either to the first or the last link in the chain).

TABLE 16

Status Values

| Value | Meaning | Description |
|---|---|---|
| x00...08 | Inactive | This is the initial value of the counter. It indicates that the mutator has not begun the process of waiting to receive a link pointer. |
| x00...01 | Committed Waiter | This is the value a mutator stores when it begins the process of waiting. It indicates uncertainty as to whether the priority of the task for the waited-on mutator has been bumped. |
| x00...03 | Priority Bumped | This value indicates that the mutator is waiting to receive a link pointer, and has bumped the priority of the task for the mutator from which it will receive the link pointer. |
| x00...05 | Priority Not Bumped | This value indicates that the mutator is waiting to receive a link pointer, and has determined that it is not necessary to bump the priority of the task for the mutator from which it will receive the link pointer. |

It is not known ahead of time whether the mutator which is transferring the link pointer will do so before, during, or after the mutator which is to receive the link pointer has prepared to do so.

Transferring a Link Pointer to Another Mutator

When a mutator wants to transfer a link pointer to a second mutator, it knows the blocker object for that second mutator, and works with the appropriate state counter within that blocker object. Use the following steps to transfer the link pointer:

1. Get the current counter value from the state counter object.
2. Use compareAndSwapCounter( ) to attempt to change the counter from its current value to the link pointer value. If the attempt fails (because the receiving mutator is setting flags within the counter), go back to step 1 to start over; otherwise continue to step 3.

3. If the old value of the counter was the x08 inactive value, it indicates that the second mutator has not begun waiting yet, and will not actually wait nor will it bump the first mutator's task's priority. In this case, the transfer function is complete, otherwise, continue to step 4.
4. If the old value of the counter was x01 committed_waiter, then the second mutator has begun the waiting process, and before it actually waits, it will attempt to bump the first mutator's task's priority, but the first mutator will not be able to know whether its task's priority was bumped. Increment the status control object in the first mutator's blocker object to indicate a priority bump uncertainty that must eventually be resolved, and the transfer function is complete. (The first mutator will eventually wait for all priority bump uncertainties to be resolved, and the second mutator will decrement the first mutator's status_control object to indicate the resolution. The second mutator will not actually wait for the link transfer). Otherwise, if the old value of the counter was not x01 committed_waiter, continue to step 5.
5. If the old value of the counter was x03 priority bumped, then the second mutator has bumped the first mutator's task's priority. In that case, increment the priority bump count in the first mutator's blocker object, and the transfer function is complete. (The first mutator will eventually unbump its own task's priority. Meanwhile the second mutator will be awakened from its wait).
6. Otherwise, the old value of the counter was x05 priority_not_bumped, indicating that the second mutator had determined it was not necessary to bump the first mutator's task's priority. In this case, the transfer function is complete. (The second mutator will be awakened from its wait).

Waiting to Receive a Transferred Link Pointer

When a mutator wants to receive a link pointer from a second mutator, it knows that the second mutator will pass the link pointer to a particular state counter object within the first mutator's blocker object. The following steps describe the process of waiting to receive the link pointer.
1. Use compareAndSwapCount( ) on the state counter object to attempt to change the counter from its expected x08 inactive value to the the x01 committed_waiter value. If the attempt fails, it is because the second mutator has already transferred the link pointer. In that case, go to step 6; otherwise continue to step 2.
2. The attempt succeeded, and the new value of the counter indicates that if the second mutator were to transfer the link pointer right now, it would not know whether its task's priority had been bumped or not. Invoke tryBump( ) to attempt to bump the second mutator's task's priority, and use the x03 priority_bumped value in the following steps; however, if it is not necessary to bump the priority, use the x05 priority_not_bumped value instead.
3. Use compareAndSwapCount( ) to attempt to change the counter from it the expected x01 committed_waiter value to the value determined in step 2. If the attempt fails, it is because the second mutator has just now transferred the link pointer. In that case, go to step 5; otherwise, continue to step 4.
4. The counter now contains the indication of whether the second mutator's priority was bumped, so wait for the second mutator to transfer the link pointer. This amounts to waiting on the state counter for it to become some other value than was set in step 3. When the second mutator transfers the link pointer, it will awaken the first mutator. When awakened, continue with step 6.
5. At this point the second mutator has transferred the link pointer, but will not know whether its priority was bumped. If the priority was bumped in step 2, then increment the priority bump count field within the second mutator's blocker object. In either case, decrement the status_control object within the second mutator's blocker object to notify it that the priority bump uncertainty has been resolved.
6. At this point the second mutator has transferred the link pointer. Retrieve the link pointer from the state counter.
7. Set the state counter back to the x08 inactive value. This can be done safely because no other mutator will attempt to transfer a link pointer to the first mutator using this state counter object until the first mutator takes some further actions which would prompt another mutator to do that.

Reclaiming Excess Blocker or View Objects

The x02 iterating_mutator_waiting and x04 blocking_mutator_waiting flags within link pointers, and the active_inspector_view_count and active_mutator_view_count fields within the SharedChain object are intended to indicate when it is necessary for a mutator to search through the list of view and/or blocker objects. Searching when it is not necessary to do so is a performance overhead that is undesirable. In addition, it is desirable to keep the lists of view and blocker objects as short as is reasonable, so that when searching is necessary, there are not an excessive number of inactive objects to search through. Preferably, the SharedChain keeps a minimum number of objects in each list (currently 4), and then when it has a chance to reclaim excess objects, it reclaims ½ of the excess objects that exist at that time. The intent is to get rid of extra objects but not too quickly.

Blocker and view objects are maintained on singly-linked lists, so that new objects can be added to the head of the list atomically, without requiring a lock to do so. Objects can be removed when there are no outstanding references to them. It is known that there are no outstanding references is when the activated_blocker_and_view counts field within the SharedChain object is decremented down to zero.

When a nonatomic iterator is done with its (nonatomic) view object, or a blocker object's status_control state counter is set to zero so that there are no (more) waiters that have a reference to it, then the appropriate portion of the activated_blocker and_view_counts field is atomically decremented by 1. However, if as a result of the decrement the entire field would be zero, then instead of simply decrementing, also simultaneously set on the reclaim_in_progress flag (high order bit of the field) if there are one or more extra objects. Use the following steps when decrementing the activated_blocker_and_view_counts field to attempt to set on the reclaim_in_progress flag, and if successful, to perform the reclaim function:
1. Extract the activated_blocker_and_view_counts field into a temporary copy and perform the decrement there. If the result is zero, go to step 2. Otherwise use compareAndSwap( ) to attempt to store the decremented copy back into the field. If the attempt fails, it indicates the field was modified in the mean time, so go back to the beginning of step 1 to start over. If the attempt is successful, the decrement is complete, but because there are outstanding references to view and/or blocker objects (or reclaim is already in progress), there is nothing to reclaim at this time so just exit.
2. At this point, there are no outstanding references to blocker and view objects, so a reclaim can be done if there are excess objects. Extract the primary view_existence_ count or secondary view existence_count field (whichever is valid) from the SharedChain object into a temporary copy. This field contains separately the number of existing view objects for inspectors and for mutators.
3. Extract the blocker_and_view_existence_counts field from the SharedChain object into a temporary copy.
4. Use the fields obtained in steps 2 and 3 to determine whether there any excess blocker objects, view objects for inspectors, or view objects for mutators. If there are any excess objects, then set on the reclaim in_progress flag in the temporary copy of the activated_blocker_and view counts field that was obtained in step 1.
5. Use compareAndSwapQualified( ) to attempt to store the temporary copy back into the activated blocker and view counts field. If this fails (because either the activated blocker and view counts field or the blocker and view existence counts field is changed in the meantime), then go back to step 1 to start over. If the attempt succeeds, then either reclaim is in progress or it is not, depending on the results of step 4. If not in progress, there is nothing to do, so just exit.
6. At this point, reclaim is in progress, and the contents of several fields have been extracted from the SharedChain object for future use. Meanwhile, the fields themselves may be changing while reclaim processing is being attempted. If there are no excess blocker objects, go to step 10.
7. There are excess blocker objects, based on the count extracted in step 3. Decrement the blocker portion of the extracted blocker_and_view_existence_counts field by half of the excess. This change will not become effective until the compareAndSwapQualified( ) operation in step 16 succeeds.
8. Starting with the first blocker object (from the primary_blocker_list_head or secondary_blocker_list_head field, whichever is valid), find the next blocker object, and step through the list until the number of blocker objects to be reclaimed have been stepped over. These that have been stepped over are the ones that are expected to be discarded, and the current blocker object is the one that is expected to be the new first blocker object in the list. There may now be more blocker objects in the list than were expected, but there will never be fewer. Store the pointer to the new first blocker object in the primary_blocker_list_head or secondary_blocker_list_head field, whichever is invalid. This change will not mean anything until the compareAndSwapQualified( ) operation in step 16 succeeds.
9. Toggle the high-order bit in the blocker portion of the extracted blocker and view_existence counts field. This will swap the primary blocker_list_head and secondary blocker_list_head fields with respect to which one is valid. This will have no meaning until the compareAndSwapQualified( ) operation in step 16 succeeds. However, when it does succeed, the blocker objects which are to be deleted will no longer be visible in the list, and can be discarded at will.
10. If there are no excess view objects for inspectors, go to step 14.
11. There are excess view objects for inspectors, based on the count extracted in step 2. Decrement the inspector portion of the extracted primary view_existence_counts or secondary view_existence_counts field by half of the excess. Also decrement the view portion of the extracted_blocker_and_view_existence counts field by that same amount. These changes will not become effective until the compareAndSwapQualified( ) operation in step 16 succeeds.
12. Similar to what was described for blocker objects, step over the number of view objects which are to be reclaimed, to find the view object which is expected to become the new first view object in the list. And again, there may now be more inspector view objects in the list than were expected, but there will never be fewer. Store the pointer to the new first inspector view object in the primary_inspector_view_chain_head or secondary_inspector_view_chain_head field, whichever one is invalid. This change will not mean anything until the compareAndSwapQualified( ) operation in step 16 succeeds.
13. Toggle the high-order bit in the inspector portion of the extracted primary_view_existence_counts or secondary_view_existence_counts field. This will swap the primary_inspector$_{view}$_list_head and secondary_inspector-view_list_head fields with respect to which one is valid. This will have no meaning until the compareAndSwapQualified( ) operation in step 16 succeeds. However, when it does succeed, the view objects which are to be deleted will no longer be visible in the list, and can be discarded at will.
14. If there are no excess view objects for mutators, go to step 15. Otherwise, do the equivalent processing for mutator view objects as was done for inspector view objects in steps 11–13.
15. If there were excess view objects for either inspectors or mutators, copy the extracted/updated primary view_existence_counts or secondary_view_existence_counts field into the primary_view_existence_counts or secondary_view_existence_counts field within the SharedChain object, whichever one is invalid. This updated field will contain new inspector view counts and the indicator of whether the primary inspector_list_head or secondary inspector_list_head is valid, and/or new mutator view counts and the indicator or whether the primary mutator list_head or secondary_mutator_list_head is valid. None of this will mean anything until the compareAndSwapQualified( ) operation in step 16 succeeds. In addition, if there were excess view objects for either inspectors or mutators, toggle the high-order bit in the view portion of the extracted blocker_and_view_existence_counts field. This will swap the primary_view_existence_counts and secondary_view_existence_counts field with respect to which one is valid. This will have no meaning until the compareAndSwapQualified( ) operation in step 16 succeeds.
16. This step is the atomic point of the entire reclaim operation. Use compareAndSwapQualified( ) to attempt to atomically replace the blocker_and_view_existence_counts field with the updates made to the extracted value, while ensuring that neither that field nor the activated_blocker_and_view_counts field has changed in the meantime. If the operation is successful go to step 20. Otherwise the attempt to commit the changes failed because either there were active blocker and/or view objects at the time of the operation, or there are now more blocker and/or view objects in existence than there were when the reclaim processing started.
17. Extract the primary_view_existence_counts or secondary_view_existence_counts field from the SharedChain object (whichever is valid), as in step 2. Then extract the blocker_and_view_existence_counts field as in step 3.
18. Extract the activated_blocker_and_view_counts field from the SharedChain object. If it is not all zeroes except for the reclaim_in progress flag, go to step 19. Otherwise it is all zeroes except for the reclaim in progress flag, so the reclaim processing is retried. Use compareAndSwapQualified( ) to store back the activated_blocker_and_view_counts field, verifying that both it and the blocker_and_view_existence_counts fields are still valid. If the operation fails, go to step 17 to try again. Otherwise if it succeeds, go to step 6 to retry the reclaim processing.

19. Since there are now active blocker or view objects, the reclaim function must wait until they are all inactive, so use compareAndSwapQualified( ) to try to set off the reclaim in_progress flag. If this operation fails (because either the activated_blocker_and_view_counts field or the blocker_and_view_existence_counts field was changed in the mean time), then go back to step 17 to try again. If it succeeds, then exit; the reclaim operation will be retried when the entire activated_blocker_and_view_existence_counts field eventually returns to zero.

20. At this point the reclaim has succeeded. If blocker objects were reclaimed, the toggled high-order bit in the blocker portion of the blocker_and_view_existence_counts field has caused the primary_blocker_list_head and secondary_blocker_list_head fields to switch roles as to which is valid and which is invalid, and the new valid list head has by-passed the blocker objects which were to be deleted. Similarly, if any view objects were reclaimed, then the toggled high-order bit in the view portion of the blocker_and_view existence_counts field has caused the primary_view_existence_counts and secondary view_existence_counts fields to switch roles as to which is valid and which is invalid, and the toggled high-order bit in either portion of the new valid field independently indicates whether it is the primary_chain_head or secondary_chain_head fields for inspector or mutator views that are now valid. A newly-valid list head field for inspector or mutator view objects has bypassed the view objects which are to be deleted.

21. Use compareAndSwap( ) to attempt to set off the reclaim_in_process flag in the activated_blocker_and_view_counts field. If the operation fails repeat it until it succeeds.

22. Delete the excess blocker, inspector view, and/or mutator view objects that were reclaimed in the above steps.

Recapitulation

Some of the operational features of the preferred embodiment as described above can be summarized as follows. Using a SharedChain object and its associated data structures, it is possible to concurrently and simultaneously insert and/or remove multiple links from a list, without interference. This is accomplished by blocking access at the link level, rather than at the level of the entire list. Specifically, an inspector object "protects" (prevents alteration of by other objects) only one link at a time, while an iterating mutator object "protects" a sliding window of two consecutive links. At the point of insertion, the mutator protects at least some data in two consecutive links (not including the link inserted, and at the point of deletion, the mutator protects at least some data in three consecutive links (including the link to be removed).

An inspector object is generally free to traverse a linked list, notwithstanding that a mutator object has blocked a portion of it in order to alter it. The inspector can traverse through (by-pass) the portion blocked by the mutator, While mutators have the capability to traverse a list in order to determine the point at which to insert or remove a link, it is also possible to remove links and insert links at arbitrary locations without traversal (i.e., given an arbitrary link in the middle of the list). Double linking (forward and backward pointers) is required for certain insertions/removals without list traversal. The full potential of the preferred embodiment of the present invention is realized in such a doubly linked list, where clients have pointers to links within the list, and multiple clients may simultaneously jump into arbitrary list locations to insert/remove links. The ability to concurrently perform multiple removals from and insertions into arbitrary points in a linked list is not dependent on reference counting of links.

An ordering relationship may be defined for links in the SharedList object. E.g., each link may contain a textual data field such as a name, where the links are to be ordered such that the textual data fields are arranged in alphabetical order. Traversal of the list by a mutator in order to locate an insertion point, and the protection of pointers in adjacent links during insertion, allows the SharedList object to maintain such an ordering relationship for the links, if one is defined for the list. The mutator traverses the list and compares the appropriate data field(s) of the link to be inserted with those of the existing links until the correct insertion point is located.

By placing links on a predefined address boundary (16bytes in the preferred embodiment) and pointers within links also on an predefined address boundary (8 bytes in the preferred embodiment), it is possible to use some of the address bits as flags. This has the advantage of swapping key flag bits in the same atomic operation (e.g., compareAndSwap( )) that swaps the address itself.

Although a specific embodiment of the invention has been disclosed along with certain alternatives, it will be recognized by those skilled in the art that additional variations in form and detail may be made within the scope of the following claims:

What is claimed is:

1. A method for maintaining a linked list, comprising the steps of:

establishing an auxiliary data structure for said linked list, said auxiliary data structure containing external references to said linked list which are used by updating tasks;

initiating a first updating task for updating said linked list through said auxiliary data structure;

recording blocking data within said auxiliary data structure to block other updating tasks accessing said linked list through said auxiliary data structure from altering a first portion of said linked list, said first portion being fewer than all the elements of said linked list; and updating said linked list within said first portion of said linked list, by performing an action from the set of actions consisting of: (a) removing an element within said first portion of said linked list from said linked list, and (b) inserting an element into said linked list within said first portion of said linked list.

2. The method of claim 1, wherein said auxiliary data structure comprises a list of by-pass elements, each by-pass element containing a reference to a list element immediately after a blocked portion of said list, wherein said step of recording blocking data comprises altering a reference to a first list element of said first portion of said linked list to refer instead to a by-pass element, wherein a task traversing said linked list but not altering said linked list traverses said linked list through said by-pass element past said first portion of said linked list.

3. The method of claim 1, wherein said linked list is a doubly linked list.

4. The method of claim 1, wherein said first portion of said linked list blocked by said step of recording blocking data consists of no more than three links.

5. The method of claim 1, further comprising the steps of:
initiating a second updating task for updating said linked list through said auxiliary data structure;
recording blocking data within said auxiliary data structure to block tasks other than said second updating task accessing said linked list through said auxiliary data structure from altering a second portion of said linked list, said second portion being fewer than all the elements of said linked list; and
updating said linked list within said second portion of said linked list, by performing an action from the set of actions consisting of: (a) removing an element within said second portion of said linked list from said linked list, and (b) inserting an element into said linked list within said second portion of said linked list, said step of updating said linked list within said second portion being performed concurrently with said step of updating said linked list within said first portion.

6. The method of claim 1, further comprising the step of:
passing a pointer to an arbitrary link within said linked list to locate a point for altering said linked list, wherein said first portion blocked by said recording blocking data step includes at least part of said arbitrary link.

7. The method of claim 1, wherein said auxiliary data structure is an object in a class hierarchy of an object-oriented programming structure.

8. The method of claim 7, wherein said class hierarchy includes a first class for traversing said linked list without altering it, and a second class for objects traversing said linked list and altering it.

9. The method of claim 8, wherein said class hierarchy further includes a third class for objects traversing said linked list without altering it and having list-level blocking access, a fourth class for objects traversing said linked list without altering it and having link-level blocking access, a fifth class for objects traversing said linked list and altering it and having list-level blocking access, and a sixth class for objects traversing said linked list and altering it and having link-level blocking access, said third and fourth classes inheriting from said first class, and said fifth and sixth classes inheriting from said second class.

10. The method of claim 1, wherein an ordering relationship is defined for said linked list.

11. A method for updating a doubly-linked list in a multitasking computer system, comprising the steps of:
identifying a first set of consecutive links in a region of interest of said doubly linked list, said first set of consecutive links being fewer than all the links of said doubly linked list;
blocking tasks other than a first task from altering at least some portion of links of said first set of consecutive links, while not blocking tasks other than said first task from altering links of said doubly-linked list not contained in said first set;
altering said doubly linked list within said first set by performing an operation from the set of operations consisting of: (a) removing a link of said first set from said doubly linked list, and (b) inserting a link into said doubly linked list between two links of said first set, said operation being performed by said first task; and
unblocking tasks other than said first task from altering at least some portion of links of said first set after performing said altering step.

12. The method of claim 11, wherein said first set of consecutive links of said linked list blocked by said step of blocking tasks consists of no more than three links.

13. The method of claim 11, wherein said step of identifying a first set of consecutive links comprises receiving a pointer to an arbitrary link within said linked list to locate a point for altering said linked list, said arbitrary link being within said first set.

14. The method of claim 11, further comprising the steps of: identifying a second set of consecutive links in a region of interest of said doubly linked list, said second set of consecutive links being fewer than all the links of said doubly linked list;
blocking tasks other than a second task from altering at least of portion of links of said second set of consecutive links, while not blocking tasks other than said second task from altering links of said doubly-linked list not contained in said second set;
altering said doubly linked list within said second set by performing an operation from the set of operations consisting of: (a) removing a link of said second set from said doubly linked list, and (b) inserting a link into said doubly linked list between two links of said second set, said operation being performed by said second task; and
unblocking tasks other than said second task from altering at least a portion of links of said second set after performing said step of altering said doubly linked list within said second set;
wherein said step of altering said doubly linked list within said second set is performed after said step of blocking tasks other than said first task from altering links of said first set, and performed before said step of unblocking tasks other than said first task from altering links of said first set.

15. A computer program product for maintaining a linked list, said computer program product comprising a plurality of computer executable instructions recorded on computer readable media, said program performing the steps of:
establishing an auxiliary data structure for said linked list, said auxiliary data structure containing external references to said linked list which are used by updating tasks;
initiating a first updating task for updating said linked list through said auxiliary data structure;
recording blocking data within said auxiliary data structure to block other updating tasks accessing said linked list through said auxiliary data structure from altering a portion of said linked list, said portion being fewer than all the elements of said linked list; and
updating said linked list within said portion of said linked list, by performing an action from the set of actions consisting of: (a) removing an element within said portion of said linked list from said linked list, and (b) inserting an element into said linked list within said portion of said linked list.

16. The computer program product of claim 15, wherein said auxiliary data structure comprises a list of by-pass elements, each by-pass element containing a reference to a list element immediately after a blocked portion of said list, wherein said step of recording blocking data comprises altering a reference to a first list element of said first portion of said linked list to refer instead to a by-pass element, wherein a task traversing said linked list but not altering said linked list traverses said linked list through said by-pass element past said first portion of said linked list.

17. The computer program product of claim 15, wherein said linked list is a doubly linked list.

18. The computer program product of claim 15, wherein said first portion of said linked list blocked by said step of recording blocking data consists of no more than three links.

19. The computer program product of claim 15, wherein said program further performs the steps of:

initiating a second updating task for updating said linked list through said auxiliary data structure;

recording blocking data within said auxiliary data structure to block tasks other than said second updating task accessing said linked list through said auxiliary data structure from altering a second portion of said linked list, said second portion being fewer than all the elements of said linked list; and updating said linked list within said second portion of said linked list, by performing an action from the set of actions consisting of: (a) removing an element within said second portion of said linked list from said linked list, and (b) inserting an element into said linked list within said second portion of said linked list, said step of updating said linked list within said second portion being performed concurrently with said step of updating said linked list within said first portion.

20. The computer program product of claim 15, wherein said computer program further performs the step of:

passing a pointer to an arbitrary link within said linked list to locate a point for altering said linked list, wherein said first portion blocked by said recording blocking data step includes said arbitrary link.

21. The computer program product of claim 15, wherein said auxiliary data structure is an object in a class hierarchy of an object-oriented programming structure.

* * * * *